(12) United States Patent
Chiu et al.

(10) Patent No.: US 6,597,689 B1
(45) Date of Patent: Jul. 22, 2003

(54) SVC SIGNALING SYSTEM AND METHOD

(75) Inventors: Manfred F. Chiu, Cupertino, CA (US); Gregory C. Hill, Fremont, CA (US); Clifford James Buckley, San Jose, CA (US); Jens Arne Holten, Foster City, CA (US); Steven A. Eich, Union City, CA (US); Michael E. Grimes, Belmont, CA (US); Yerrapalli R. Sudhakar, Fremont, CA (US); Anthony Peter Peck, Fremont, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/223,047

(22) Filed: Dec. 30, 1998

(51) Int. Cl.$^7$ ................................................ H04L 12/66
(52) U.S. Cl. ...................... 370/354; 370/395.1; 370/430
(58) Field of Search ........................... 370/395.1, 395.2, 370/395.3, 395.5, 397, 401, 419, 430, 535, 537, 242, 487, 395.61, 236.1, 354; 379/201.02, 207.02; 375/222, 275, 220, 211, 226; 725/81

(56) References Cited

U.S. PATENT DOCUMENTS

| | | | | |
|---|---|---|---|---|
| 5,930,238 A | * | 7/1999 | Nguyen | 370/260 |
| 6,097,722 A | * | 8/2000 | Graham et al. | 370/395.21 |
| 6,104,749 A | * | 8/2000 | Lu et al. | 375/222 |
| 6,252,877 B1 | * | 6/2001 | Kozaki et al. | 370/230 |
| 6,314,102 B1 | * | 11/2001 | Czerwiec et al. | 370/395.1 |
| 6,385,203 B2 | * | 5/2002 | McHale et al. | 370/252 |
| 6,407,997 B1 | * | 6/2002 | DeNap et al. | 370/352 |
| 6,480,487 B1 | * | 11/2002 | Wegleitner et al. | 370/354 |
| 6,529,479 B1 | * | 3/2003 | Suzuki | 370/236.1 |

\* cited by examiner

*Primary Examiner*—Hassan Kizou
*Assistant Examiner*—John Pezzlo
(74) *Attorney, Agent, or Firm*—John C. Gorecki

(57) ABSTRACT

The Intelligent Multiservice Access System (IMAS) enables support for the next generation of virtual connections. Regardless of whether the communications lines coupled to the inputs and outputs of the IMAS are based on SVC, PVC, or a combination of PVC and SVC, the IMAS can support SVCs for a more flexible, timely, efficient, and manageable connection. In the more typical configuration, the loop side of the IMAS is PVC-based because the modems do not support SVC signaling, and the telecommunications backbone side is capable of supporting SVC signaling even though existing DSLAMs do not employ SVC signaling logic. With SVC support, the IMAS assists the ATM network in hand crafting an SVC-based connection almost immediately between end users when the originating end user wants to make a call to a destination end user, and tear down that virtual connection almost immediately when that call has completed. The SVC signaling is performed by a proxy signaling agent that resides in the IMAS to give the appearance to the ATM network in the telecommunications backbone that the loop side supports SVC signaling even though the line is PVC-based.

3 Claims, 32 Drawing Sheets

CHASSIS CONFIGURATION

| # | |
|---|---|
| 20 | LINE CARD (LIU_16) |
| 19 | LINE CARD (LIU_15) |
| 18 | LINE CARD (LIU_14) |
| 17 | LINE CARD (LIU_13) |
| 16 | LINE CARD (LIU_12) |
| 15 | LINE CARD (LIU_11) |
| 14 | LINE CARD (LIU_10) |
| 13 | LINE CARD (LIU_9) |
| 12 | SYSTEM SWITCH CARD |
| 11 | CHASSIS SWITCH CARD |
| 10 | CHASSIS SWITCH CARD |
| 9 | SYSTEM SWITCH CARD |
| 8 | LINE CARD (LIU_8) |
| 7 | LINE CARD (LIU_7) |
| 6 | LINE CARD (LIU_6) |
| 5 | LINE CARD (LIU_5) |
| 4 | LINE CARD (LIU_4) |
| 3 | LINE CARD (LIU_3) |
| 2 | LINE CARD (LIU_2) |
| 1 | LINE CARD (LIU_1) |

FAN AND POWER SUPPLY — 23

FAN AND POWER SUPPLY SECTION

FIG. F9

Process Initialization

Call Establishment - Port Up Processing

Call Establishment - Admin Status Up Processing

Proxy Signaling Table

| ifIndex | VPI | VCI | Retry Count | Retry Time Interval | Admin. Status | Oper Status | ISP ID | Connect Info ID | Row Status |
|---------|-----|-----|-------------|---------------------|---------------|-------------|--------|-----------------|------------|
| . | . | . | . | . | . | . | . | . | . |
| . | . | . | . | . | . | . | . | . | . |
| . | . | . | . | . | . | . | . | . | . |
| . | . | . | . | . | . | . | . | . | . |
| . | . | . | . | . | . | . | . | . | . |
| . | . | . | . | . | . | . | . | . | . |
| . | . | . | . | . | . | . | . | . | . |
| . | . | . | . | . | . | . | . | . | . |

FIG. 30

ISP Table

| ISP ID1 ISP ID2 | ISP DESCR | ATM Address1 | ATM Address2 | ... | ATM Address5 | ... | ATM AddressN | Row Status |
|---|---|---|---|---|---|---|---|---|
| . . . . . . . | . . . . . . | . . . . . . | . . . . . . | . . . . . . | . . . . . . | . . . . . . | . . . . . . | . . . . . . . |
| ISP IDM | | | | | | | | |

FIG. 31

Connect Info Table

| Connect Info Index | Descr | Forward Max CPCS SDU Size | Backward Max CPCS SDU Size | Forward Peak Cell Rate | Backward Peak Cell Rate | Bearer Class | Layer 2 Protocol | Layer 3 Protocol | Initial Protocol ID | Forward QOS Class | Backward QOS Class | Row Status |
|---|---|---|---|---|---|---|---|---|---|---|---|---|
| . | . | . | . | . | . | . | . | . | . | . | . | . |
| . | . | . | . | . | . | . | . | . | . | . | . | . |
| . | . | . | . | . | . | . | . | . | . | . | . | . |
| . | . | . | . | . | . | . | . | . | . | . | . | . |
| . | . | . | . | . | . | . | . | . | . | . | . | . |
| . | . | . | . | . | . | . | . | . | . | . | . | . |
| . | . | . | . | . | . | . | . | . | . | . | . | . |
| . | . | . | . | . | . | . | . | . | . | . | . | . |

FIG. 32

SVC SIGNALING SYSTEM AND METHOD

BACKGROUND OF THE INVENTION

1. Field of the Invention

The present invention generally relates to telecommunications networking technology. More particularly, the present invention relates to a scalable network device, such as a switch or a multiplexer (e.g., DSLAM, ATM switch).

2. Description of Related Art

At its most fundamental level, a telecommunications system should provide service between at least two end users with a minimum level of quality that is acceptable for the kind of traffic that is being transmitted between these end users. End users have different needs from the telecommunications system because of the types and volume of traffic between them. One end user could telephone another user for voice communication. Another end user could use a computer and a modem to send an email to another user for data communication. Additionally, another end user could use a computer and a modem to access any number of Web pages on the Internet. Depending on the type of data (e.g., text, graphics, audio, video) that is being accessed, bandwidth requirements will vary. Thus, one end user may have very basic needs with minimal bandwidth and lots of delays, while another end user may have stringent requirements for lots of bandwidth with minimal delays. How can a telecommunications system, and its components, be designed to accommodate the various uses and needs?

Currently, the telecommunications infrastructure comprises network nodes (e.g., ATM switches, routers, other central office switches) that are coupled together. At the edge of this infrastructure are edge nodes (e.g., DSLAMs) for providing telecommunications service to subscribers (e.g., home users, business users, ISPs) via some local loop technology (e.g., ISDN, DSL). As known to those skilled in the art, local loop (or loop) refers to the interface (typically wires) between the subscriber and the telephone company's central office. Some of these network and edge nodes can be combined to create corporate networks and Intranets. These pieces of node equipment are usually installed and located in central offices as well as corporate offices. Communication between or among subscribers is possible through these network and edge nodes which run various communication protocols.

Although the bandwidth on the telecommunications backbone (e.g., DS3, OC3, STS3, or OC12) may be sufficient for all of the various types of traffic generated by subscribers, the bandwidth on the loop side is limited for today's traffic needs. Historically, analog dial-up with analog signaling was more than sufficient for most traffic. Even the digitization of voice, which requires approximately 4,000 Hz bandwidth, posed no problem since the telephone companies provided 64 Kbits/sec of bandwidth per channel. However, with the rise of the Internet and the increased interest in digital video and audio services, earlier modems were sorely lacking as speeds were as low as 1,200 bits/sec (V.22) to 33.6 Kbits/sec (V.34+) to today's 56 Kbits/sec (U.S. Robotics/3COM and Lucent/Rockwell). Even at 56 Kbits/sec, these modems are still too slow to fully capture digital audio and video services to the end user's satisfaction. Even if modems could use all of the available 64 Kbits/sec bandwidth provided by the telephone company, users would still be dissatisfied for the latest audio and video digital services. To give the appearance that more traffic was being passed through the lines than was actually being transmitted, several companies developed and implemented compression techniques.

For some time, even before the onset of the Internet, several loop technologies were slowly developed for this markef. One such loop technology is ISDN (at 128 Kbits/sec), which failed to deliver on its promise of better digital service because of the high cost of ISDN equipment and the higher cost of upgrading central office hardware and software. Furthermore, ISDN equipment was difficult to set up and make compatible with existing equipment because of poor diagnostics. The rates set by the public utilities commissions of various states are also very high. As of this writing, however, ISDN still has not disappeared and some service providers are offering ISDN service.

The traditional forms of leased line technologies, including T1 (at 24 channels of 64 Kbits/sec each for a total bandwidth of 1.544 Mbits/sec), fractional T1 (where users can get as many T1 channels as desired), and T3 (at 44.736 Mbits/sec or 28 T1 circuits), were also, of course, available. However, their prohibitively high expense makes these line technologies less attractive to the average subscriber. Recently, the pace of loop technology development has picked up due to the rise and proliferation of Digital Subscriber Line (DSL). Other competing technologies include Cable (CATV) Data Networks and Modems (or cable modems) and fiber optics.

At this point, however, DSL appears to be the front runner for the broadest application across the telephone companies' residential and small business subscriber base. However, DSL may not eliminate other technologies (e.g., T1, T3, ISDN, and cable modem) as the various telephone companies will make these technologies available to those who want them and can afford them. Various DSL technologies are available and they differ in technical operation rather than application. However, ADSL is receiving the most attention for loop technology in general and Internet access in particular. The entire XDSL family is provided below in TABLE A:

TABLE A

| xDSL Family | | | |
|---|---|---|---|
| Name | Data Rate | Mode | Physical |
| HDSL | 1.544 Mbps | Symmetric | Two wire pairs |
| HDSL2 | 2.048 Mbps | Symmetric | One wire pair |
| SDSL | 768 Kbps | Symmetric | One wire pair |
| ADSL | 1.5 to 8 Mbps<br>16 to 640 Kbps | Down<br>Up | One wire pair but 18 Kft max |
| RADSL | 1.5 to 8 Mbps<br>16 to 640 Kbps | Down<br>Up | One wire pair but can adapt<br>rates to line condition changes |
| CDSL | Up to 1 Mbps<br>16 to 128 Kbps | Down<br>Up | One wire pair and require no<br>hardware at CPE premises |
| ISDL | ISDN BRI | Symmetric | One wire pair |
| VDSL | 13 to 52 Mbps<br>1.5 to 6 Mbps | Down<br>Up | 1 to 4.5 Kft max and needs<br>fiber feeder and ATM |

The first column, "Name," identifies the type of xDSL technology. Refer to the GLOSSARY to obtain the full name from the acronym. The second column, "Data Rate," is the typical maximum rate at which data transfers are accomplished for the various modes (see third column, "Mode") for each xDSL type. While ADSL, RADSL, CDSL, and VDSL are non-symmetric (the downlink CO-to-subscriber rate is usually faster than the uplink subscriber-to-CO rate), HDSL, HDSL2, SDSL, and ISDL are syrnmetric. The fourth column, "Physical," provides a brief description of the distinctive physical layer requirements or properties for each of the xDSL types.

To make DSL work at a central office, a DSL access multiplexer (DSLAM) is needed. However, current DSLAMs are limited. Although the various types of DSL technologies will be implemented, most existing DSLAMs cannot support multiple DSL technologies; that is, a given DSLAM can only support one DSL technology. This limits what the telecommunications providers are willing to do to expand DSL throughout their respective network. Given the shortage of space in central offices today, telecommunications service providers may be unwilling to purchase multiple DSLAMs for all the different types of DSLs that are available. In other cases, these telecommunications service providers may only deploy certain DSL types to be supported by the limited DSLAMs.

Compounding the problem of existing DSLAMs being tied to a particular DSL type is the fact that some existing DSLAMs are also tied to a particular modem modulation technique, either CAP or DMT. A DSLAM that is compatible with both modulation techniques would be desirable.

Another problem with existing DSLAMs is the nature of the virtual connections supported. In order for any two subscribers to communicate, a virtual connection must be set up between them. The end users and the network nodes predefine and maintain a virtual circuit and virtual path through the packet-switched mesh-type network that the end users believe to be a dedicated physically connected circuit. The actual path, however, may change due to routing around down or busy connections through the ATM/router maze-like network. Regardless of the path, the packets are transferred, in order, over a specific path and arrive at the destination in order. Two types of virtual connections are known—permanent virtual connection (PVC) and switched virtual connection (SVC). Existing DSLAMs do not support SVC because SVCs require signaling logic in the switches and end systems. Existing DSL modems, which are typically located at the end users' locations, do not support SVC signaling.

A permanent virtual connection, or PVC, is a fixed circuit that is defined in advance by a public carrier or a network manager. Thus, all data traffic between two end systems that signed up for a PVC follows a predetermined physical path that makes up the virtual circuit. PVCs have traditionally been tailored for subscription-based services and are typically maintained for a long period of time. A PVC is permanently programmed into a network for continuous use (or as long as the subscriber desires) between end users for multiple sessions. Typical applications include multiple geographically disparate LANs tied together via a PVC to create a WAN so that data traffic can be supported between users of the two LANS.

The fixed nature of the PVC circuit removes setup and disconnect overhead but takes time to initially establish because each end user and node along the path have to be configured with all the PVC parameters by the network management system (e.g., carrier), which may also involve human intervention. Typically, however, the network administrator uses a console which provides a topology of the network and the network administrator has to set the proper routing parameters node by node. This is a tedious and time-consuming process.

The physical and permanent nature of PVCs is a major drawback. If any physical transmission line among the network nodes along the preprogrammed PVC path fails (e.g., the line is physically cut), this PVC-based telecommunications service between the calling parties may not be remedied in a timely fashion.

In contrast, a switched virtual connection, or SVC, is a temporary virtual circuit that lasts as long as the session between end users lasts. If a carrier supports SVCs, it can set up and disconnect SVCs on the fly using SVC signaling. Once the communication for a particular session is complete, the virtual circuit is disconnected. Thus, alternate paths can be set up among sessions between the same two communicating end users.

While PVC is statically set up and torn down by the network management system (e.g., carrier) in a very inefficient and untimely manner, SVCs are set up and torn down dynamically by the SVC signaling equipment at the ATM end users' locations using a UNI signaling protocol. Thus, the SVC parameters are provided to the switches along the path for automatic configuration by the signaling protocols in a distributed fashion. However, as stated above, current DSLAMs do not support SVC signaling primarily because the loop side of the DSLAM is PVC-based. To provide flexibility to the telecommunications service providers, a DSLAM that supports SVC signaling even though the loop side is PVC based is needed. In effect, despite the lack of SVC signaling from the loop side, a DSLAM that can provide "proxy" signaling, i.e., logic in the DSLAM that provides signaling to other network nodes to give the appearance that SVC signaling came from the loop side, is desirable.

Another problem with existing DSLAMs is that they do not support Quality of Service. When a subscriber signs up for some telephone service at a particular Quality of Service, the telecommunications service provider physically sets up the connection. As known to those skilled in the art, Quality of Service (QoS) is a measure of the telephone service quality provided to a subscriber. With respect to ATM, QoS refers to the bundle of parameters that are associated with, at the very least, bandwidth, timing, and cell error/loss. In particular, the ATM Forum defined certain parameters in its UNI ATM Performance Parameters including bandwidth, cell error ratio, cell block ratio, cell loss ratio, cell transfer delay, mean cell transfer delay, and cell delay variability.

Another problem with existing node equipment is their undesirable blocking effect. As known to those skilled in the art, "blocking" and "non-blocking" have many definitions. The typical usage of the term "non-blocking" refers to the situation that when data at a particular bandwidth comes in to one of the input ports of the node, the output ports of the node should provide that data at the same bandwidth. In other words, the node should not block that data. Simply stated, blocking means that a call cannot be completed. Blocking usually occurs when the switching or transmission capacity is not available at that time. The blocking phenomenon typically arises because a telecommunications service provider oversubscribed its services; that is, the total number of subscribers supported by the switching equipment cannot have their full share of bandwidth and services during times of peak usage.

Understandably, no telecommunication service provider designs.its system for complete non-blocking capability. This would be too expensive as more and more sophisticated equipment and circuits are needed to provide more and more bandwidth for the given number of subscribers. The telecommunications service provider makes a trade-off decision—what is the provider (and its subscribers) prepared to pay versus what is the provider (and its subscribers) prepared to tolerate in terms of blocked calls or data? More and more telecommunications service providers are willing to make this decision in favor of higher cost to assure its subscribers a higher grade of service. Because oversubscription is a common practice in the industry, most DSLAMs provide blocking, thus eliminating all the bandwidth gains achieved while the data makes its way to these DSLAMs.

Despite these problems associated with blocking and oversubscription, most industry efforts have not been focused on prioritizing the incoming data into service requirements. As mentioned earlier, the various data received by a DSLAM may have specific service requirements (e.g., bandwidth, time synchronization) which may be affected by the blocking phenomenon. To overcome this problem, Quality of Service (QoS) could be implemented to "fairly" prioritize the various data received by the DSLAM so that some data can be serviced before other data, while at the same time, ensuring that all the data received are somehow "fairly" serviced. As known to those skilled in the art, an unexploited feature of ATM is the the ATM Forum's ATM service categories.

Five different service categories have been defined, including Constant Bit Rate (CBR), Real-Time Variable Bit Rate (rt-VBR), Non-Real-Time Variable Bit Rate (nrt-VBR), Available Bit Rate (ABR), and Unspecified Bit Rate (UBR).

CBR refers to Constant Bit Rate and it is used primarily for those types of data where end systems expect some time synchronization. CBR data requires some predictable response time and a static amount of bandwidth continuously available for the lifetime of the connection. The peak cell rate determines the bandwidth. Typical applications include video conferencing, voice telephony services, and on-demand services.

VBR refers to Variable Bit Rate. It can be either real-time (i.e., rt-VBR) or non-real-time (i.e., nrt-VBR). Real-time VBR is used for connections that transport variable bit rate traffic that relies on time synchronization between end systems. Real-time VBR is dependent on peak cell rate, sustained cell rate, and maximum burst size. Typical applications that use rt-VBR are variable rate compressed video.

Non-real-time VBR is used for connections that transport variable bit rate traffic that does not rely on time synchronization between end systems. However, nrt-VBR requires some guaranteed bandwidth or latency. Typical applications include frame relay interworking. A vast majority of current DSLAMs also do not support extensive Quality of Service (QoS). Accordingly, telecommunications service providers cannot build end-to-end ATM networks over DSL from the subscriber's premises through a carrier ATM backbone network.

ABR refers to Available Bit Rate which is used for connections that transport variable bit rate traffic for which end systems do not expect time synchronization. Beyond a minimum cell rate, the end systems also do not require guarantees of bandwidth or latency. In effect, ABR is generally designed for those traffic that are not time sensitive and expects no service guarantees (beyond minimum cell rate). Flow control mechanisms are used to dynamically adjust the amount of bandwidth available to the user. The peak cell rate determines the maximum possible bandwidth. Typical applications may include TCP/IP and other LAN-based traffic.

UBR refers to Unspecified Bit Rate is used for connections that transport variable bit rate traffic which does not rely on any time synchronization between end systems. Unlike ABR, flow control mechanisms are not used to dynamically change the available bandwidth that is available to the user. UBR is used primarily for those types of traffic that are very tolerant of delay and cell loss. Typical applications include TCP/IP and store-and-forward traffic like file transfers and email across the Internet LAN and WAN environments.

As mentioned above, a DSLAM that incorporates QoS to prioritize the various types of incoming data would be desirable. With such QoS support, a DSLAM would be better equipped to handle all the different service requirements of the incoming data.

Accordingly, a need exists in the industry for a system or method that addresses problems raised by currently known DSLAMs and ATM switches.

SUMMARY OF THE INVENTION

A whole spectrum of inventive concepts is described herein, including the macro-level network architecture (and process), to the mid-level DSLAM/ATM switch itself, and the micro-level circuit implementations. In accordance with one embodiment of the present invention, a switching system called Intelligent Multiservice Access System (IMAS) provides DSLAM and ATM functionality in one unit. The major components in the IMAS chassis include line cards and chassis switch cards. With the line cards, the IMAS can be coupled to a plurality of loop technology ports (e.g., xDSL) on one side. With the chassis switch cards, the IMAS can be coupled to a plurality of WAN ports on the telecommunications backbone side for continued connectivity to an ATM network.

On the loop side, different variations of line cards are available so that each line card can support different numbers of ports. Thus, in one embodiment, the number of ports available in each line card ranges from eight to thirty-two. Also, the number of line cards that can be installed in an IMAS ranges from one to eighteen. These numbers are, of course, exemplary and the IMAS can support other numbers of ports and line cards, such as fifty ports per line card and twenty line cards per chassis.

In addition to the plity of ports on the loop side, each IMAS can also support a plurality of different loop technologies. In one embodiment, the IMAS is a carrier class digital subscriber line (DSL) access concentrator that can support multiple DSL transmission.types. Thus, a single IMAS supports ADSL, HDSL, IDSL, and SDSL, for example. Other combinations of xDSL transmission types are supported.

On the telecommunications backbone side, each chassis switch card is, in essence, a full function standalone ATM switch implemented as a single card in the IMAS chassis. Each chassis switch card provides ATM connectivity to the line cards in the chassis. An onboard CPU subsystem contains all functionality required to manage the chassis and perform all ATM processing functions. In one embodiment, two chassis switch cards are used per chassis, with two telecommunications backbone-side ports per chassis switch card. One of the ports in each chassis switch card is in hot standby (or active backup) mode for redundancy purposes in case of failure.

As for the internal data path architecture, the IMAS provides a high capacity non-blocking switch fabric. Depending on the configuration, the IMAS provides a switch fabric for supporting at least 5 Gbps bandwidth of traffic. With this design, oversubscription issues are minimized or eliminated altogether. To illustrate, one embodiment of the present invention is an IMAS with two chassis switch cards and eighteen line cards in the chassis. Each chassis switch card has two telecommunications backbone-side ports (one of which is in active backup mode) and eighteen line card-side ports (one for each of the eighteen line cards). Each line card has two chassis switch card-side ports (a port for each of the two chassis switch cards) and eight DSL-side ports. A representative topology is shown in FIG. 5.

The non-blocking feature will now be discussed for both the downstream and upstream directions. First, the downstream direction will be discussed. In accordance with one embodiment of the present invention, the telecommunications backbone side of the chassis switch cards provides data at a format and data rates that comply with OC3, STS3, T3, or E3. Accordingly, data at bandwidths of 155 Mbps can be provided to each of the chassis switch card's telecommunications backbone-side ports. Each chassis switch card port, including the line card-side ports, supports 155 Mbps via cubit devices (i.e., Transwitch Cubit-Pro TXC-05802). Internally, the chassis switch card uses a shared bus at 640 Mbps. With this design, 155 Mbps data enters and leaves the chassis switch card uncongested in the downstream direction.

For the line cards, each line card-side chassis switch card port delivers 155 Mbps data. These ports are coupled to the two chassis switch card-side ports in each line card. With a standard UTOPIA interface, each chassis switch card-side port in the line card receives (and delivers) 155 Mbps data. A shared bus inside the line card supports 640 Mbps data. Using ADSL as an example, the framers and the ADSL modems support 8 Mbps downstream (telecommunications backbone side to DSL side) and 640 Kbps upstream (DSL side to telecommunications backbone side). In the downstream direction, 155 Mbps data is provided to the line cards and only the particular DSL technology employed limits the bandwidth.

In the upstream direction, assume that each line card having eight DSL ports are fully loaded. At 640 Kbps per ADSL line upstream, each line card receives an aggregate of 5.12 Mbps data (640 Kbps×8 ports per line card). For eighteen line cards, the aggregate bandwidth delivered to the chassis switch cards is 92.16 Mbps (5.12 Mbps×18 line cards). Each line card-side port in the chassis switch card supports 155 Mbps and the shared bus supports 640 Mbps. The output telecommunications backbone side port also supports 155 Mbps data. Thus, the 92.16 Mbps upstream data from the line cards reaches and makes its way out of the chassis switch card uncongested. As illustrated by this example, this non-blocking feature practically minimizes or eliminates oversubscription for some IMAS configurations.

In accordance with another embodiment of the present invention, the IMAS enables support for the next generation of virtual connections. Regardless of whether the communications lines coupled to the inputs and outputs of the IMAS are based on SVC, PVC, or a combination of PVC and SVC, the IMAS can support SVCs for a more flexible, timely, efficient, and manageable connection. In the more typical configuration, the loop side of the IMAS is PVC-based because the modems do not support SVC signaling, and the telecommunications backbone side is capable of supporting SVC signaling even though existing DSLAMs do not employ SVC signaling logic. In another configuration, both the loop side and.the telecommunications backbone side are PVC-based. The IMAS supports this configuration.

With SVC support, the IMAS assists the ATM network in hand crafting an SVC-based connection almost immediately between end users when the originating end user wants to make a call to a destination end user, and tear down that virtual connection almost immediately when that call has completed. As described above, PVC call set up and termination were too time consuming, cumbersome, and inefficient. Needless to say, the IMAS supports SVC signaling for call establishment and termination if both the loop side and the telecommunications backbone side are SVC based.

For these non-signaling end systems, SVCs can still be supported using the proxy signaling aspect of the present invention. The proxy signaling aspect of the present invention uses a proxy signaling agent at the IMAS to control the virtual connection/circuit setup and termination of the non-signaling ATM end system. As mentioned above, proxy signaling calls are made on behalf of xDSL associated devices (e.g., ADSL modems) at the subscriber's side because these devices currently do not support SVC signaling. The proxy signaling agent residing in the IMAS allows those PVC-supported calls directed to the OC3 uplink to be supported by SVC so that session-based virtual paths can be established as needed, without wasting valuable time for a PVC path to be established. As soon as the call (including the SVC signaling) is successful, a data connection is set up between the xDSL port at the IMAS in the central office and the OC3 uplink port. Similarly, an SVC call that had previously been established can be torn down via the same SVC signaling.

Proxy signaling calls are controlled by the proxy signaling group of an IMAS-specific MIB. As known to those skilled in the art, a MIB is a collection of managed objects that are software representations of actual physical parameters of a network device, such as the IMAS, which is used by SNMP agents to configure the device or get information from the device. The IMAS-specific MIB contains the Proxy Signaling Table, the ISP Table, and the Connect Info Table. These tables, which are shown in FIGS. 29, 30, 31, and 32, cross reference each other to make the desired SVC connections between subscribers. For example, one subscriber uses a device associated with an xDSL port (e.g., PC with modem at a small business) and the other subscriber is an ISP that provides a number of services, including Internet access. The establishment and termination of proxy signaling calls are controlled by the addition and deletion of information to these tables. The Proxy Signaling Table contains an entry for each xDSL port, VPI and VCI that is to be connected to an ISP—essentially, a call that comes in at one of the xDSL ports is destined for an ISP for which an SVC path must be set up. The ISP Table contains the ATM addresses of the ISPs that the xDSL connected devices (e.g., PC with modem) can connect with. The Connect Info Table contains information necessary to properly format the Setup message used to connect the SVC.

With the proxy signaling in place, the IMAS can use SVC signaling to dynamically negotiate with other nodes (e.g., ATM switches) in the telecommunications backbone for Quality of Service (QoS) and set up the connection. Without the SVC signaling, the system administrator would have to manually set up the path and connection that satisfy the desired QoS for that subscriber. Once negotiated, each node updates its own internal ports-to-virtual connections tables and sends back VCI numbers. When the IMAS receives a VCI number, it also updates its own internal tables so that a proper nodes-to-virtual connections mapping is provided. From this point on, the IMAS uses the negotiated VCI number and other relevant connection information for this particular call session. Once the call has completed, the proxy signaling process in the IMAS terminates the call via manipulation of these three tables.

How is the IMAS controlled and monitored? Generally, a sophisticated network management system (NMS) drives the software components of the IMAS for information collection and hardware configuration. Indeed, the NMS is also used to control and monitor other telecommunications equipment such as the various central office switches, DSLAMs, and ATM switches, besides the IMAS. Network administrators access the NMS and hence the IMAS via management consoles.

Representative tasks performed by the NMS include actively monitoring network resources for the purpose of device configuration, troubleshooting, detecting potential problems, improving performance, documentation, and reporting. The network management system performs other tasks including, but not limited to, autodiscovery of devices on the network; network topology mapping in the form of a graphic map that can be zoomed in or out; and the ability to schedule management tasks or jobs at specific times or dates. Other tasks include data backup, providing security, training users, and setting policies.

To enable the NMS to interface with a manufacturer's equipment, such as the IMAS, the NMS includes some core NMS functionality and an IMAS-specific device manager in the NMS server. This device manager is a device driver-like piece of software that is unique to the manufacturer's equipment. In one embodiment of the present invention, the device manager for the IMAS is called the IMAS device manager.

For data collection, data retrieval, and device configuration, the NMS uses the SNMP protocol and SNMP agents which are installed in various components throughout the IMAS. As known to those skilled in the art, SNMP is a simple request-response messaging protocol for setting parameters and getting information via SNMP agents to allow the NMS and the IMAS to communicate with each other. The core NMS functionality entity and the IMAS device manager in the NMS server can communicate with a master SNMP agent residing in the IMAS.

The master SNMP agent resides in the chassis of the IMAS. This master SNMP agent communicates with other sub-agents that are located in other software components of the IMAS. For example, when the NMS sends a request to obtain configuration information about line card 3, for example, the IMAS device manager delivers this request to the master SNMP agent in the IMAS. The master SNMP agent multiplexes this and other requests to the appropriate sub-agents for processing. In this example, the master SNMP agent delivers this line card 3 configuration information request to the sub-agent responsible for line card 3. This sub-agent then processes this request by delivering configuration information back to the master SNMP agent and then to the NMS server. The network administrator can produce reports based on the collected information that indicate the state of the network. SNMP agents can also generate alarms or traps that warn of problems or performance degradations on any part of the network.

These agents can only process those requests that are associated with a MIB. These MIBs are described in a MIB file which is associated with the core NMS functionality entity and the IMAS device manager to enable the NMS server to communicate with the IMAS.

The IMAS also supports end-to-end ATM over DSL. Because the IMAS is a fully compliant ATM switch that supports UNI 3.1, UNI 4.0, and PNNI 1.0 signaling, service providers can build end-to-end ATM networks over DSL from the subscriber's premise through a carrier ATM backbone network. With fully integrated call admission control (CAC) and multiple queues implementing weighted fair queueing, the telecommunications service provider can deploy high speed DSL bandwidth to various types of subscribers and guarantee Quality of Service. The IMAS concentrates and switches traffic from multiple subscribers utilizing ATM as the layer 2 protocol over the DSL access network to transparently transport layer 3 protocols such as IP and IPX.

These and other embodiments are fully discussed and illustrated in the following sections of the patent specification.

BRIEF DESCRIPTION OF THE FIGURES

The above objects and description of the present invention may be better understood with the aid of the following text and accompanying drawings.

FIG. 3 shows a chassis configuration of line cards, chassis switch cards, and system switch cards in accordance with one embodiment of the present invention.

FIG. 30 shows one embodiment of the Proxy Signaling Table used in the proxy signaling process.

FIG. 31 shows one embodiment of the ISP Table used in the proxy signaling process.

FIG. 32 shows one embodiment of the Connect Info Table used in the proxy signaling process.

Figure 1:
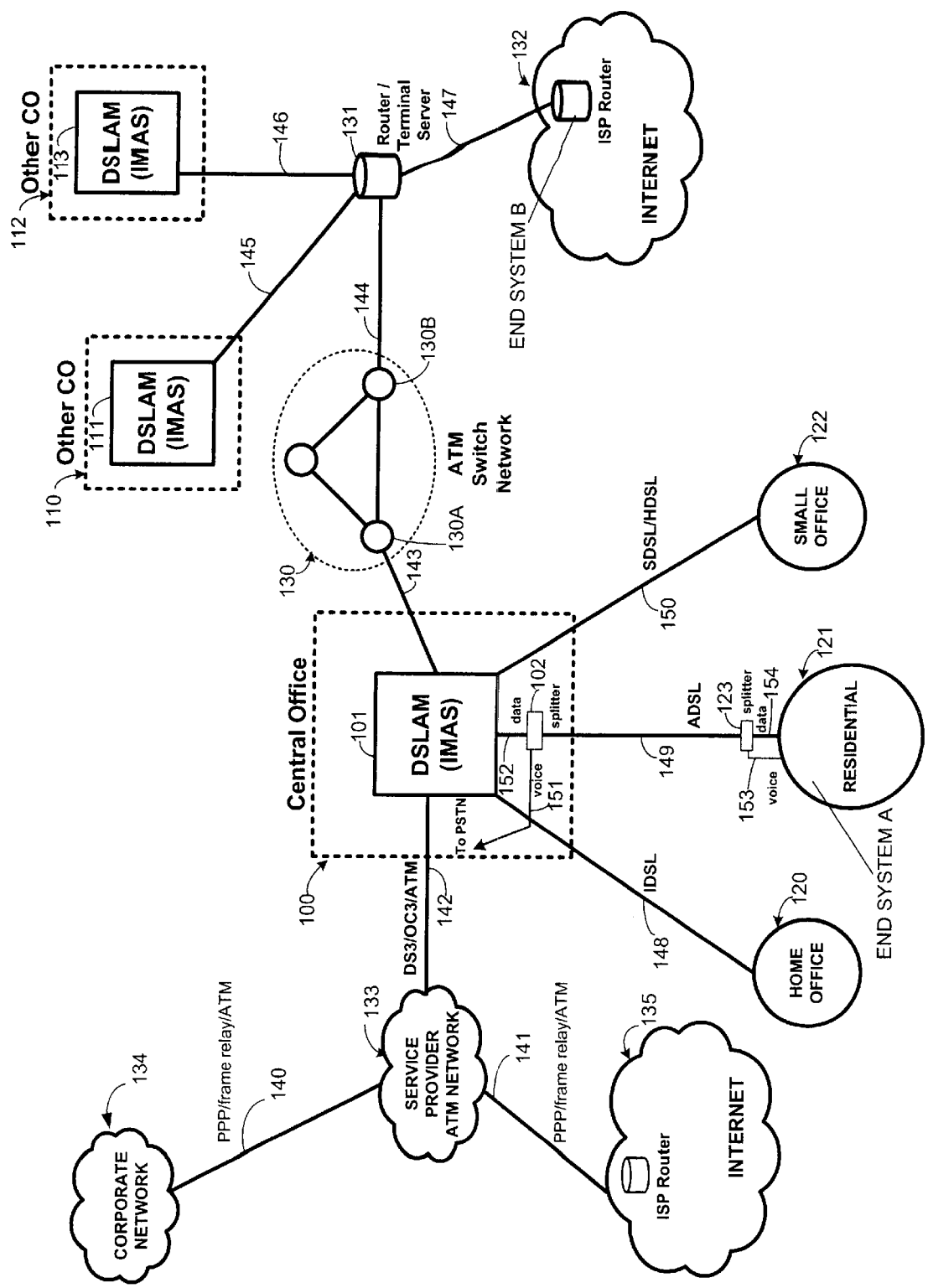
FIG. 1 illustrates a telecommunications network from the subscribers to the telecommunications backbone. The Intelligent Multiservice Access System (IMAS) is also shown at a central office location.

These figures will be used to describe the various embodiments of the present invention in the accompanying text provided below.

DETAILED DESCRIPTION OF PREFERRED EMBODIMENTS

This patent specification is divided into five main sections:
I. DEFINITIONS
II. SYSTEM ARCHITECTURE
III. HARDWARE
IV. SOFTWARE
V. GLOSSARY OF ACRONYMS A short preface which provides some general definitions precedes the SYSTEM ARCHITECTURE section and a GLOSSARY OF ACRONYMS follows the SOFTWARE section. This organization is intended to enhance the readability and understanding of the various embodiments of the present invention, rather than limiting the scope of the present invention. The various embodiments of the present invention encompass the whole spectrum of inventive concepts described herein, including the macro-level network architecture (and process), to the mid-level DSLAM itself, and the micro-level circuit implementations.

I. DEFINITIONS

Although definitions of particular terms will be provided during the course of the patent specification, certain terms are worth mentioning at the outset because of their use throughout the document.

The telecommunications industry is replete with numerous acronyms that may be unfamiliar to the reader. Although most of these. acronyms are standard in the industry and thus are well known to those skilled in the art, some are unique to this specification. Still other acronyms are colloquial in nature. The GLOSSARY located near the end of this specification (immediately preceding the CLAIMS section) should assist the reader in identifying these acronyms.

Some terminology will be defined in the body of this specification. In particular, the specification uses the terms "wire," "wire line," "wire/bus line," "line," and "bus." These terms refer to various electrically conducting lines. Each line may be a single wire between two points or several wires between points. These terms are interchangeable in that a "wire" may comprise one or more conducting lines and a "bus" may also comprise one or more conducting lines. A "line" may also refer to an interface between two software entities, or between a software entity and a hardware/software boundary interface.

Another term that is worth noting is "switch fabric," "switching fabric," "switch core," or "switching core." These terms are all synonymous and their specific meaning is dependent on the context. For example, the switch fabric in the chassis switch card, as explained below, is a 32-bit bus at 20 MHz for a bandwidth of 640 Mbps. The switch fabric of the backplane which includes the interconnecting star-like configuration of thirty-six CSC-to-LIU lines from two chassis switch cards and eighteen line cards has a bandwidth of approximately 5 Gbps. Each line card also has a switch fabric of a 32-bit bus running at 20 MHz for a bandwidth of 640 Mbps.

"Telecommunications backbone" is a term usually used in the context of the side a particular line or port is directed towards. If the port is directed toward the WAN side, WAN ports, other ATM switches, routers, or the Internet side, it is on the "telecommunications backbone side." If the port is directed toward the subscribers or loop access technology side, it usually characterized as being on the DSL side or loop side. Again the context clarifies the usage. Other times, specific IMAS components are used to indicate the interface; that is, CSC side or LIU side.

"Data" is a term that is used to denote a particular protocol data unit (PDU). For the ATM, data refers to an ATM cell. For frame-based technology, data refers to a frame. Also, depending on the context, data can refer to any piece of data such as a single byte in the 53-byte ATM cell.

In the SOFTWARE section, one term that is used often is "software entity," "SE," or simply "entity." Essentially, each of these terms represents a component of the software architecture that possesses a unique character or function at varying levels of abstraction. A high level software entity may include other lower level software entities which, together, share some common features. For example, at a high level, a single software entity designated as "IMAS SE" can represent all the software functionality of the IMAS chassis. At a lower level, the IMAS SE can be broken down into a plurality of software entities, where each entity performs a specialized task, such as line card control, SNMP agent, proxy signaling, ILMI, and PNNI.

A software entity (SE) is represented in the drawings by a block or box. A software entity in the system has a well-defined interface through which it interacts with other software entities. In this sense, each software entity has a Service User-Service Provider relationship to the interfacing software entities. The abbreviations that will be used periodically are provided in the GLOSSARY in the section immediately preceding the claims.

II. SYSTEM ARCHITECTURE

At the network level, one embodiment of the present invention provides Quality of Service and communication resources among end systems via flexible virtual connections. Within a telecommunications network, several nodes are provided. These nodes can be ATM switches. At the edge of the network are edge devices, such as DSLAMs if the loop technology is xDSL-based. For the most part, the virtual connections among the nodes are PVC, primarily because the subscriber's equipment does not support SVC and SVC signaling. Accordingly, these existing DSLAMs also do not support SVC. However, soine ATM switches support SVC and SVC signaling, although they are not widely utilized.

In accordance with one embodiment of the present invention, a DSLAM is provided which supports PVC, proxy SVC signaling, and SVC signaling. With PVC support, this DSLAM can operate with existing PVC loop infrastructure so that a subscriber can communicate with an ISP, for example. So, if the subscriber's equipment does not support SVC signaling, this DSLAM is still operational in the conventional PVC manner. With proxy SVC support, this DSLAM can be coupled to a PVC line on the subscriber side and SVC on the telecommunications backbone side. Because the subscriber's equipment does not support SVC, the DSLAM establishes the connection (and terminates connections) using SVC signaling on behalf of the PVC-supported subscriber. Finally, with SVC support, the DSLAM can provide SVC signaling to dynamically establish and terminate calls, with all the associated benefits of an SVC connection.

With SVC and proxy SVC support, the DSLAM is capable of dynamically communicating with other network nodes to establish and terminate connections on the fly. As part of the communication, the DSLAM can negotiate with other ATM switches for connection set-up and Quality of Service. If the ATM switch cannot provide the desired Quality of Service for the subscriber, the DSLAM selects another virtual path and circuit to an ATM switch that can provide the desired Quality of Service.

This DSLAM contains a chassis switch card (CSC) portion and a line card (LIU) portion. The CSC is located between the telecommunications backbone and the LIU, while the LIU is located between the CSC and the DSL-based lines to the subscribers. Once the data arrives into the DSLAM, the data is not blocked. In particular, in the downstream direction, the no blocking exists in the CSC until it arrives at the LIUs. Similarly, in the upstream direction, the DSLAM can be designed so that no blocking exists in the CSC after it leaves the LIUs.

In the LIU, some speed matching operation is necessary because DSL supports a lower bandwidth than the CSC and the telecommunications backbone. Once the data arrives into the LIUs in the DSLAMs, whether downstream from the telecommunications backbone or upstream from the subscribers via the DSL lines, the DSLAM handles the data based on a priority scheme, called priority queueing mechanism, in accordance with one embodiment of the present invention.

The priority queueing mechanism uses a combination of round robin and weighted fair queueing to resolve data access and bus contention issues by prioritizing which data will be handled and in what order. This prioritization is based on whether the data flow is downstream or upstream and whether the data is directed toward or away from the set of weighted queues in the line cards. Among subscribers, the priority queueing mechanism ensures equal access to the DSLAM's communication resources; that is, the arbiter in the line card uses round robin to process data at all the ports, one port at a time. Once data has been processed in one port, the arbiter moves on to the next port to handle the data associated with this next port, and so on for all the port.

For a given subscriber (or port), the priority queueing mechanism ensures some sort of fairness among the different types of data that are being accessed. Because each type of data may have different Quality of Service requirements (streaming video or audio v. static image), the DSLAM services each type of data in accordance with their respective service requirements. Some data will be serviced more frequently than others, but in accordance with the fairness aspect of the algorithm, all data will be serviced at some point.

The following discussion provides some background on the telecommunications network and the various protocols and nodes that exist. Several embodiments of the present invention will be discussed in the context of this network discussion.

TELECOMMUNICATIONS BACKBONE AND SUBSCRIBERS

One example of a data communication network is shown in FIG. 1. FIG. 1 does not show the traditional Public Switched Telephone Network (PSTN) at all although some components in this figure are used in the transmission of traditional voice that will eventually run along the PSTN infrastructure. In the data communication network shown in FIG. 1, however, any number of end systems (or end users or end points) can communicate with each other via prearranged protocols as soon as communication resources are allocated to them. Except for the portion of the figure that shows one embodiment of the present invention, namely the Intelligent Multiservice Access System (IMAS) 101 in a central office (CO) 100, most of the network components should be familiar to those skilled in the art. Within this network, a user could use a computer and a modem to send an email to another user for data communication. Additionally, the user could use a computer and a modem to access any number of Web pages on the Internet. Depending on the type of data (e.g., text, graphics, audio, video), bandwidth (and Quality of Service) requirements will vary.

Briefly, the communication network shown in FIG. 1 allows many different types of end systems to communicate with each other at varying levels of Quality of Service. Many end systems can be traditional hardware communication devices (e.g., telephones, modems, facsimile machines) and computing systems (e.g., personal computers, terminals, network servers). Applications that run on these computing systems such as email, Web browsers, Web servers, and community-based on-line services (e.g., AOL, CompuServe, Prodigy) are also end systems. An end system can include any combination of these traditional communication devices, computing systems, and applications. In one embodiment, one end system is a subscriber with a computer and modem, while another end system is an ISP.

At one high level, typical end systems are home offices 120, a private residence 121, and small offices 122. These end systems usually have the traditional communication devices such as voice telephones and facsimile machines, as well as computing systems such as the personal computer. The personal computer probably runs various communication-related applications such as email and a Web browser for Internet access. In some end systems, particularly the small office, several computers may exist either in a standalone or network configuration. Other end systems include the corporate network 134, the Internet 135 (and also shown as Internet 132 with an Internet Service Provider (ISP) router). Note that Internet 135 and Internet 132 are part of the same Internet.

The corporate network 134 is typically a corporation/company (e.g., ABC Corporation) of varying sizes, a government agency, or some on-line service provider (e.g., AOL, DIALOG, LEXIS/NEXIS). The corporate network 134 is usually implemented as a local area network (LAN) for intra-building or intra-campus communication. Where the corporate network 134 extends to multiple buildings or multiple campuses in different geographic locations, the corporate network 134 can be implemented as a wide area network (WAN) for inter-building or inter-campus communication that extends the individual LANs via common telephone carrier lines. These lines are usually leased lines. These WANs typically employ bridges or routers to enable the communication over the common carrier lines. Usually, only authorized people such as members or employees of these corporate networks 134 have access to the various information and functionality provided by these corporate networks. Unauthorized people generally do not have access to the entire panoply of services provided by a corporate network 134. However, unauthorized people have limited access to these corporate networks 134 via telephone, facsimile, and email. Although the corporate network in FIG. 1 is shown as a single cloud separate, it actually uses resources provided by the telephone company such that dedicated lines run through the central office(s) to interconnect one portion of the corporate network to another portion. Indeed, in FIG. 1, one portion of the corporate network is located on one side of central office 110 using dedicated leased lines that run through central office 110 and the other portion of the corporate network is located on the other side of central office 110 using another set of dedicated leased lines to/from the central office 110.

Other end systems can be central offices 100, 110, and 112. Although these central offices are typically means by which a communication resource can be allocated among end systems, central offices also house some functional devices that need to communicate with other functional devices.

This telecommunications network includes some network nodes. Exemplary network nodes include a central offices 100, 110, and 112, ATM switches 130, router/terminal server 131, Service Provider ATM network 133, and even the ISP routers in Internet "clouds" 132 and 135 can be characterized as network nodes.

Routers, in the form of ISP routers, are also provided. Companies or even individuals who want to set up web sites may use an ISP. The ISPs may either host the web site on their own computers or provide all the connections for web servers located at the companies' or individuals' premises. For example, the corporate network 134 in FIG. 1 may connect to the Internet 135 over line 140 which may be leased lines such as T1 lines or T3 lines, depending on the bandwidth requirements. Other lines may be ISDN. Still other lines may be a combination of leased lines and microwave links, where portions of the line may not be readily accessible via land lines.

ISPs via the ISP routers are essentially the gatekeepers to the Internet 132, 135. ISPs are organized into local, regional, national, and global ISPs. Access to the Internet is accomplished by dialing up to an access server at the ISP, which then communicates with an ISP router via a Point-to-Point Protocol (PPP) to encapsulate and deliver IP packets. The router forwards these IP packets to the Internet. As known to those skilled in the art, PPP is a serial protocol which allows a computer to connect as a TCP/IP host to a network through an asynchronous port. PPP, which includes error detection and data protection, provides router-to-router and host-to-network connections over both synchronous and asynchronous circuits.

LOOP TECHNOLOGY

In FIG. 1, home office 120, residence 121, and small office 122 are coupled to the central office via lines 148, 149, and 150, respectively. These lines 148, 149, and 150 are simply, for example, two-wire twisted pair copper wire. As explained above in the BACKGROUND section, the sophisticated nature of today's data (e.g., video, audio) has rendered traditional loop technologies nearly unacceptable for Internet access. Despite competition from Cable (CATV) Data Networks and Modems and ISDN, DSL appears to be the front runner for the broadest application across the telephone companies' residential and small business subscriber base. However, DSL may not eliminate other technologies (e.g., T1, T3, ISDN, and cable modem) as the various telephone companies will make these technologies available to those who want them and can afford them. Various DSL technologies are available, as listed above in TABLE A.

In one example of the DSL implementation shown in FIG. 1, the line 148 between the home office 120 and the central office 100 is IDSL, the line 149 between the residence 121 and the central office 100 is ADSL, and the line 150 between the small office 122 and the central office 100 is SDSL or HDSL. For the ADSL line 149, a splitter 123 is needed at the residence 121 to separate voice traffic on line 153 and data traffic on line 154. The voice traffic line 153 interfaces with the existing analog/voice equipment such as telephones. The data traffic line 154 interfaces with a personal computer or local area network (LAN) via an ADSL modem (not shown in FIG. 1).

The central office 100 also needs a splitter 102 to separate the voice traffic on line 151 and data traffic on line 152. The voice traffic on line 151 interfaces with the PSTN voice/circuit switch. The data traffic on line 152 interfaces with an IP router or ATM switch via an ADSL modem (not shown in FIG. 1). The IP router or ATM switch allows access to the Internet/Intranet.

THE IMAS

Typically, to make DSL work at the central office 100, a DSL access multiplexer (DSLAM) is needed. In accordance with one embodiment of the present invention, an Intelligent Muliservice Access System (IMAS) 101 provides DSLAM functionality and is provided at the central office 100. As explained later, the IMAS also contains ATM switch functionality. Other IMAS 111 and 113 are provided at central offices 110 and 112, respectively. The IMAS 101, for example, is one form of a flexible and multifunctional DSLAM that links the subscriber side of the network (via the multiple xDSLs) with the telecommunications service side of the network such as the Internet, video servers, LANs, and WANs, via IP routers, ATM switches, and other broadband devices. One embodiment of the IMAS 101 will be provided later in the specification.

As indicated above, the IMAS 101 interfaces the subscribers to the various services. These various services are provided via ATM switches and IP/ISP routers. An ATM switch network 130 is representative of a public ATM network that regional and long distance telephone companies provide. For data traffic, these ATM switches can be installed among central offices and routers/terminal servers 131. Service Provider ATM network 133 is representative of a private ATM network. These private ATM networks like ATM network 133 can be installed among corporate networks 134, the Internet 135, and a central office 130.

The IMAS 101 in central office 100 is coupled to the Service Provider ATM Network 133 via line 142. The physical layer standard used on line 142 to deliver ATM traffic can be DS3/OC3. DS3 refers to the digital signal heirarchy level 3 which is a T3 equivalent 44.736 Mbps and 672 channels of 64 Kbps per channel (or 28 1.544 Mbps DS1 channels). OC3 is the third level Optical Carrier digital heirarchy of the SONET standard, which defines how digital signals are multiplexed on fiber-optic cable. OC3 allows 155.52 Mbps data rate and 2,016 DS0 channels (DS0 is a single 64 Kbps channel), or conversely, 84 DS1s (24 channels of 64 Kbps each) or 3 DS3 channels. The same principle applies to lines 143, 144, 145, and 146.

ATM CONNECTION AND NEGOTIATION

How is a connection established between end systems (e.g., home PC and website server)? An ATM virtual connection (VC) must be established between these two end systems. The virtual connection is identified by a combination of VPI and VCI. All traffic through the IMAS is routed by virtue of their respective ATM header field which contains a VPI/VCI connection identifier. The Virtual Path Identifier (VPI) is a 16-bit field in the ATM cell header which indicates the virtual path over which the cell should be routed from the transmitting device to the target device. The Virtual Channel Identifier (VCI) is a 16-bit field identifying the virtual circuit which an ATM cell should travel from the transmitting device to the target device. The combination of the VPI and VCI identifies the connection between two end systems in an ATM network. The ATM switch on the network side of the UNI assigns the values to the VPI and VCI during the connection setup.

As shown in FIG. 1, end system A (e.g., home PC) sends a message to the ATM network to request a bidirectional connection to end system B (e.g., ISP server) with sufficient bandwidth and Quality of Service (QoS) guarantees. Note that a discussion of issues not related to ATM negotiation will not be provided in this subsection (e.g., splitter and modem operation for ADSL line1 49). Signaling messages in the form of setup, tear down, and modify connections are used for call control. A signaling VC, which was set up a priori when end system A was first installed, is used to send the signaling message.

Through various negotiations among the nodes (e.g., ATM switches, routers) in the path between end system A and end system B, a VC is finally set up and the negotiated VCIs are delivered back to all the nodes for future use. These negotiated VCIs are unique to each node locally, not unique throughout the ATM network. For example, end system B finally sends back a VCI number. The ATM node connected to end system B also performs some internal mapping and sends another VCI number back to another ATM node in the path. For example, ATM switch 130B sends a VCI number (e.g., VCI=12) back to ATM switch 130A. ATM switch 130A then maps this VCI number (VCI=12), which it designates as the output VCI for this call, to its output port (toward ATM switch 130B). For its input port, ATM switch 130A generates an input VCI number (e.g., VCI=41) and maps it to one of its input ports. ATM switch 130A then sends this input VCI number (VCI=41) back to the IMAS 101. The IMAS 101 maps this VCI number (VCI=41), which it designates as its output VCI for this call, to its output port (toward ATM switch 130A). The IMAS generates its own VCI number (e.g., VCI=29) and maps it to the input port that is coupled to end system A. The IMAS 101 then sends this VCI number (VCI=29) back to end system A for future use.

Now that end system A knows the VCI number (VCI=29) for this call, it uses this number (VCI=29) for all ATM cells associated with this call connection. Thus, end system A sends an ATM cell with VCI=29. The IMAS has its own updated table that maps VCIs to ports so when it receives this ATM cell, it looks up the VCI number and directs this ATM cell to the previously mapped output port. This output port in the IMAS 101 is associated with VCI=41. The IMAS 101 changes the VCI number in the ATM header and sends the ATM cell with VCI=41 to the designated output port to ATM switch 130A. ATM switch 130A performs the same functions as IMAS 101 as far as this table lookup and translation are concerned, and sends the ATM cell with VCI=12 to ATM switch 130B. Through this VCI mapping and conversion, the ATM cell ultimately reaches end system B. End system B can also send messages back to end system A in a similar manner.

PROXY SIGNALING

Figure 2:
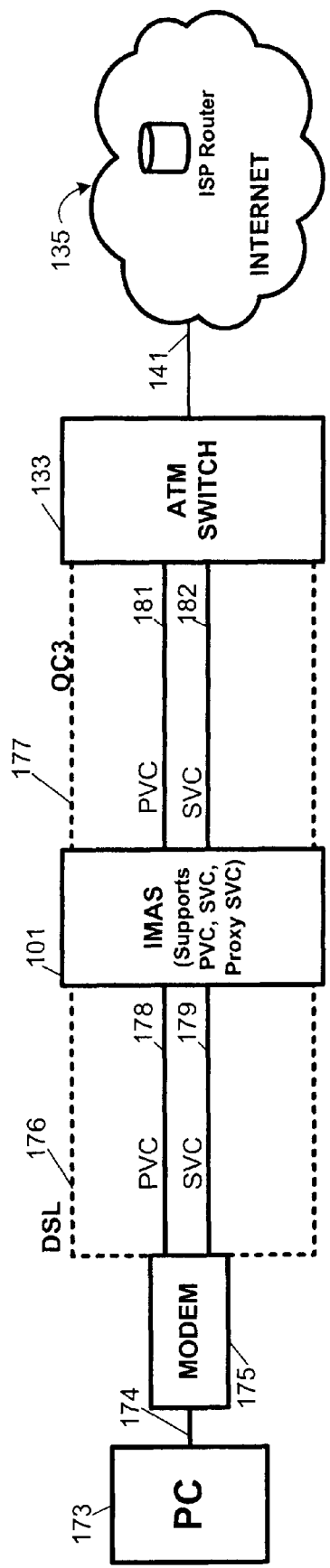
FIG. 2 shows a high level view of the proxy signaling aspect of the present invention in which the PVC, SVC, and proxy SVC logical lines are shown.

FIG. 2 shows a high level view of the proxy signaling aspect of the present invention. The IMAS 101 is provided between the subscriber's computer 173 and an ATM switch 133 (in the telecommunications backbone), which ultimately allows access to the full suite of services provided by the Internet 135. It is worth noting that the IMAS 101 is also an ATM switch that allows direct connectivity with subscribers. The PC 173 interfaces with the DSL line 176 via a modem 175 and line 174. If the line 176 was an ADSL line, the modem 175 would be an ADSL modem. The line 177 between the IMAS 101 and the ATM switch 133 is a DS3/OC3/ATM line.

In one embodiment of the present invention, the IMAS 101 supports permanent virtual connections (PVC) and switched virtual connections (SVC) on the subscriber side e.g., DSL) and the telecommunications backbone side (e.g., DS3/OC3/ATM). For communication between end systems to be accomplished, the end systems and the network nodes predefine and maintain a virtual circuit and virtual path, as explained above, through the packet-switched mesh-type network that the end systems believe to be a dedicated physically connected circuit. The actual path, however, may change due to routing around down or busy connections through the ATM/router mesh-like network. Regardless of the path, the packets are transferred, in order, over a specific path and arrive at the destination in order.

As described in the background of the invention section, a permanent virtual connection (PVC) is a fixed circuit that is defined in advance by a public carrier or a network manager. Thus, all traffic between two end systems that uses a PVC-based circuit follows a predetermined physical path that makes up the virtual circuit. A PVC is permanently programmed into a network for continuous use (or as long as the subscriber desires) between end systems for multiple sessions. In contrast, a switched virtual connection (SVC) is a temporary virtual circuit that lasts as long as the session between end systems lasts. The carrier sets up and disconnects SVCs on the fly. While PVC is statically set up and torn down by the network management system (e.g., carrier) in a non-timely fashion (i.e., hours or days may pass before the connection is established), SVCs are set up and torn down dynamically by the ATM end systems using a UNI signaling protocol. Thus, the SVC parameters are provided to the switches along the path for automatic configuration by the signaling protocols in a distributed fashion.

Returning to FIG. 2, the IMAS 101 can support PVC on line 178 and SVC on line 179 on the DSL side 176 of the network. On the DS3/OC3/ATM side 177, the IMAS 101 can support PVC on line 181 and SVC on line 182. Thus, the IMAS 101 can be used in the traditional manner by coupling a PVC line 178 to another PVC line 181. Alternatively, the IMAS 101 can be used in the manner contemplated in the future by coupling an SVC line 179 to another SVC line 182.

Last, but not least, the IMAS 101 can be used to automatically translate PVC lines 178 to SVC lines 182 via the SVC proxy signaling scheme in accordance with one embodiment of the present invention.

The SVC lines 179, 182 and PVC lines 178, 181 do not separately exist; rather, a separate logic (not shown in FIG. 2) is provided in the IMAS 101 and the network management system (not shown in FIG. 2) is provided to perform the PVC-to-SVC and SVC-to-SVC translation. These lines are drawn separately in FIG. 2 for instructional purposes. At one level, these lines are separate logical lines, not physical lines.

III. HARDWARE

The hardware portion of the IMAS will now discussed. The abbreviations that will be used periodically are provided in the GLOSSARY in the section immediately preceding the claims. The reader should be aware that this HARDWARE section will include some software discussion to facilitate the teaching of the present invention. Delaying this software discussion until the SOFTWARE section may deprive the reader of context.

GENERAL

In one embodiment of the present invention, the Intelligent Multiservice Access System (IMAS) is a carrier class DSL/ATM access switch that is typically located in the central office (CO). The IMAS includes integrated end-to-end ATM switching, Internet Protocol (IP) functionality, full Quality of Service support, Java-based network management, and high capacity multi-port xDSL line cards. The IMAS is designed.with modularity in mind so that it is highly scalable; that is, the IMAS enables the deployment of varying numbers of DSL ports and chassis's. Thus, depending on the configuration, the multiple chassis's allow redundancy and can support more ports for higher capacity. The line cards in the IMAS can support thousands of ports collectively.

The IMAS supports the various xDSL technology family (e.g., HDSL, ADSL, SDSL). This support is possible from a single shelf, which may include redundant ATM switch engine cards. In one embodiment, multiple shelves are interconnected via high speed ATM links or connected directly to the WAN using DS3, OC-3C, or OC-12C interfaces.

The IMAS also supports full end-to-end implementation of ATM between a subscriber (e.g., home user with a PC) and an Internet ISP provider with user control of the ATM signaling and Quality of Service support. With the IMAS, the telecommunications service provider (e.g., RBOC) has the choice of implementing permanent virtual connections (PVC), switched virtual connections (SVC), or the proxy SVC, which is a combination of both PVC and SVC. In one embodiment of the proxy SVC scheme and architecture, signaling logic is provided in the IMAS (and supported by the Network Management System via the IMAS device module) that allows the non-signaled call from a PVC supported connection to be "converted" to a signaled SVC connection so that the telecommunications service provider can flexibly and quickly deploy virtual connections as necessary on the fly.

In one embodiment of the present invention, the IMAS includes a high performance ATM switch core/fabric, multiple xDSL line cards, and a network management software system (NMS). The NMS portion of the IMAS is discussed in the SOFTWARE section of this patent specification. For the hardware portion, IMAS includes the following basic components:

(1) Chassis,
(2) Chassis Switch Cards,
(3) System Switch Cards,
(4) xDSL line cards The IMAS is designed for high capacity. In order to accommodate a large number of subscribers, the IMAS can support many ports per line card, many line cards per chassis, and many chassis per system. In one embodiment of the present invention, all of the above cards are housed in the chassis. In other embodiments, the system switch card is omitted which leaves some additional slots free for other cards. The thrust of these basic components is to deliver data traffic between the ATM backbone network (i.e., WAN, Internet) and the thousands (e.g., 4,000 ports) of xDSL ports linked to subscribers at a very high speed to adequately support the various high bandwidth-intensive traffic (e.g., Internet access, video services, audio services).

All traffic among the chassis switch cards, the system switch cards, and the line cards are based on ATM cells, with full duplex rates of at least 155 Mbps. Accordingly, the chassis switch card can be viewed as an ATM multiplexer and the system switch card as an ATM switch. The traffic across the DSL ports may or may not be ATM.

All traffic through the IMAS is routed by virtue of their respective ATM header field which contains a VPI/VCI connection identifier. The combination of the VPI and VCI identifies the connection between two end systems in an ATM network. The ATM switch on the network side of the UNI assigns the values to the VPI and VCI during the connection setup.

These fields are used to deliver point-to-point and point-to-multipoint traffic. The number of VPI/VCI connections supported by the IMAS is dependent on the resources available from the cards in the IMAS. In one embodiment of the present invention, 4,096 VPI/VCIs are available for the ports. If equitably distributed among eight ports, each port is associated with 512 VPI/VCIs (4,096/8=512). If equitably distributed among 32 ports, each port is associated with 128 VPI/VCIs.

The chassis switch card in the IMAS has the ability to switch VPs, switch VCs, terminate VPs, and generate VPs. ATM cells can be switched to any output port based on a lookup process. They can also be replicate many output ports to perform point-to-multipoint operations. Cells may be routed to and from the CPU subsystem based on their respective VP/VC number or alternatively, special cell types (e.g., payload type field, resource management cells, and OAM cells).

CHASSIS BASICS

Referring now to FIG. 3, the IMAS includes a chassis 30 in accordance with one embodiment of the present invention. This NEBS-compliant chassis 30 houses the various cards on the upper section and a components tray in the lower section. The chassis 30 houses two chassis switch cards (CSC) 10 and 11, two system switch cards (SSC) 9 and 12, several line cards (LIU) 1–8 and 13–20, and a fan and power supply tray 23, which houses the fan and power supply. These cards and tray are installed in designated slots. Although not shown in FIG. 3, the upper section of the chassis contains a line card connector that serves as the physical connection between the copper loop termination and the IMAS DSL line card.

The particular quantity of cards can be varied depending on system configuration and user desirability. In this particular embodiment of FIG. 3, two chassis switch cards, two system switch cards, and sixteen line cards are shown. In some embodiments, a 19-inch chassis comes with 14 slots for line cards, fans, backplane, and 2 chassis switch cards, and 2 system switch cards. In another embodiment, a 23-inch chassis comes with 16 slots for line cards; fans, backplane, and 2 chassis switch cards and 2 system switch cards. In still.other embodiments, the chassis does not come with system switch cards, thus allowing two slots to be available for two more line cards. The hardware configuration variations are numerous.

All cards are hot-swappable. Thus, in the event of failure, all cards can be inserted and removed while power is still applied to the IMAS without disrupting traffic paths on other cards.

CHASSIS SWITCH CARDS

The chassis switch cards 10 and 11 provide ATM connectivity to the line cards and interfaces to multiple Wide Area Networks (WAN) and Local Area Networks (LAN). Essentially, the chassis switch card provides ATM uplink interface(s) to the telecommunications backbone and ATM downlink interface(s) to line cards. For the uplink interface, the chassis switch card provides connectivity to various protocol complying with OC3-C, STS-3, T3, E3, and the like. In one embodiment, each chassis switch card provides the capability to aggregate all upstream traffic into an ATM data stream, and to direct all downstream traffic to appropriate line cards, and hence subscriber ports. The chassis switch card cannot, however, direct traffic to other chassis switch cards. In one embodiment, only the system switch card can direct traffic between the telecommunications backbone and the chassis switch card.

The chassis switch card, for example CSC 10, is a full function standalone ATM switch implemented as a single card set in the IMAS chassis. The chassis switch card contains a 640 Mbps ATM switching fabric, or a total of 1.2 Gbps for two cards. The chassis switch card resides in the middle section of the card slots within the chassis 30. The chassis switch cards are connected to the IMAS backplane to interconnect with the DSL line cards.

When a single chassis switch card is provided, it is used in a normal operational state. When two chassis switch cards are provided, one card is maintained in a normal operational mode while the other is in active backup mode. For the dual chassis switch card implementation, the DSL line card traffic will be handled by both chassis switch cards on a load sharing basis. In other words, half of the line cards will be controlled by one chassis switch card (e.g., CSC 10) while the other half of the line cards will be controlled by the other chassis switch card (e.g., CSC 11). In the event of a chassis switch card failure, the operational chassis switch card will take over the functions that the failed chassis switch card performed in the system.

As discussed later, the chassis switch card contains a PowerPC microprocessor for providing all the control and processing functions of the IMAS. These functions include configuration, control, diagnostics, event/statistics collection, signaling protocols, and environmental monitoring/control. The chassis switch card automatically inventories the contents of the chassis in which it is physically installed by reading the serial numbers of all the major components including the backplane, the power backplane, power supplies, their own (CSC) serial numbers, the system switch card serial numbers, and the line card serial numbers.

Upon completing the inventory and determining the types and quantities of the components within its chassis, the chassis switch card continues to monitor the following: status of any CSC cards (including itself); system voltage and power supplies; temperature of line cards; status of all individual modem ports; status of WAN or LAN external telecommunications backbone ports; status of line cards; fans angeneration of alarms; and status of all system switch cards.

SYSTEM SWITCH CARDS

The system switch cards 9 and 12 generally bring more a large number of lines (and hence, bandwidth) into the IMAS. In a single chassis system, the system switch cards can provide access to higher bandwidth resources (e.g., OC 12) for the IMAS. In a multiple chassis system, the system switch cards provide connectivity between the multiple chassis's and the WAN. When the system switch cards are not used, the slots where the system switch cards 9 and 12 are normally inserted can either be empty or populated by line cards.

The system switch card is also a full function standalone ATM switch implemented as a single card set in the IMAS chassis. Each system switch card contains a 5 Gbps switching fabric, therefore, in dual SSC configurations, the two system switch cards provide a 10 Gbps IMAS switch. Similar to the CSC, the system switch card is also designed with multiple WAN interfaces.

In one embodiment, the system switch card provides 4 ports per card, but this can be expanded to 8 ports per card using an SSC ATM adaptor module. These original 4 ports are OC-3C multi-mode (MM) fiber ATM ports. These ports can be used for attachment to a WAN or to the chassis switch cards resident in other IMAS's chassis. The additional expansion 4 ports can be OC-3C (155 Mbps) independent ports in order to add an additional chasssis or connect to a WAN. Alternatively, two. of the ports could be OC-3C with auto protection circuitry (full APS, one primary and one backup). Still another alternative is a single OC-12C (622 Mbps) port.

LINE CARDS

The line cards 1–8 and 13–20 terminate xDSL traffic into the IMAS. In the downstream direction, these DSL line cards contain DSL modems that transport ATM cells received from the chassis switch cards to the output ports, or alternatively, convert ATM cells into frames for delivery to the subscribers. Line cards also contain traffic management functions for Quality of Service (QoS). Each DSL line card is connected to the chassis switch card using a dedicated 155 Mbps backplane bus in one embodiment where cubit devices are utilized.

Currently, several ADSL modulation schemes are used—Discrete Multi-Tone modulation (DMT) and Carrier Amplitude Phase modulation (CAP). In accordance with one embodiment of the present invention, the cards 1–8 and 13–20 support either modulation scheme. In one embodiment, each DMT line card supports eight (8) full rate DMT modems operating the ADI chipset. Each CAP line card supports sixteen (16) full rate CAP modems operating the Globespan chipset.

For SDSL and IDSL, the modulation scheme is 2B1Q. The IMAS supports both of these xDSL technologies and the 2B1Q modulation scheme. Generally, each line card, regardless of modulation scheme, can operate each port at full data rate, can be connected to two dedicated busses for full redundancy, and supports up to four classes of QoS per port.

POWER SUPPLY AND FAN TRAY

Figure 4:
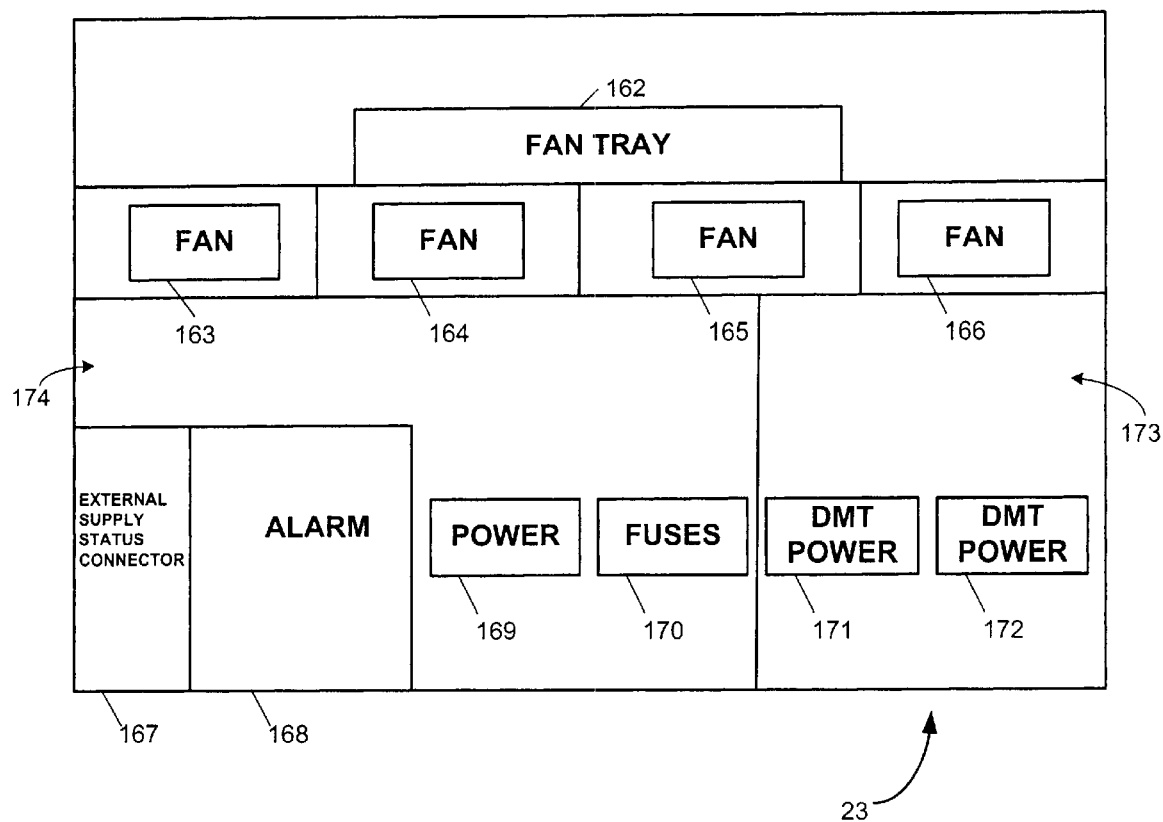
FIG. 4 shows the fan and power supply sections of the chassis in the IMAS.

As the name suggests, the power supply and fan tray 23 houses the power supply and fan circuits and fans. The fan tray 23 sits directly below the card housing. Referring now to FIG. 4, the fan and power supply tray 23 includes a fan tray 162, a power supply section 173, and external supply status connector 167.

In one embodiment of the present invention, the fan tray 162 supports four 4.5-inch fans 163–166 in the 23-inch chassis configuration. In another embodiment, the fan tray 162 supports three 4.5-inch fans in the 19-inch chassis configuration.

The power supply section 173 is located in the lower right of the fan and power supply tray 23. This section 173 contains two cards 171 and 172 that provide 15-V power supply.

The power supply section 174 is located in the lower left of the fan and power supply tray 23. This section 174 contains an external supply status connector, an alarm logic 168, 48-V power supply connectors 169, and fuses 170.

CLOCKS

In one embodiment, the IMAS uses a distributed clock system. Individual clock generation exists on each card. The CSC contains a 20 MHz clock and each line card contains an additional 20 MHz clock for delivery on the UTOPIA lines to the line cards. With this UTOPIA interface clock, the CSC and line cards communicate asynchronously. This scheme allows for flexibility in the individual card design goals.

BACKPLANE

The backplane supports a number of different interfaces between cards as well as the power supply to each. The point-to-point data links provide connectivity from the chassis switch cards to each of the line cards in the chassis. Each of these two chassis switch cards has its own set of links to each of the line cards, and hence, each line card has two sets of such links, one to chassis switch and the other to chassis switch card 11. Each link consists of two unidirectional 12-bit interfaces—three bits for control, eight bits for data, and one bit for clock.

CHASSIS TOPOLOGY

The chassis topology will now be discussed with respect to FIG. 5. In this particular embodiment, two chassis switch cards (CSC) 10 and 11 and eighteen line cards (LIU) are provided. Each chassis switch card has two telecommunications backbone-side ports for coupling with the ATM backbone network and eighteen LIU-side ports for coupling with the line cards. These twenty ports (plus an additional port for interfacing with a CPU subsystem) can run at OC-3 data rates (155 Mbps) and comply with the UTOPIA standard for ATM interfacing. Please see below for a more detailed discussion.

The two telecommunications backbone-side ports for coupling with the ATM network interface are represented by lines 44 and 45 for chassis switch card 10, and lines 46 and 47 for chassis switch card 11. These ports are connected to the telecommunications service provider's network via the standard UNI interface. Although each chassis switch card needs only one telecommunications backbone-side port, two ports provide redundancy.

In this example, the link to the telecommunications backbone network is represented by telecommunications lines that comply with OC-3, STS-3, T3, or E3. However, other high capacity network-to-network digital transmission link technologies can be supported, such as OC-12 (622 Mbps) with a system switch card. As known to those skilled in the art, Optical Carrier (OC) is a North American Digital Heirarchy (NADH) method of carrying digitized voice signals over fiber optic cable. OCs are the digital heirarchies of the SONET standard which defines how digital signals are multiplexed on fiber optic cable. In particular, Optical Carrier level 3 (OC-3) provides a data rate of 155.52 Mbps. Synchronous Transport Signal level 3 (STS-3) is the electrical signal counterpart that is converted to/from the SONET's optically based signal (OC-3). OC-3 is a direct electrical-to-optical mapping of STS-3. T3 is a digital transmission link loop technology that provides a dedicated bandwidth of 44.736 Mbits/sec, or 28 T1 circuits. T3 is capable of handling 672 voice conversations (each one digitized at 64 Kbps) and runs on coaxial cables. E3 is the European CEPT signal which carries 16 CEPT E1s and overhead, with an effective data rate of 34.368 Mbps. The E1 is the European equivalent of the T1 except that the E1 has a data rate of 2.048 Mbps. Although the telecommunications backbone-side link is full duplex, the DSL-side link (discussed below) may be assymmetric.

As mentioned above, this particular example of the chassis switch card uses eighteen LIU-side ports for coupling with the line cards. In FIG. 5, the eighteen chassis switch card ports for coupling with the line cards are represented by exemplary lines 37, 38, and 39 for chassis switch card 10, and lines 40, 41, and 42 for chassis switch card 11. Because eighteen line cards are provided, each chassis switch card has eighteen LIU-side ports, one LIU-side port per line card.

Two chassis switch cards 10 and 11 are provided for redundancy and load balancing. Interconnecting line 43 between chassis switch card 10 and chassis switch card 11 is provided to support the redundancy and load balancing features. In one embodiment, the interconnecting line is an RS-232 type serial line. Although a single chassis switch card in hot standby mode can perform all the functions that are required in the IMAS, two chassis switch cards provide additional benefits. With two chassis switch cards, the functions are distributed between them. The failure of one chassis switch card will cause the one operational chassis switch card to perform the functions of the failed chassis switch card, in addition to its own functions.

Load balancing allows the two chassis switch cards to distribute the duties between them. For example, chassis switch card 10 could handle all the even-numbered line cards while the chassis switch card 11 could handle all the odd-numbered line cards. In another variation, chassis switch card 10 could handle all the line cards on the left half of the chassis while chassis switch card 11 could handle all the line cards on the right half of the chassis. Regardless of the scheme, the load balancing feature allows the user to equitably (or non-equitably) distribute the chassis switch card functions among the chassis switch cards installed in the IMAS.

Each chassis switch card has a microprocessor-based computing environment inside for running some component of the network management software system (NMS), including configuration and performance monitoring, and general chassis switch card component management and control. In one embodiment of the present invention, each chassis switch card uses a 100 MHz PowerPC microprocessor with sufficient memory (e.g., 32 MB to 128 MB) and other peripheral devices, as will be discussed further below.

Figure 5:
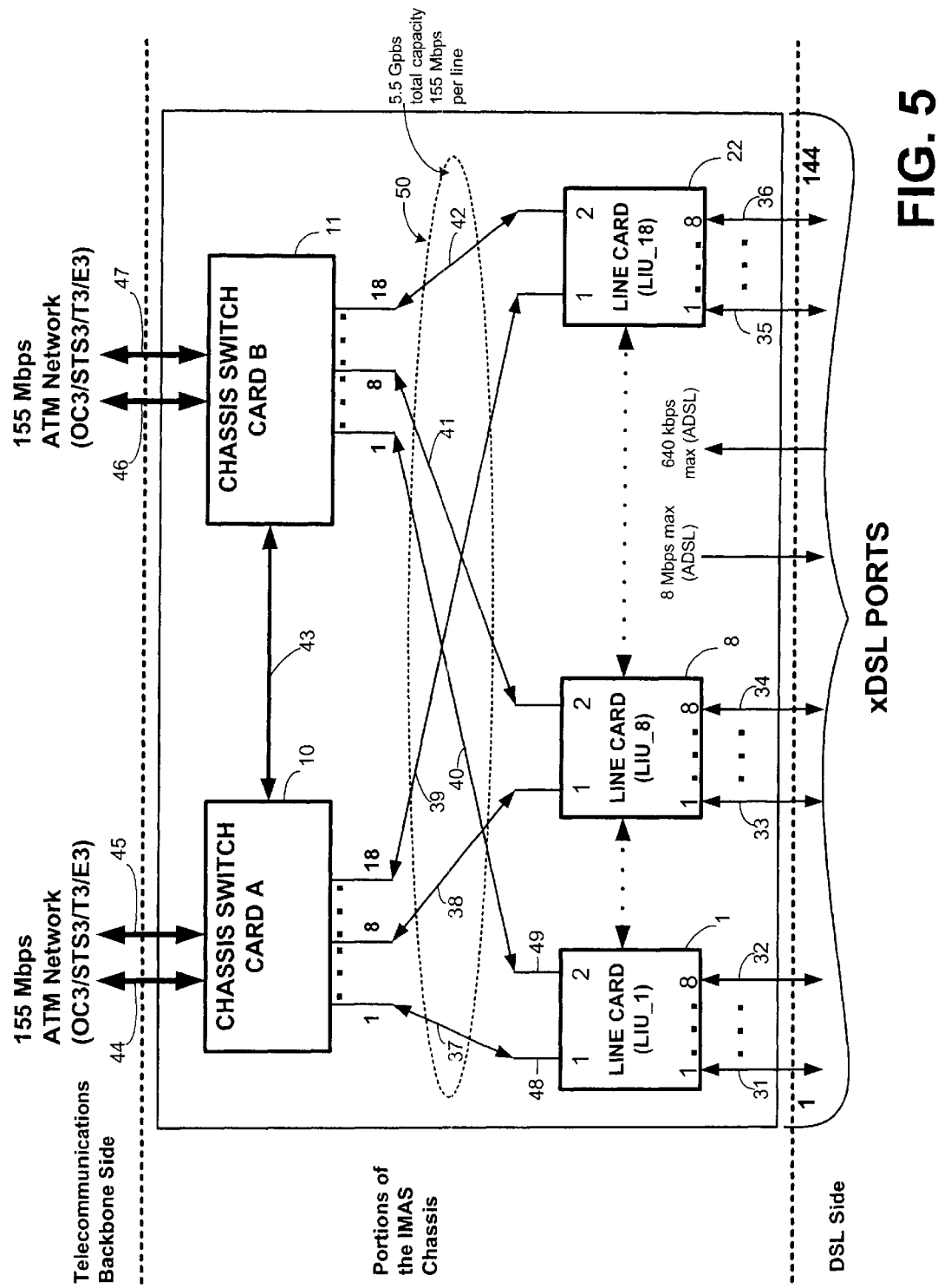
FIG. 5 shows the chassis topology of the chassis switch cards and line cards. The star configuration backplane switch fabric is also illustrated in this figure.

Turning to the line cards, FIG. 5 explicitly shows three line cards 1 (LIU_1), 8 (LIU_8), and 22 (LIU_8), but the other remaining fifteen line cards (i.e., LIU_2 to LIU_7, LIU_9 to LIU_17) are implicitly present. In accordance with one embodiment of the present invention, each line card has two CSC-side ports for interfacing with the chassis switch cards and eight DSL-side ports for interfacing with the xDSL lines of the subscribers. Note that these numbers can vary depending on system configuration and user preferences. For example, if only one chassis switch card is used, each line card would use only one CSC-side port, instead of two. Also, depending on capacity requirements, more DSL-side ports can be added. In this particular example, eight DSL-side ports are shown and with eighteen line cards, a single chassis IMAS can support 144 DSL-side ports. In other embodiments, however, each line card can have thirty-two ports and with eighteen line cards, a single chassis IMAS can support 576 DSL-side ports.

The two CSC-side ports allow each line card to couple with the two chassis switch cards. For example, line card 1 has two CSC-side ports. One port is coupled to line 37 for coupling with one chassis switch card 10, while the other port is coupled to line 40 for coupling with the other chassis switch card 11. Similarly, line card 8 is coupled to chassis switch card 10 via line 38 and chassis switch card 11 via line 41. Finally, line card 22 is coupled to chassis switch card 10 via line 39 and chassis switch card 11 via line 42.

The eight DSL-side ports allow each line card to couple with the subscribers via their respective DSL lines. Each DSL-side port is coupled to a DSL line. For example, line card 1 has a port that interfaces to DSL line 31. Similarly, line card 8 has a port that interfaces to DSL line 34. In any event, lines 31–36 represent DSL lines that can be coupled to the line card ports.

Depending on the DSL technology supported, each line card may have a microprocessor-based computing environment inside. For those ADSL line cards using DMT, the line card has a DSP per modem for managing the modem. For those ADSL line cards using CAP, the line card has one processor for the entire line card for handling modem-specific housekeeping. For SDSL line cards, the line card contains a processor for debug and general modem management purposes. Appropriate buffers are provided in each line card for priority queueing and other data management purposes.

The combination of communications lines 50 represents the star configuration backplane connections. These backplane connections 50 are point-to-point UTOPIA connections for transporting ATM data at 155 Mbps.

CHASSIS SWITCH CARD ARCHITECTURE

As mentioned earlier, each chassis switch card is a fully functional ATM switch on a single card with provisions for numerous ports. Each chassis switch cardalso has a microprocessor-based computing system for running some component of the network management software system (NMS), including configuration and performance monitoring, and general chassis switch card component and data management/control. A description of the general chassis switch card architecture will be provided with respect to FIG. 6, followed by a description of the CPU subsystem with respect to FIG. 7.

GENERAL

Figure 6:
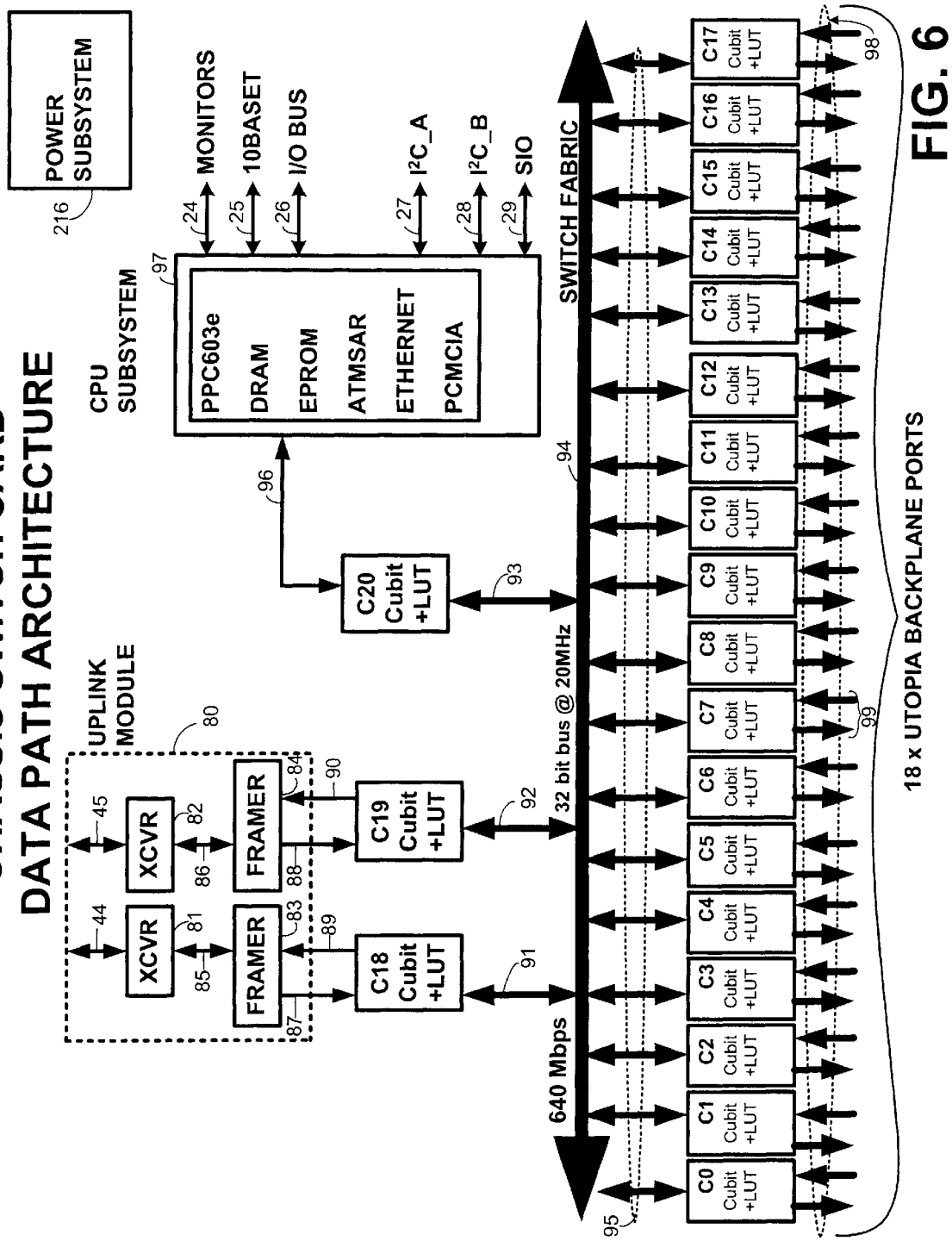
FIG. 6 shows one embodiment of the data path architecture of a chassis switch card.

FIG. 6 shows a particular chassis switch data path architecture in accordance with one embodiment of the present invention. The chassis switch card includes a switch fabric or bus 94, twenty-one cubit units C0–C20 (i.e., Transwitch Cubit-Pro TXC-05802), an uplink module 80, and a CPU subsystem 97. These elements work together to handle ATM cells between the telecommunications backbone-side and the LIU-side line cards.

In accordance with one embodiment of the present invention, the switch fabric 94 is a 37-bit bus which includes a 32-bit data bus. It is a shared bus that can be implemented in either a single card (like the chassis switch card) or in a backplane configuration among multiple cards. In one embodiment, the bus complies with the CellBus bus brchitecture. Running at 20 Mhz, the bus can handle 640 Mbps of net ATM cell bandwidth.

The bus 94 is coupled to various cubit devices C0–C20. The discussion of the cubits will be provided below. On the telecommunications backbone-side, the bus 94 is coupled to cubit devices C18 and C19 via lines 91 and 92, respectively.

The bus 94 is coupled to CPU subsystem 97 via cubit device C20 and line 93. On the line card (LIU) side, the bus 94 is coupled to cubit devices C0–C17 via lines 95. Because the interconnect structure of the cubits is the bus 94, communication by any of the cubit devices is possible. Over the bus 94, the cubit devices C0–C20 can send and receive cells to each other. Because the bus is a shared bus, contention must be resolved. Bus transactions across this bus 94 are accomplished via bus access request, bus access grant by a bus arbiter, and finally cell transmission on the bus from one cubit to another cubit.

In accordance with one embodiment of the present invention, the cubit devices C0–C20 are CMOS VLSI devices made by TranSwitch Corporation for implementing ATM switching functions. Interconnection of a number of these cubit devices over this 32-bit data bus forms various ATM cell switching or multiplexing structures; that is, the cubits can perform cell address translation, cell routing, outlet. cell queueing, and supports unicast, broadcast, and multicast transfers. Each cell placed onto the bus 94 by a cubit device can be routed either to a single cubit device (unicast transfer) or to multiple cubit devices (broadcast or multicast transfer). For unicast, data from one cubit can be sent or switched to any other cubit. For multicast, a cubit can also send cells to many other cubits to perform point-to-multipoint operations.

In the downlink direction, the two cubits C18 and C19 on the telecommunications backbone-side can send cells across the bus 94 to any one of the cubits C0–C17 on the line card side for distribution to the designated line cards. The cubits C0–C17 are coupled to eighteen UTOPIA backplane ports. These ports are coupled to the lines, such as lines 37, 38, and 39 of chassis switch card 10 in FIG. 5 which lead to the line cards. For example, line 99 of cubit C7 in FIG. 6 corresponds to line 38 of line card 8 (LIU_8) in FIG. 5. Data routing to the appropriate cubits is accomplished via VPI/VCI number that are linked to port numbers. Thus, the chassis switch card provides fanout capability from a few (or single) telecommunications backbone port to many line cards (and line card ports) via the VPI/VCI number. Each cell will consequently be directed to the appropriate downstream port based on VPI/VCI number. A look-up table attached to each interface will provide this direction control.

The connection information is loaded into the lookup tables attached to the cubits by the CPU subsystem as a result of the ATM VC negotiation process. As explained above, during the negotiation among the ATM nodes for a virtual connection (which includes the necessary bandwidth and QoS), a particular VCI number is sent back to the IMAS. The IMAS also performs its own conversion of this VCI number and maps it to the appropriate ports (input and output). The IMAS, via the CPU subsystem 97, communicates this VCI number to its components so that ATM cells can be routed appropriately. Because the cubits C0–C20 are attached to lookup tables which include this VCI-to-port information, the ATM cells can be routed to the correct ports.

In FIG. 5, because only two telecommunications backbone-side cubits feed into the eighteen LIU-side cubits, the buffering requirements for these interfaces are minimal for this downstream direction. The IMAS design assumes that traffic received from either downstream telecommunications backbone link (i.e., links 44 and 45) is not destined to the same line card. This implies that a given line card cannot receive data from both chassis switch cards but only from one. Incidentally, this also means that only one of the CSC-side lines (e.g., either line 38 or 41 for line card 8) is operative.

Returning to FIG. 6, in the upstream direction, the cubits C0–C17 can send cells across this same bus 94 to any of the two cubits C18 and C19 for distribution to the telecom network. In this case, the chassis switch card performs a multiplexing function; that is, it aggregates ATM cells from each line card into one of the two 155 Mbps telecommunications backbone-side links. These links are lines 44 and 45 that are associated with cubits C18 and C19 in FIG. 6). This traffic is sufficiently low bandwidth that even in this many-to-one scenario, the capacity is never exceeded and the buffering is therefore minimal. In this upstream direction, a lookup is also required per cell for one of two possible. links (i.e., C18 and C19).

Between any two cubits, cells carry a CellBus Routing Header and a translated VPI/VCI address. The translation can occur via a look-up table. These cubits generally follow the ATM Forum's UTOPIA standard. UTOPIA is an interface standard for devices connecting to an ATM network. Specifically, UTOPIA is the electrical interface between the ATM layer and the PHY (Physical) layer.

A cubit C20 is also provided between the CPU subsystem 97 and the bus 94. The cubit C20 is coupled to the CPU subsystem 97 via line 96, and the bus 94 via line 93. Through the cubit C20, the CPU subsystem 97 can provide system-wide monitoring and processor support. This cubit C20 can also send and receive cells across the bus 94 to and from the other cubits C0–C19. Thus, any cell traffic with the appropriate VPI/VCI number designated for the CPU subsystem 97 will make its way to the CPU subsystem 97.

As discussed further below, the CPU subsystem 97 has a PowerPC 603e microprocessor, DRAM, EPROM, PCI bus, ISA bus, and a PCI-ISA bridge. The CPU subsystem 97 also has an ATM SAR to assist the CPU in its ability to deal with ATM cells, an Ethernet interface (e.g., 10 BaseT), and PCMCIA cards. The CPU subsystem 97 has other functionality to interface to monitoring logic (e.g., power, fans, temperature) via line 24, an Ethernet interface via line 25, an input/output (I/O) bus via line 26, nineteen $I^2C$ bus lines shown here as two sets of lines 27 and 28 (line 27 or $I^2C\_A$ has 18 bus lines while line 28 or $I^2C\_B$ has one bus line), and two serial I/O lines 29 (where one line is for the CSC-to-CSC communication for load balancing and the other line is external). The general purpose of the CPU subsystem is to manage the entire chassis.

In one embodiment of the present invention, the uplink module 80 includes two transceivers 81 and 82, and two framers 83 and 84. The first transceiver 81 is coupled to line 44 on the telecommunications backbone-side of the chassis switch card. The second transceiver 82 is coupled to line 45, also on the telecommunications backbone-side of the chassis switch card. These two lines 44 and 45 correspond to the same lines 44 and 45 in FIG. 5.

First framer 83 is coupled to first transceiver 81 via line 85 and cubit device C18 via lines 87 and 89. The second framer 84 is coupled to second transceiver 82 via line 86 and cubit device C19 via lines 88 and 90. These framers are SONET User-to-Network Interface framers that interface with the telecommunications backbone-side OC-3c lines 44 and 45. Other embodiments support other interface technologies such as DS3, T3, and E3.

A power subsystem 216 is provided. The IMAS provides a −48 VDC power source to the entire system via the backplane. Each card in the system is responsible for deriving its own working voltages from this −48 VDC in the most effective manner. This power subsystem 216 provides the on-card power derivation and regulation for the CPU subsystem 97 and other components on the motherboard.

CPU SUBSYSTEM

The CPU subsystem 97 of FIG. 6 will now be discussed with reference to FIG. 7. The general purpose of the CPU subsystem 97 is to manage the entire chassis. At the core of the CPU subsystem 97 is a microprocessor 200 which, in one embodiment, is a PowerPC MPC603 which runs at 100 MHz.

The microprocessor 200 is coupled to a PCI bridge/memory controller 201 via line 220. In one embodiment, the PCI bridge/memory controller 201 is an IBM 82663/4.

The PCI bridge/memory controller 201 is also coupled to local memory (i.e., DRAM) 202 via line 221. In one embodiment of the present invention, the local memory is a 64 MB DRAM expandable to 128 MB with a 64-bit data path. Typically, two memory banks are provided. The memory size for each memory bank varies depending on the configuration desired. In one embodiment, each memory bank has 64 MB. In other embodiments, each memory bank has 32 MB.

The PCI bridge/memory controller 201 is also coupled to a boot memory (i.e., boot PROM) 203 via line 222. In one embodiment, the boot PROM is an 4 Mb (or 512 KB) PROM.

Line 222 is coupled to a line 223. Lines 222 and 223 constitute a PCI bus.

The PCI bus 222, 223 is coupled to three other components—an ATM SAR 208, an Ethernet interface 209, and an ISA bus bridge 210, which allows the PCI bus to be coupled to an Industry Standard Architecture (ISA) bus. The Ethernet interface 209 along with line 226 allows the CPU subsystem 97 to be coupled to a 10BaseT network. The ISA bridge 210 allows the CPU subsystem 97 to be coupled to an ISA bus 224.

The ATM SAR 208 is an ATM segmentation and reassembly unit that assists the CPU in its ability to handle ATM cells. It provides a mechanism for the system to support ATM signaling, ILMI, and OAM functions. This ATM SAR 208 provides an interface between the cubit C20 (see the chassis switch architecture of FIG. 6) switch device and the standard PCI bus, which runs 32 bits at 33 MHz. In FIG. 7, line 225 is the interface line to cubit C20 in the switch card data path architecture shown in FIG. 6. The ATM SAR 208 provides reassembly functionality to convert cells into frames for processing by the CPU, and segmentation operation to create ATM cells from frames. The ATM SAR 208 supports AAL5 encapsulation and termination functionality, in accordance with ITU-T specifications 1.361 and 1.363; that is, the ATM SAR 208 supports VP and VC, traffic shaping capabilities, and support for CBR, VBR, ABR, and UBR traffic classes.

The ISA bus 224 is coupled to many components. One ISA bus component is a PCMCIA card 204. A PCMCIA card can be any number of card devices that comply with the PCMCIA standard (Release 1.0). These card devices include memory and input/output devices (e.g., modem, LAN). In one embodiment of the present invention, the PCMCIA slot is used for a flash memory device such as a flash EEPROM In one embodiment of the present invention, the flash memory has a size of 16 MB. This flash memory 204 is used to store data such as IMAS configuration data, the tables for proxy SVC signaling, and other run-time code. These tables include the Proxy Signaling Table, the ISP Table, and the Connect Info Table, which will be discussed below in the SOFTWARE section.

The cubit devices (i.e., C0–C20) 205 are also coupled to the ISA bus 224. The coupling of the cubits C0–C20 to the ISA bus 224 is for the control path, not the data path. The data path is shown in FIG. 6. This coupling allows the CPU subsystem to configure the cubits as well as obtaining status information from the cubits.

An interrupt control unit (ICU) 206 is also coupled to the ISA bus 224. The ICU 206 serves as a single concentrator for twenty-one port (i.e., cubits C0–C20) interfaces, eighteen line cards, and miscellaneous interrupts.

A real time controller logic (RTC) 207 is also coupled to the ISA bus 224. This controller is used for calendaring tasks such as time and date, and has a built-in timer.

A S/UNI 211 is also coupled to the ISA bus 224. The S/UNI 211 is a SONET User-to-Network Interface framer that interfaces with the telecommunications backbone-side OC-3c lines 227 and 228. S/UNI 211 of FIG. 7 is equivalent to framers 83 and 84 of FIG. 6.

Chassis monitor logic 212 is also provided on ISA bus 224. The monitor logic 212 provides functionality for monitoring chassis voltage leads and chassis switch card temperature via line 229. The monitoring is accomplished via temperature sensors, and voltage sensors.

A serial I/O interface 213 is also coupled to the ISA bus 224. This serial I/O interface 213 converts parallel data to serial data for interfacing with two serial port lines 230. One of the lines is for external interface and the other is for internal CSC-to-CSC communication for load balancing. This internal. line is shown in FIG. 5 as line 43. Returning to FIG. 7, in one embodiment, the serial interface lines 230 comply with the RS232 serial communications standard to send data to serial printers, remote workstations or routers, modems, and asynchronous communication servers.

Two I$^2$C controllers 214 are provided for coupling with I$^2$C buses via lines 231 and 232. The The I$^2$C controllers 214 include standard I$^2$C buses which are used to connect to each slot in the chassis. The I$^2$C bus includes two signal lines (i.e., clock and data). This bus is used for environmental monitoring of the chassis and is controlled by the chassis switch cards 10 and 11. This bus supports a multi-master capability and hence, defining a single chassis master is not necessary.

Figure 7:
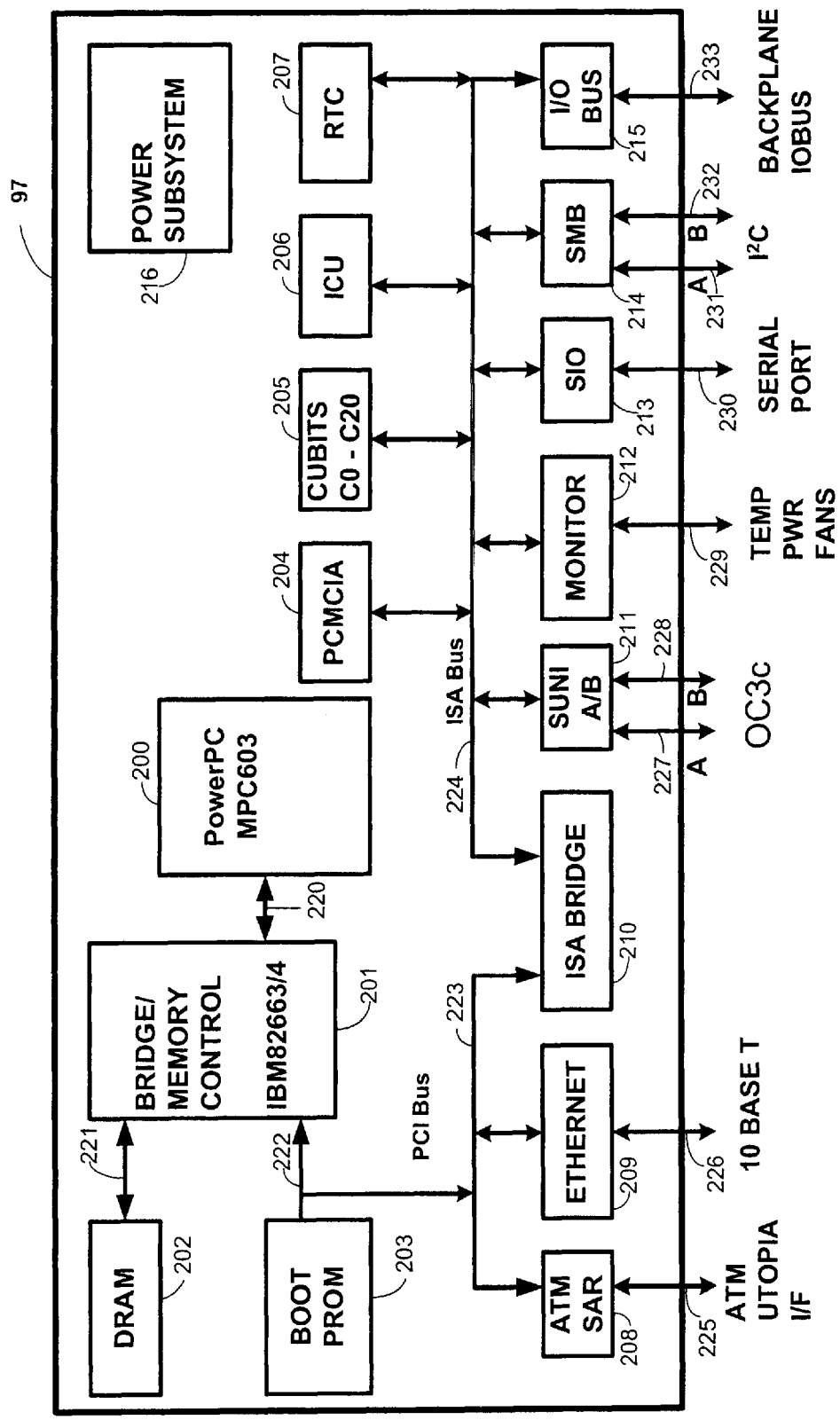
FIG. 7 shows one embodiment of the CPU subsystem in the chassis switch card.

In FIG. 7, lines 231 (i.e., A) and 232 (i.e., B) are the I$^2$C buses. These lines 231 and 232 are coupled to a 1:18 mux for fanout to all the line cards. A more detailed discussion of the I$^2$C bus will be provided below.

An I/O Bus 215 is also coupled to the ISA bus 224. The I/O Bus is coupled to the backplane I/O bus. The I/O bus will be discussed in greater detail below.

One function that the CPU subsystem performs is look-up table updates throughout the chassis to support the many virtual connections. As described above, before any substantive communication between any two end systems can commence, a virtual connection must be established. This virtual connection is established via signaling among the nodes in the ATM network. The IMAS is one such node, even though one embodiment of the IMAS is at the edge of the telecommunications backbone. The signaling allows the various nodes to negotiate bandwidth, Quality of Service, and VC numbers. The negotiation proceeds forward from the originating end system to the destination end system. When the negotiation has successfully completed, each node updates its own table (i.e., cross reference ports to VCI number) and sends the negotiated results back. Thus, the destination node sends back relevant information such as the VCI number to a previous node, which in turn performs its own internal table updates and sends relevant VC information back to another previous node. Finally, the negotiated results arrive at the destination node via at least one IMAS.

In the chassis switch card of the IMAS, the CPU subsystem 97 in FIGS. 6 and 7 receives and processes the negotiated information (i.e., VC information). In FIG. 6, the negotiated information makes its way from the telecommunications backbone (i.e., line 44 or 45) to the switch fabric 94. The data is then routed to cubit C20 via line 93 and into the CPU subsystem 97. The CPU subsystem 97 then updates all internal look-up tables in the chassis that contain virtual connection information via I/O bus 26. Via this I/O bus 26 (also I/O bus 56 in FIG. 14), the new negotiated connection information is stored in the various look-up tables throughout the chassis. These look-up tables include: the look-up tables associated with the cubits C0–C20 in FIGS. 6 and 7; look-up table 252 in the line card of FIG. 8; and look-up tables 710 and 715 in the system switch card of FIG. 13.

Once the tables have been updated, all other ATM cells that arrive into the IMAS do not need to go through the CPU subsystem 97 anymore. Since all the tables have been updated, the cells make their way to the appropriate cubits, line cards, framers, and modems.

xDSL LINE CARD ARCHITECTURE

Figure 8:
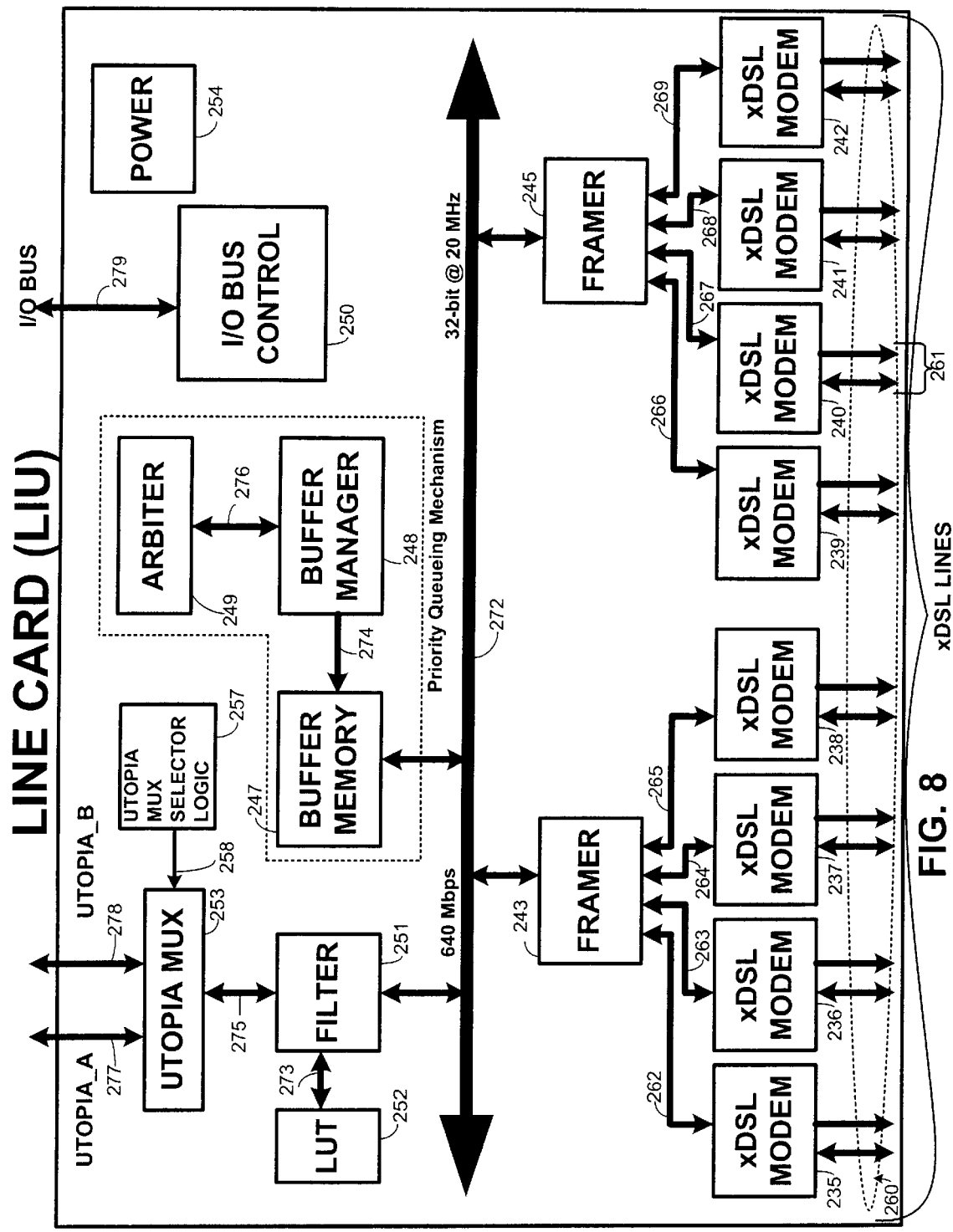
FIG. 8 shows one embodiment of a cell-based line card architecture.
Figure 9:
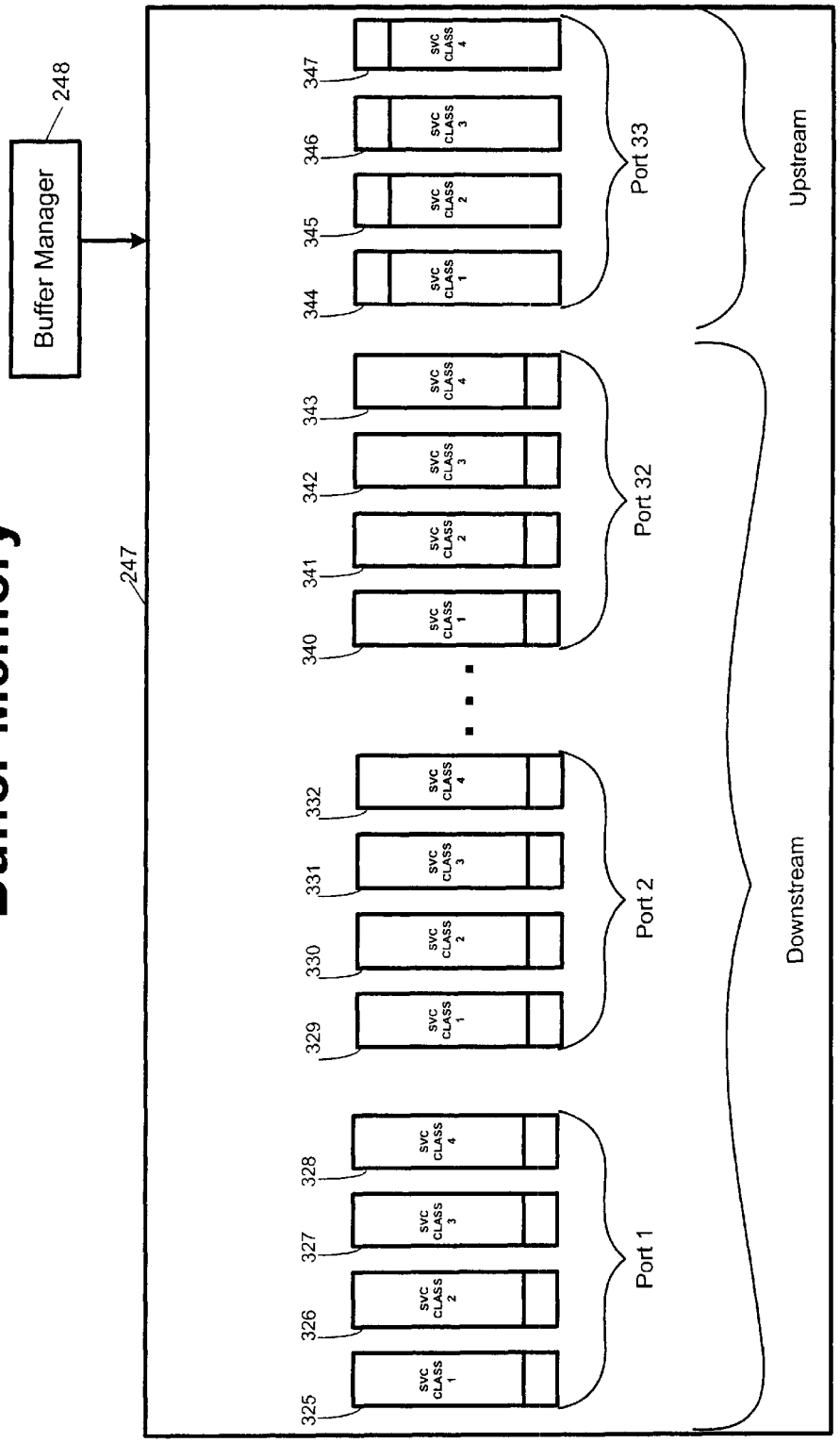
FIG. 9 shows one embodiment of the buffer memory in the line card.

The cell-based xDSL line cards will now be discussed. As mentioned earlier, the line cards provide access to loop technologies, such as xDSL. At one side of the line card beyond the backplane is the ATM switch via the chassis switch cards, and at the other end of the line card is the DSL subscriber line. Interface ports are provided for both sides of the line cards. FIG. 8 shows one embodiment of the present invention where eight DSL-side ports (and associated modems) and two CSC-side ports are implemented. Before data reach their destination, they are buffered temporarily in a buffer memory, where a buffer manager and arbiter decides the data delivery schedule. FIG. 9 shows the structure of the buffer memory 247 (see FIG. 8).

GENERAL

Referring now to FIG. 8, the architecture of a typical line card, such as line card 15 (LIU_11) of FIG. 3, will now be discussed. In this particular embodiment, the line card has the following interfaces: eight DSL ports for connection to subscribers (DSL side), two UTOPIA ports for connection to ATM switching logic (CSC side), an I/O bus connection to the backplane, I$^2$C interface, and power interface.

The line card has numerous components for.processing the telecommunications user data and other IMAS-specific or line card-specific management-related data. To handle all this traffic, a line card bus 272 is provided to interconnect the various line card components. In one embodiment of the present invention, this line card bus 272 is 32 bits wide running at 20 MHz. This line card bus 272 is coupled to a filter 251, a buffer memory 247, and two framers 243 and 245. Data contention for this shared bus 272 is resolved by an arbiter logic 249. These and other components of the line card are discussed below.

On the CSC side (toward the ATM switching logic), the line card includes two UTOPIA interface lines 277 and 278 which interface with a cubit device on each chassis switch card via the backplane connections. These UTOPIA interface lines 277 and 278 in FIG. 8 correspond to lines 48 and 49 in FIG. 5. For example, referring to both FIGS. 8 and 6, lines 277 and 278 of FIG. 8 are coupled to line 99 of cubit device C7 in FIG. 6. This connectivity via the UTOPIA interface allows the ATM traffic to pass between a chassis switch card and a line card.

Each of these lines 277 and 278 are coupled to a UTOPIA mux 253. A UTOPIA mux multiplexes and demultiplexes two separate and asynchronous UTOPIA interfaces into one interface for use by the UTOPIA filter 251 (FIG. 8). The two UTOPIA ports A and B are selected by an external control signal generated by a UTOPIA mux selector logic 257 via line 258. Switching of the multiplexer selection is accomplished when the line card is in a non-operational state.

In the downlink direction, these lines 277 and 278 are inputs and the UTOPIA mux 253 selects one of these two inputs for output on line 275. The UTOPIA interface is brought from the backplane. All cell traffic transferred across the backplane is accomplished.using UTOPIA as the link interface. This interface runs at a minimum frequency of 20 MHz and a maximum of 25 MHz, in accordance with one embodiment of the present invention. Each UTOPIA interface includes an 8-bit parallel bus, three control signals, and a clock for each direction, or 12 signals in each direction. This results in 24 signals per interface, or 864 signals per chassis.

In the uplink direction, the UTOPIA mux 253 takes the input on line 275 and delivers the data to either line 277 or 278, whichever is selected by the UTOPIA mux selector logic 257. In one embodiment of the present invention, the UTOPIA mux selector logic 257 is found in the I/O bus controller 250. A bit position in a particular register in the I/O bus controller 250 determines which of two port lines 277 or 278 is active. This bit in that register is used as the selector to the UTOPIA mux 253.

The UTOPIA mux 253 is coupled to a filter 251 via line 275. This filter 251 determines whether the connection is valid or not. The filter 251 checks the validity of the connection based on an index to a look-up table 252 that corresponds to the VPI/VCI number of the ATM cell. The look-up table 252 is accessed via line 273. If the connection is not valid, the data is discarded. This look-up table has all the valid connection information, including translation functions, special marking, routing information, queue number, and status information (e.g., discard state). To communicate with other devices in the line card, the filter 251 is coupled to the line card bus 272.

A buffer memory 247 is also provided. The primary purpose of this buffer memory 247 is to temporarily hold data that was delivered to it from the filter 251 and the framers 243 and 245. Conversely, the buffer memory 247 also holds data prior to its delivery to the filter 251 or the two framers 243 and 245. Any user traffic (i.e., ATM traffic) that arrives into the filter 251 via the UTOPIA mux 253 is held in the buffer memory 247 before it is delivered to any one of the destination DSL-side ports 235–242. Similarly, any user traffic that arrives into the framers (either framer 243 or framer 245) is held in the buffer memory 247 before it is delivered to the filter 251 on the CSC-side. The buffer memory 247 will be discussed in greater detail below in the PRIORITY QUEUEING MECHANISM subsection.

The data is organized according to port and priority. A buffer manager 248 is coupled to the buffer memory 247 via line 274. An arbiter 249 is coupled to the buffer manager 248 via line 276. The arbiter 249 resolves contention on the line card bus 272 via an arbitration scheme. Specifically, the arbiter 249 decides which of the many components that are coupled to the line card bus (i.e., filter 251 and framers 243 and 245) gets access to the bus for delivery of data into and out of the buffer memory 247 via a predetermined arbitration scheme. In accordance with one embodiment of the present invention, the arbitration scheme handles bus access (and hence, buffer memory access) according to the following priorities: (1) downstream data in the filter; (2) upstream data in the buffer memory; (3) upstream data in the framers; and (4) downstream data in the buffer memory. The PRIORITY QUEUEING MECHANISM subsection below will provide more details on the arbitration scheme. In one embodiment of the present invention, this selection logic is implemented in hardware.

In this example, eight DSL-side line ports are provided. These eight ports are serviced by two framers 243 and 245. In FIG. 8, the left half ports are serviced by framer 243 and the right half ports are serviced by framer 245.

Generally, the framers provide framing and formatting functions appropriate to the communications protocols used. Each framer performs three major functions—modem initialization, on-line modem status information processing, and protocol processing. Modem initialization depends on the particular DSL technology and modulation scheme implemented. Once the modem is initialized, each modem begins execution. Each modem goes through a training period during which the fastest reliable data delivery rate is determined for a given SNR.

For protocol processing, each framer makes sure that the data that enters and leaves the framer complies with standard ATM UNI protocol. In this respect, it performs functions that are much like that of the cubits (C0–C20) in the chassis switch cards. For ADSL, each framer processes two channels per modem—downstream duplex and upstream duplex. In one embodiment, the framer assumes the logical-layer protocol to be ATM.

The framers 243 and 245 can also perform managerial functions such as generating and checking header checksum, generating and stripping idle cells, and scrambling cells. At a lower level, the framers also perform parallel-to-serial conversion in the downlink direction, and conversely, serial-to-parallel conversion in the uplink direction.

To interface with subscribers, framer 243 is coupled to xDSL modems 235–238 via lines 262–265, respectively. In the downlink direction, the xDSL modem receives user data and delivers the data to the subscribers in accordance with the implemented xDSL technology. In the uplink direction, subscriber data sent via the implemented xDSL technology is received by the xDSL modem and delivered to the framer 243 for conversion into ATM cells.

Framer 245 operates like framer 243. Framer 245 is also coupled to xDSL modems 239–242 via lines 266–269, respectively. In one embodiment, the DSL-side ports 260 are coupled to the backplane where appropriate connections are provided for external physical connections to subscriber DSL lines.

For management and control by the CPU subsystem 97 in the chassis switch card (see FIGS. 6 and 7), an I/O bus 279 is provided. This I/O bus 279 is coupled to the CPU subsystem 97. An I/O bus controller 250 resides in the line card and contains address decoders and registers to handle data transfers between the CPU subsystem 97 and any component in the line card across the I/O bus 279. Although FIG. 8 shows the I/O bus controller 250 coupled only to the I/O bus, this is not the case. As known to those skilled in the art, the I/O bus controller is coupled to most, if not all, of the components in the line card which require management and control by the CPU subsystem 97.

The system relies on the delivery of a sufficient −48 VDC power supply source. The −48 VDC power is distributed across the backplane to all cards. Each card in the system is responsible for deriving its own working voltages from this −48 VDC in the most effective manner. In the line card shown in FIG. 8, power logic 254 is provided to perform this function.

This power distribution scheme provides a number of benefits. Less current on the backplane permits easier distribution. Less current per card implies less concern for connectors and ratings. Less current per card facilitates easier hot plug design. On-card regulation permits custom card requirements. The −48 VDC distribution permits longer life for chassis and power subsystem. The −48 VDC distribution is not nearly as sensitive as distribution of high current low voltage supplies. Fan power is also obtained from the −48 VDC.

PRIORITY QUEUEING MECHANISM

The priority queueing mechanism will now be discussed. The priority queueing mechansim determines how and when data is transferred across the line card bus 272. In one embodiment, this priority queueing mechanism is implemented in hardware with the buffer memory 247, buffer manager 248, and arbiter 249. First, the various queues and FIFOs will be discussed. Second, the operation of the priority queueing mechanism will then be discussed with respect to the queues and FIFOs. In accordance with one embodiment of the present invention, the priority queueing mechanism handles ATM cells via a combination of round robin and weighted fair queueing (WFQ). Weighted fair queueing is discussed in detail in the WEIGHTED FAIR QUEUEING subsection below. So, when the patent specification mentions the transfer or delivery of data, this implies the transfer or delivery of cells.

PRIORITY QUEUEING MECHANISM—QUEUES AND FIFOs

The various components coupled to the bus 272 contain queues or first-in first-out (FIFO) buffers for handling all the data traffic. Some components have more and larger queues than other components.

As shown in FIG. 9, the buffer memory 247 includes a plurality of queues. The total number of queues can vary from one implementation to another. In this example, 132 queues are shown in groups of four, where each group of four represents a port, whether DSL-side or telecommunications backbone-side. If this line card had thirty-three ports (32 DSL-side and 1 CSC-side), 132 queues are used in this buffer memory 247. Thus, 128 queues are associated with downstream data, while 4 queues are associated with upstream data. If user data is temporarily stored in one of the downstream queues, it originally came from the telecommunications backbone via the chassis switch card in the IMAS and is ready to be transferred to the designated DSL-side port for delivery to the corresponding subscriber. Similarly, if user data is temporarily stored in one of the upstream queues, it originally came from a subscriber via the DSL line and framer (243 or 245) and is ready to be transferred to the telecommunications backbone via the UTOPIA mux 253 (see FIG. 8) in the line card and the chassis switch card.

To use another example, if eight DSL-side ports and one CSC-side port are provided in this line card, the buffer memory 247 must be large enough to accommodate nine total ports. For four queues per port, this particular line card uses at least thirty-six queues in the buffer memory 247. In one embodiment of the present invention, sixty-four queues are provided in which four queues are associated with a port. Thus, sixty-four queues can support sixteen ports.

Each queue in the buffer memory 247 is large enough to overcome any speed mismatch problems and provide enough buffering for bursty traffic. In one embodiment, each queue can hold anywhere from 128 cells to 2,048 cells. Although an ATM cell is 53 bytes long, the cell size used in the queues is 64 bytes. The actual size of the queues is programmable and can be adjusted to suit particular needs.

If latency is a problem, the queue can be made small. A large queue may potentially hold cells for an undesirably long time because other cells in front of it may be present. A smaller queue reduces the chance of waiting for other earlier cells to be processed. If the queue is small enough, either the cell is processed almost immediately with very little waiting period or the cell is discarded because the queue has no available space.

As shown in FIG. 8, some of the other components in the line card contain FIFOs. The filter 251 and the two framers 243 and 245 have several FIFOs associated with each port. In filter 251, two FIFOs are provided coinciding with the telecommunications backbone port. One FIFO is for the downstream direction and, in one embodiment, the FIFO is four cells deep to maintain the data rate. The other FIFO is for the upstream direction and is one cell deep. As mentioned above, a single cell in the queues is 64 bytes even though an ATM cell is 53 bytes long.

If data is temporarily stored in a downstream FIFO of the filter 251, it originally came from the telecommunications backbone via the chassis switch card in the IMAS and is ready to be transferred to the designated FIFO in the buffer memory 247. Once in the buffer memory 247, the arbiter and buffer manager will make sure that it makes its way to its designated DSL-side port for delivery to the corresponding subscriber. Similarly, if data is temporarily stored in the upstream FIFO, it originally came from the buffer memory 247 and is ready to be delivered to the telecommunications backbone via the UTOPIA mux 253 (see FIG. 8) in the line card and the chassis switch card.

The framer 243 of FIG. 8 has two FIFOs per DSL-side port. Thus, framer 243 has two FIFOs associated with each line 262–265. Framer 245 also has two FIFOs per DSL-side port; that is, two FIFOs are provided for each line 266–269. For the two FIFOs associated with a DSL-side port, one FIFO is designated for the upstream direction while the other FIFO is designated for the downstream direction. Each FIFO is two cells deep. Again, a single cell in the FIFOs is 64 bytes even though an ATM cell is 53 bytes long.

Like the filter 251, if data is temporarily stored in a downstream FIFO of the framer (either 243 or 245), it originally came from the telecommunications backbone via the chassis switch card in the IMAS and is ready to be transferred to the designated DSL-side port for delivery to the corresponding subscriber. Similarly, if data is temporarily stored in the upstream FIFO, it originally came from a subscriber via the DSL line/port and is ready to be delivered to the buffer memory 247 for ultimate delivery to the telecommunications backbone via the UTOPIA mux 253 (see FIG. 8) in the line card and the chassis switch card.

Returning to FIG. 9, this particular example buffer memory 247 shows support for thirty-three ports (i.e., thirty-two ports for the DSL-side and one port for the telecommunications backbone-side). Each port is associated with four queues. Thus, port 1 has queues 325–328, port 2 has queues 329–332, port 32 has queues 340–343; and port 33 has queues 344–347. The first thirty-two ports (ports 1–32) are associated with the downstream direction (i.e., telecommunications backbone-side to DSL-side). The last port, port 33, is associated with the upstream direction (i.e., DSL-side to telecommunications backbone-side). In essence, ports 1–32 are associated with the DSL lines coupled to the DSL modems, while port 33 is associated with the uplink telecommunications backbone or WAN port. In one embodiment, the upstream queue (i.e., port 33) supports one queue, while in another embodiment, this upstream port supports four queues as shown in FIG. 9.

Analogously, in FIG. 8, eight ports are associated with the downstream direction (i.e., those ports coupled to DSL modems 235–242) and one port is associated with the upstream direction (i.e., the telecommunications backbone port, either port 44 or 45 of FIG. D that is coupled to either UTOPIA lines 277 or 278 in FIG. 8). For example, referring to FIG. 8, if data is designated for the fourth port, it is a downstream data for the DSL line that is coupled to DSL modem 238. If the user data is designated for the ninth port, it is an upstream data for the UTOPIA mux 253 that is ultimately coupled to the telecommunications backbone port(s).

For any group of four queues in the buffer memory 247 that are associated with a port, each queue is associated with some sort of service class. This service class can be based on the well-known ATM service categories (i.e., ABR, CBR, UBR, VBR) and artificial weights assigned to these categories. Additionally, all traffic passing through the line card, and hence through the buffer memory 247, is also associated with these ATM service categories.

Knowing that data is associated one ATM service category or another (e.g., CBR v. ABR), how does the system determine which data has priority? Remember, priority is important in determining which data is handled first over another data to get that data from one location to another. To resolve resource contention (i.e., bus access), the system uses a programmable weighted fair queueing (WFQ) algorithm, which is discussed in greater detail below in the WEIGHTED FAIR QUEUEING subsection. In.this respect, the weighted fair queueing is implemented as a scheduling scheme more than a priority scheme—those types of data with higher weights (or lower weight numbers, as described below) are processed more frequently and quickly than other types of traffic with lower weights (or higher weight numbers) but all the data will be processed to ensure some sort of fairness.

Weighted fair queuing (WFQ) is an algorithm that controls the ratio of transmission bandwidth allocation among different traffic flows during periods of congestion. In this respect, weighted fair queueing is related to timing. When enabled for an interface, weighted fair queueing provides traffic priority management that automatically sorts among individual traffic streams without requiring that the system first define access lists. Weighted fair queueing can manage data streams, whether duplex or simplex.

This WFQ algorithm requires that weights be assigned to the various types of traffic that will flow through the system. In this case, the type of traffic is represented by the aforementioned ATM service categories. In one embodiment of the present invention, these ATM service categories are ABR, CBR, UBR, and VBR, which were briefly discussed in the BACKGROUND section of this patent specification.

Based on these categories, the system administrator can designate relative weights for the various types of data that pass through the IMAS, which allows the priority queueing mechanism to process certain types of data more frequently than others while maintaining some type of fairness among all the data. For certain types of traffic, the system administrator may want to assign the highest weights (i.e., lowest weight numbers) so that they can be processed as required by its service. For example, the system administrator may assign CBR with the highest weight (i.e., lowest weight number) so that CBR data can be processed more frequently and quickly.

Although weights are initially assigned to these ATM service categories, these weights are programmable so that the system administrator can make changes based on his/her needs (i.e., application, environment, usage). In accordance with one embodiment of the present invention, the priority levels among these ATM service categories is, from highest to lowest priority, CBR, VBR, ABR, and UBR. The weights range from "1" to "15" where "1" represents the highest priority and "15" represents the lowest priority in one embodiment, as described below, lower weight numbers are associated with more frequently serviced data.

As mentioned above, each queue in the buffer memory 247 is associated with a programmable weight. Accordingly, data of a certain service class type is stored in the queue that is designated for that service class type. For example, port 2 uses queue 329 for the service class 1, queue 330 for service class 2, queue 331 for service class 3, and queue 332 for service class 4. In one embodiment, service class 1 is associated with CBR, service class 2 is associated with ABR, service class 3 is associated with VBR, and service class 4 is associated with UBR. However, this association of service class types with queues is flexible; that is, some data that would normally be delivered to a queue associated with service type 1 may be delivered to queue of a different service type. In any event, using programmable weights, bus arbitration can be resolved using a weighted fair queueing algorithm. As described below, weighted fair queueing is used for data transfers out of the buffer memory 247 across the bus 272.

PRIORITY QUEUEING MECHANISM—OPERATION

Having described the queues and the FIFOs for the buffer memory 247, filter 251, and the two framers 243 and 245, the operation of the priority queueing mechanism will now be discussed. Returning to FIG. 8, the manner in which these FIFOs is used is dictated by a buffer manager 248 and arbiter 249. Essentially, all data, regardless of whether they are upstream or downstream, goes through the buffer memory 247; that is, any data that is intended for any subscriber (i.e., DSL-side ports) or the Internet (i.e., telecommunications backbone-side or WAN port side) is buffered in the buffer memory 247 first. The arbiter 249 is essentially a master bus arbiter to the slave buffer manager 248. The arbiter 249 implements a combination of round robin and weighted fair queueing to resolve access to bus 272. The arbiter 249 sends commands to the buffer manager 248, which responds with information back to the arbiter and correspondingly takes some action on the data in the buffer memory 247. At a lower level, the arbiter 249 makes certain bus arbitration decisions and the buffer manager 248 determines the locations of certain queues in the buffer memory.

In one embodiment of the present invention, bus access is determined by four (4) priority levels. These priority levels, from highest priority to lowest priority, are as follows:
(1) downstream data in a FIFO of the filter 251;
(2) upstream data in a queue of the buffer memory 247;
(3) upstream data in a FIFO of any framer 243 or 245; and
(4) downstream data in a queue of the buffer memory 247.

Thus, if any data in a downstream FIFO exists in the filter 251, the priority queueing mechanism handles it first before all other traffic. Also, if the buffer manager happen to be currently processing upstream data from a framer's FIFO (priority level 3) and downstream data in a FIFO of filter 251 appears (priority level 1), the priority mechansim ensures that the current transaction is completed and then immediately turns to handle the downstream data in the filter's FIFO.

Despite this particular priority order, other priority ordering is programmable and within the scope of the present invention. Thus, another priority level variation includes making the highest two priority levels programmed for the downstream data while making the lowest two priority levels programmed for the upstream data. In other words, another embodiment of the present invention provides for the following priority levels (from highest to lowest):
(1) downstream data in a FIFO of the filter 251;

(2) downstream data in a queue of the buffer memory 247;
(3) upstream data in a queue of the buffer memory 247; and
(4) upstream data in a FIFO of any framer 243 or 245.

A third variation exists. This third variation incorporates priority levels, from highest priority to lowest priority, as follows:
(1) downstream data in a FIFO of the filter 251;
(2) upstream data in a FIFO of any framer 243 or 245;
(3) downstream data in a queue of the buffer memory 247; and
(4) upstream data in a queue of the buffer memory 247.

This particular variation stresses the delivery of data to the buffer memory 247 first to minimize blocking into the line cards (whether from the telecommunications backbone or the subscribers via the DSL lines) and then, delivery of data out of the buffer memory. In both cases, the downstream is considered more important than upstream.

One skilled in the art can appreciate other possible variations to this priority level list. For the purposes of further discussion, the first embodiment (downstream-upstream-upstream-downstream) will be used.

According to the first priority level, the arbiter will handle any data that is present in the downstream FIFO of the filter. This handling involves the examination of the data itself with the assistance of the look-up table 252, an examination of the state of the designated queue in the buffer memory 247, and a transfer/discard decision.

First, in a prior connection identification session (i.e., ATM negotiation), the CPU subsystem programmed the look-up table 252 associated with the filter 251 with valid connections based on the VPI/VCI number in the cell header. Based on the cell header, the filter 251 looks up the corresponding destination queue information for this data. This destination queue information is the designated queue in the buffer memory 247. How does the look-up table 252 get this information? In a previous communication, the SVC signaling logic negotiated the VPI/VCI along with other connection information with other switching nodes (e.g., ATM switches, routers) in the network for this communication session. The connection information includes a one-to-one matching of VPI/VCI with the relevant port number (which identifies the subscriber). The CPU subsystem 97 (FIGS. 6 and E) in the chassis switch card sends update table information via the I/O bus 279 to this look-up table 252 (FIG. 8).

The arbiter 249 recognizes that data is present in the downstream FIFO of the filter 251. This recognition is possible due to a flag associated with the queue that is sent to the arbiter 249 when data is present in the queue. When the arbiter 249 has finished its current task, it immediately proceeds to process this new downstream data in the filter. In addition to the flag, the queue sends the queue number to the arbiter 249. Based on the destination queue information of this data from the look-up process, the arbiter examines the corresponding downstream queue in the buffer memory 247, to determine if it is full or not full. If the queue in the buffer memory 247 is full, the filter 251 is instructed by the arbiter 249 to discard the data in this particular queue.

If the queue is not full, the buffer manager 248 transfers the data from the FIFO in the filter 251 to the designated queue in the buffer memory 247 across the bus 272. The buffer manager 248 stores the data in the designated queue in the buffer memory 247 and notes the memory location. The arbiter continues to examine the filter to determine if more downstream data is present in accordance with this highest priority level. So long as data is present in the downstream FIFO of the filter 251, the arbiter 249 will process this data to transfer it to the designated queue in the buffer memory 247 or discard it if the designated queue in the buffer memory 247 is full. If all data in the downstream FIFO of the filter 251 has been handled (or if no data is present at all), the priority queueing mechanism can proceed to handle transactions at the second priority level.

In the second priority level, if data is present in any of the four upstream queues of the buffer memory 247, the priority queueing mechanism will handle this data, so long as no data in the downstream FIFO of the filter 251 is present (priority level 1). The priority queueing mechanism will transfer this data to the upstream FIFO of the filter 251 in preparation for this data to be delivered to the telecommunications backbone via the chassis switch card.

If more than one of the four upstream queues associated with a port in the buffer memory 247 are filled with data, the priority queueing mechanism uses weighted fair queueing to resolve bus access contention. Indeed, any data that is coming out of the buffer memory 247 is subject to the weighted fair queueing decision-making process. Thus, the arbitration-winning data in the queue is transferred out of the buffer memory 247 first. For example, if CBR data was assigned a higher weight (i.e., lower weight number) than UBR data, then the CBR data will probably be transferred out of the buffer memory 247 first.

Because data is delivered to the chassis switch card via the UTOPIA mux 253, this upstream FIFO in the filter 251 is not full. Of course, a FIFO that is one cell deep is either full or not full. However, for precautionary measures, this upstream FIFO can be deeper than one cell.

In the third priority level, the priority queueing mechanism uses a round robin scheme to examine the upstream FIFOs associated with each DSL-side port. If any data is present in the upstream FIFO currently selected, the priority queueing mechanism will transfer this data to the appropriate queue of the buffer memory 247. The priority queueing mechanism adheres to a round robin scheme. In accordance with one embodiment of the present invention, the implemented round robin scheme processes each unit in turn in cyclical fashion; that is, given units 1, 2, . . . , N, the round robin scheme provides for the processing of unit 1 first, then unit 2, and so on until unit N. Thereafter, the round robin scheme returns to unit 1 for processing, and then unit 2, and so on. This process is cyclical so that every unit gets processed equally.

The priority queueing mechanism adheres to a round robin scheme to examine each upstream FIFO so long as priority level 1 or priority level 2 traffic is not present. For example, the priority queueing mechanism via the arbiter 249 will examine the upstream FIFO associated with the first port (e.g., line 262). For this first port, the upstream FIFO is located in framer 243. If data exists, the priority queueing mechansim transfers that data to the upstream queue in the buffer memory 247 (for a single upstream queue implementation).

In another embodiment, the data transfer routine for this priority level 3 data is not suspended until all data associated with this upstream FIFO is processed. For example, two cells might be present in this upstream FIFO. After this first cell is transferred to the buffer memory, priority level 2 is triggered (because data has been stored in one of the upstream queues of the buffer memory 247). Instead of suspending the processing of the second cell in the upstream FIFO in framer 243, the priority queueing mechanism will begin and complete the data transfer of this second cell to the appropriate upstream queue in the buffer memory 247.

If, however, data does not exist in the upstream FIFO of the framer 243 that is associated with this first port (line 262), then the priority queueing mechanism moves on to the upstream FIFO associated with the next port (e.g., line 263) in accordance with the round robin scheme. The upstream FIFO for this second port is also located in the framer 243. If data does not exist in this upstream FIFO, the priority queueing mechanism will move on to the upstream FIFO of the next port (e.g., line 264). This process continues repeatedly. If the priority queueing mechanism reaches the upstream FIFO of the last port (e.g., line 269), the priority queueing mechanism will return to the first port (e.g., line 262). This circular cycle continues indefinitely.

If the priority queueing mechanism has to suspend priority level 3 operation because of the existence of a higher priority level traffic, the priority queueing mechanism stores the last port it processed. After taking care of the higher priority level traffic, the priority queueing mechanism will return to this last port which it was processing at the time of the suspension.

In the fourth (and lowest) priority level, the priority queueing mechanism uses a round robin scheme to examine the downstream queues in the buffer memory 247 and uses weighted fair queueing to select the particular queue to transfer the data therein to the designated framer (and hence port). In another embodiment of the present invention, the priority queueing mechanism searches for the presence of data in any downstream queue, and if multiple queues have data, the priority queueing mechanism uses a combination of round robin and weighted fair queueing to select the data for transfer.

As mentioned above, the buffer memory 247 includes a plurality of downstream queues, in which four queues are associated with each DSL-side port. Furthermore, for those queues that have data, these queues may be associated with different DSL-side ports. For example, an ABR downstream queue associated with the fifth DSL-side port and a UBR downstream queue associated with the eighth DSL-side port may have data. How does the priority queueing mechanism resolve contention? Which data will be transferred first?

In accordance with one embodiment of the present invention, the priority queueing mechanism uses round robin. to examine the group of queues associated with the ports. In other words, the priority queueing mechanism examines the group of four downstream queues associated with the first port. If any of these four downstream queues contains data, the priority queueing mechanism processes this port before moving on to examine the downstream queues of other ports. If the queues for this first port do not contain data, the priority queueing mechanism moves on to examine the group of four queues associated with the second port. This process continues where the ports are examined in round robin fashion. If any of the queues associated with the currently selected port contain data, the priority queueing mechanism will handle this data as described below. Once the queues for a currently selected port have been processed, the priority queueing mechanism moves on to the next port and its group of four queues.

If data exists in any or all of the downstream queues of a selected port, the priority queueing mechanism uses weighted fair queueing to determine which of the four downstream queues should be selected. Because the system has programmed priority weights for the various ATM service classes (e.g., ABR, CBR, UBR, VBR) that are tied to each queue, weighted fair queueing can quickly select the queue for data transfer. When a particular downstream queue has been selected, the priority queueing mechanism transfers the data in the queue to the corresponding FIFO of the framer associated with the designated port. Even if more data exists in any of the downstream queues of this selected port, the priority queueing mechanism moves on to the next port, which in effect, ensures fairness among subscribers (or certainly fairness among different ports). The priority queueing mechanism thus moves on the next port and its group of four downstream queues, in accordance with the round robin scheme.

In another embodiment of the present invention, instead of applying round robin among the downstream ports and then weighted fair queueing among the downstream queues for the selected port, the priority queueing mechanism searches for data (via a flag indicator from the queue that indicates that data is present) in all of the downstream queues and applies a combination of round robin and weighted fair queueing to the ports and queues that contain data. Initially, the priority queueing mechanism detects for data in any of the downstream queues of the buffer memory 247. If data exists in multiple queues, the priority queueing mechanism examines the priority of the queues and selects the data according to the weighted fair queueing algorithm. If both data are stored in equal priority queues (e.g., UBR queue of port two and UBR queue of port four), the priority queueing mechanism uses round robin to select the data for processing. A more detailed explanation follows.

Assume that, initially, the priority queueing mechanism searches for the presence of data in all of the downstream queues for all the ports. In a simple case, only one downstream queue in the buffer memory 247 contains data. The priority queueing mechanism processes this data by examining the downstream FIFO in the framer associated with the destination port. If the downstream FIFO in the framer is full, the data is discarded. In another embodiment, if the downstream FIFO in the framer is full, the priority queueing mechanism leaves the data intact in the downstream queue of the buffer memory 247 until the designated downstream FIFO in the framer is not full.

In a slightly more complicated case, multiple different downstream queues in the buffer memory 247 contain data. If one data is stored in a higher priority queue than another data (regardless of port), the priority queueing mechanism selects the data according to the weighted fair queueing algorithm. For example, if CBR is programmed with the highest weight (i.e., lowest weight number) and data is stored in the CBR queue of the third port and another data is stored in a VBR queue of port six, the priority queueing mechanism selects the data according to the weighted fair queueing algorithm. More than likely, the data in the CBR queue will be selected ahead of the data in the VBR queue. In a case where multiple different downstream queues in the buffer memory 247 contain data and all these queues are programmed for equal priority (e.g., all are UBR data), the priority queueing mechanism uses round robin to select the data for processing.

Generally, however, barring the presence of higher priority level traffic (i.e., priority levels 1, 2, or 3), the priority queueing mechanism searches for the presence of data in any of the downstream queues of the buffer memory 247. Once a data queue (and hence data) has been selected via a combination of round robin and weighted fair queueing, it is processed. After processing, it searches for priority level 4 data again and re-evaluates the selection via a combination of weighted fair queueing and round robin. For the most part, this re-detection and re-evaluation do not change the selection decision already made during a previous selection cycle. However, this re-detection and re-evaluation significantly change the selection decision if new data higher queueing priority has been detected.

For example, assume that four data has been initially detected and all four are at the same queueing priority (e.g., UBR). The priority queueing mechanism used round robin to select the data for processing and in this case, the order has been set so that UBR1 is processed first, then UBR2, then UBR3, and finally UBR4. While the priority queueing mechanism is processing the first selected data (i.e., UBR1) for transfer to the corresponding framer, a new data ABR1 arrives into a downstream queue in the filter. This new data corresponds to a priority level 1 data (i.e., data in a downstream queue of the filter) and hence, the priority queueinq mechanism finishes up the current transfer of UBR1 from the downstream queue of the buffer memory 247 into the designated downstream FIFO of the framer. Once completed, the priority queueing mechanism does not process the UBR2 data in this priority level 4 process. Instead, the priority queueing mechanism suspends operation of this priority level 4 process and immediately proceeds to process the filter's just-recently-filled downstream queue by transferring it to the designated downstream queue in buffer memory 247.

When this last transfer has completed, and no other higher priority level traffic exists, the priority queueing mechanism returns to the priority level 4 process that was temporarily suspended. However, instead of processing UBR2 data, the priority queueing mechanism searches for presence of data in the downstream queues again and based on the detection results, re-evaluates the selection decision. This time, a new data ABR1 has arrived into one of the downstream queues of the buffer memory. It may, for example, be programmed to have a higher weight (i.e., lower weight number) than the UBR data (i.e., assuming that the system administrator provided higher weights for ABR than UBR) so, the priority queueing mechanism used weighted fair queueing to select the data to process. Based on the selection decision, the appropriate data is handled.

In another embodiment of the present invention, the priority queueing mechanism searches for data in all of the downstream queues. Of those queues that contain data, the priority queueing mechanism applies round robin among the ports associated with these queues. Among the queues for a port, the priority queueing mechanism applies weighted fair queueing. Unlike the immediately preceding embodiment, this embodiment does not apply weighted fair queueing immediately. It examines those ports that contain data in any of its queues, applies round robin among them, and then if more than one queue for the selected port contain data, it applies weighted fair queueing among the queues.

WEIGHTED FAIR QUEUEING

In one embodiment of the present invention, weighted fair queueing is implemented in the priority queueing mechanism and applied only to the priority level 4 data; that is, weighted fair queueing is applied to the downstream queues in the buffer memory. In other embodiments, weighted fair queueing is applied to all queues in the buffer memory, whether downstream or upstream. For instructional purposes, however, the weighted fair queueing scheme in accordance with one embodiment of the present invention will be discussed with respect to the priority level 4 data.

As mentioned above, each downstream port is associated with four queues, where each queue is associated with some service class type. To ensure fairness among the subscribers of the telecommunications provider using the IMAS, the priority queueing mechanism examines each port in round robin fashion. In other words, the priority queueing mechanism examines the first port, then the second port, and so on until the last port, at which point, it cycles back to the first port and repeats the process. This is standard round robin implementation. In this way, no one port has priority over any other port; the priority queueing mechanism will examine every port with equal frequency.

Within a given port, however, the priority queueing mechanism applies weighted fair queueing. This weighted fair queueing scheme assigns weights to the various queues associated with each port to ensure that each data of a certain service class types is processed in accordance with its service requirements, while ensuring that all data is serviced at some point to maintain some sort of fairness. Thus, one queue may be assigned a greater weight (i.e., lower weight numbers) than another queue and hence, may be serviced more frequently.

In one example, the queue associated with service class 1 is assigned an original weight of 8, the queue associated with service class 2 is assigned an original weight of 4, the queue associated with service class 3 is assigned an original weight of 2, and the queue associated with service class 4 is assigned an original weight of 1. In accordance with one embodiment of the present invention, a lower weight number has a greater weight (i.e., more frequent service ratio) and will likely win the arbitration. Thus, if all four of these queues has data, the queue associated with the lowest weight number wins the arbitration. In this example, the queue with the lowest weight number is the queue associated with the weight number of 1.

Once a winner of the arbitration has been determined, the priority queueing mechanism loads the winning queue with the original weight while decrementing all other queues by one. All weight numbers are positive (or zero). If a non-winning queue has a weight number of 0, it will not be decremented further to avoid negative numbers; rather, it will keep this value until it wins the arbitration, where the queue will be loaded with the original weight number. Assume the original weights for each queue are as follows:

Queue 1—8
Queue 2—4
Queue 3—2
Queue 4—1

In this cycle, queue 4 wins the arbitration because it has the lowest weight number (i.e., 1). The data in the winning queue is then delivered from the buffer memory to the framer. The weights are then updated for the next round robin pass. Queue 4 is loaded with its original weight number 1, while the other queues decrement their respective weight numbers by 1. So, the weights for each queue are now as follows:

Queue 1—7
Queue 2—3
Queue 3—1
Queue 4—1

At this point, data may exist in any of these queues, but to ensure fairness among the subscribers (i.e., ports), the priority queueing mechanism moves on to the next port for arbitration. When the priority queueing mechanism returns to this port again through the round robin scheme, the weights are as shown above. In the event of a tie (e.g., queue 3 and queue 4), the priority queueing mechanism resolves the tie by using the original weights and letting the higher weight number win (thus, queue 1 will always win in a tie with an original weight of 8). In other words, the queuing mechanism resolves the tie by using a strict priority service routine, where queue 1 has highest priority, and queue 4 has the lowest priority. Thus, in this example, queue 3 wins. In another embodiment, ties are resolved by letting the queue with the lower original weight number win. Thus, in the above example, queue 4 wins again. The weights for these queues will now be as follows:

Queue 1—6

Queue 2–2

Queue 3–2

Queue 4–0

In accordance with one embodiment, ties are resolved by letting the queue with the higher original weight number win. For the following example, assume the queue 1 has the highest priority, and queue 4 has the lowest priority. The first row of the table represents the original weights used for the queues. Thus, for twenty round robin cycles, the weight numbers of the queues are as follows (with the underlined):

| Queue 1 | Queue 2 | Queue 3 | Queue 4 |
|---|---|---|---|
| 8 | 4 | 2 | <u>1</u> |
| 7 | 3 | <u>1</u> | 1 |
| 6 | 2 | 2 | <u>0</u> |
| 5 | <u>1</u> | 1 | 1 |
| 4 | 4 | <u>0</u> | 0 |
| 3 | 3 | 2 | <u>0</u> |
| 2 | 2 | <u>1</u> | 1 |
| 1 | 1 | 2 | <u>0</u> |
| <u>0</u> | 0 | 1 | 1 |
| 8 | <u>0</u> | 0 | 0 |
| 7 | 4 | <u>0</u> | 0 |
| 6 | 3 | 2 | <u>0</u> |
| 5 | 2 | <u>1</u> | 1 |
| 4 | 1 | 2 | <u>0</u> |
| 3 | <u>0</u> | 1 | 1 |
| 2 | 0 | 2 | 0 |
| 1 | 4 | 1 | <u>0</u> |
| <u>0</u> | 3 | 0 | 1 |
| 8 | 2 | <u>0</u> | 0 |
| 7 | 1 | 2 | <u>0</u> |

For this small sample (i.e., 20 cycles) and assuming that all queues contain data during the arbitration period, queue 4 wins 8/20, queue 3 wins 7/20, queue 2 wins 3/20, and queue 1 wins 2/20 sed, the percentage distribution should be roughly 50% for queue eue 2, and 6.75% for queue 1.

In accordance with another embodiment of the present invention, ties are resolved by letting the queue with the lower original weight number win. Using the example above where the queues are assigned original weight numbers of 8, 4, 2, and 1, the weights of the queues are as follows (with the winner underlined) for twenty round robin cycles:

| Queue 1 | Queue 2 | Queue 3 | Queue 4 |
|---|---|---|---|
| 8 | 4 | 2 | 1 |
| 7 | 3 | 1 | 1 |
| 6 | 2 | 0 | 1 |
| 5 | 1 | 2 | 0 |
| 4 | 0 | 1 | 1 |
| 3 | 4 | 0 | 0 |
| 2 | 3 | 0 | 1 |
| 1 | 2 | 2 | 0 |
| 0 | 1 | 1 | 1 |
| 8 | 0 | 0 | 0 |
| 7 | 0 | 0 | 1 |
| 6 | 0 | 2 | 0 |
| 5 | 0 | 1 | 0 |
| 4 | 4 | 0 | 0 |
| 3 | 3 | 0 | 1 |
| 2 | 2 | 2 | 0 |
| 1 | 1 | 1 | 1 |
| 0 | 0 | 0 | 1 |
| 0 | 0 | 2 | 0 |
| 0 | 0 | 1 | 1 |

Of course, these wight numbers are exemplary only. Other weight numbers can be assigned to the queues in accordane with a desired distribution scheme.

Thus, with the weighted fair queueing scheme in accordance with one embodiment of the present invention, all queues are serviced fairly but the queues that are associated with a higher weight are serviced more frequently than the other lower weight queues. Depending on the specific weights used for each queue, the percentage distribution among the queues will vary. The above example assumed that all queues contained data. If some queues do not contain data, that queue is ignored during the weighted fair queueing arbitration process. Moreover, because the priority queueing mechanism moves on to the next port in round robin fashion even if data exists in the current port, all subscribers (i.e., ports) are ensured equal access to services.

FRAME-BASED LINE CARD ARCHITECTURE

Figure 10:
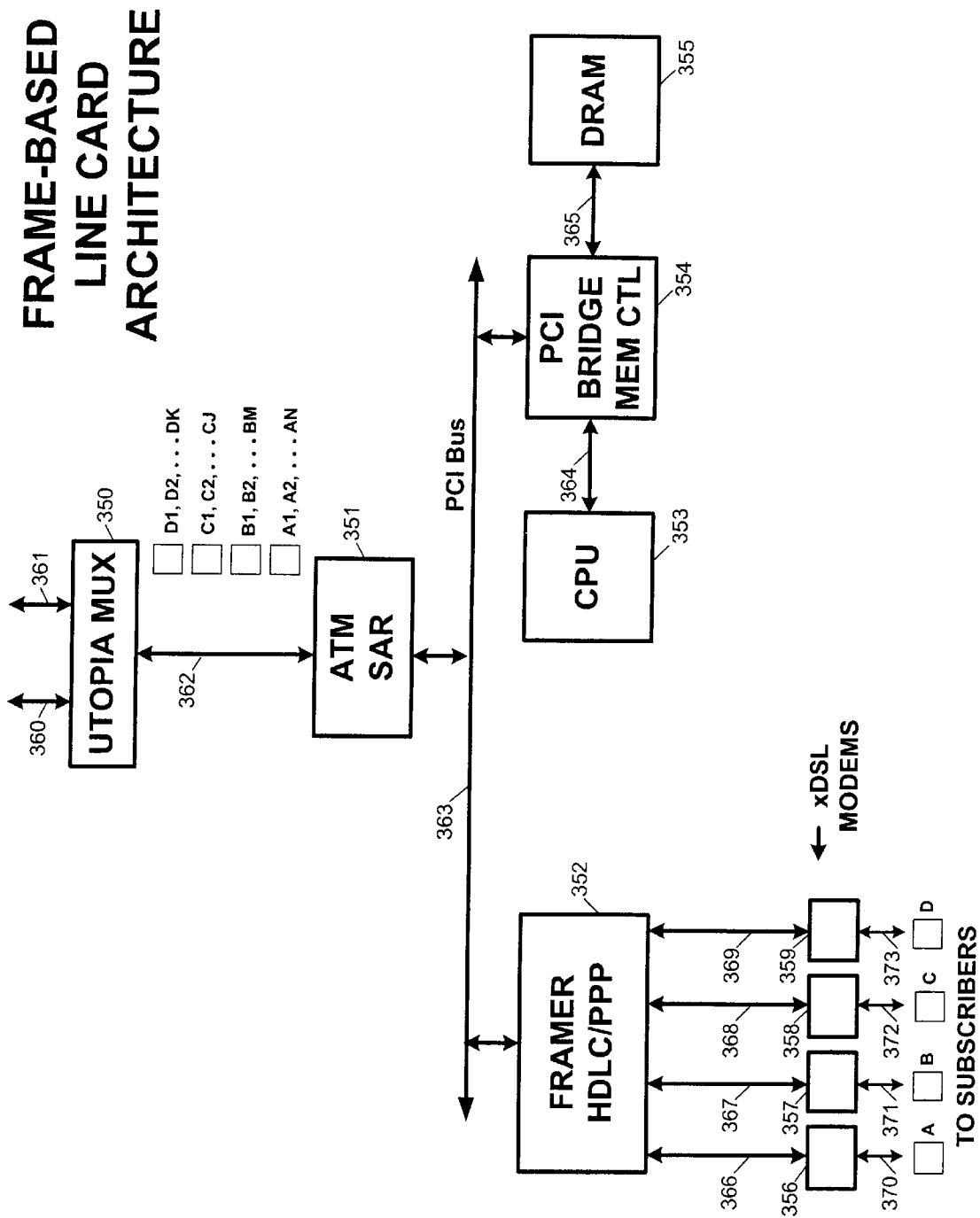
FIG. 10 shows one embodiment of a frame-based line card architecture.

Unlike the cell-based line card described above, another embodiment of the present invention uses a frame-based line card (e.g., IDSL). The frame-based line card includes many components, some of which are shown in FIG. 10. Only those components necessary to illustrate this particular embodiment of the present invention are shown. One readily skilled in the art can evaluate this frame-based line card architecture and generate other components (e.g., DMA circuits) that, while necessary, are not integral to the inventive concepts.

As shown in FIG. 10, the frame-based line card includes a UTOPIA mux 350, an ATM SAR 351, at least one framer 352, a CPU 353, a PCI bridge 354, memory in the form of DRAM 355, and a PCI bus 363. The UTOPIA mux 350 is coupled to lines 360 and 361. These UTOPIA interface lines 360 and 361 in FIG. 10 correspond to lines 48 and 49 in FIG. 5, assuming that the line card of FIG. 10 is line card 1 of FIG. 5. Only one of these lines 360 or 361 is operational at any given moment. The UTOPIA mux 350 is coupled to line 362.

An ATM SAR 351 is coupled to line 362. As described below, this ATM SAR 351 works with the CPU 353 to essentially convert cells to frames (downstream direction) and frames to cells (upstream direction). The traffic below (toward the DSL side) the ATM SAR 351 is frame-based while the traffic above (toward the UTOPIA mux 350) the ATM SAR 351 is cell-based. The ATM SAR is coupled to a PCI bus 363.

A framer 352 is coupled to the PCI bus 363. Depending on the protocol requirements of the card, the framer complies with HDLC/PPP. The framer 352 is coupled to modems 356–359 via lines 266–269, respectively. These modems 356–359 are coupled to DSL lines 370–373, respectively. Although only one framer 352 is shown, a plurality of framers may actually be implemented if more xDSL modems are used. For example, in the cell-based line card shown in FIG. 8, two framers are used to support eight modems (and hence eight DSL-side ports), or four modems per framer. In FIG. 10, only one framer 352 is shown because this figure shows only four modems 356–359. If more modems are used with this line card, more framers will be provided. In other embodiments each framer may support up to 32 physical ports, and hence, 32 modems. The framer may also be implemented in multiple chips (e.g., IDSL).

A PCI bus bridge/memory controller 354 is also coupled to the PCI bus 363, a CPU 353 via line 364, and a DRAM 355 via line 365. This PCI bridge gives the CPU access to the memory 355 and the PCI bus 363.

How do the ATM SAR 351 and the CPU 353 work together to generate frames from cells in the downstream direction and cells from frames in the upstream direction? Assume that four calls are simultaneously taking place. These calls are designated A, B, C, and D. Thus, call A is between the subscriber coupled to DSL line 370 and some other subscriber (not shown). Cells associated with call A are labeled A1, A2, . . . , AN. Call B is between the subscriber coupled to DSL line 371 and some other subscriber (not shown).). Cells associated with call B are labeled B1, B2, . . . , BM. Call C is between the subscriber coupled to DSL line 372 and some other subscriber (not shown).). Cells associated with call C are labeled C1, C2, . . . , CJ. Call D is between the subscriber coupled to DSL line 373 and some other subscriber (not shown).). Cells associated with call D are labeled D1, D2, . . . , DK. Of course, the letters N, M, J, and K are integers.

Depending on the particular frame protocol used, the frame varies in length. The memory 355 is used to store frames of data. A portion of the memory 355 is shown in FIG. 11.

As cells arrive into the ATM SAR 351, the ATM SAR 351 examines the VCI number in the cell header to determine its destination. If cell A1 arrives, it looks at the cell header and determines that the VCI numbercorresponds to the DSL-side port coupled to line 370. It processes this cell A1 by stripping the header and placing the payload into the portion of the memory 355 designated for call A (or the VCI number associated with call A). The PCI bridge/memory controller 354 actually performs the data transfer to the memory location designated for call A. The same operation is performed on other cells A2 to AN, B1 to BM, C1 to CJ, and D1 to DK. The ATM SAR's DMA engine transfers these cells to memory where the DRAM controller functions as a slave.

Figure 11:
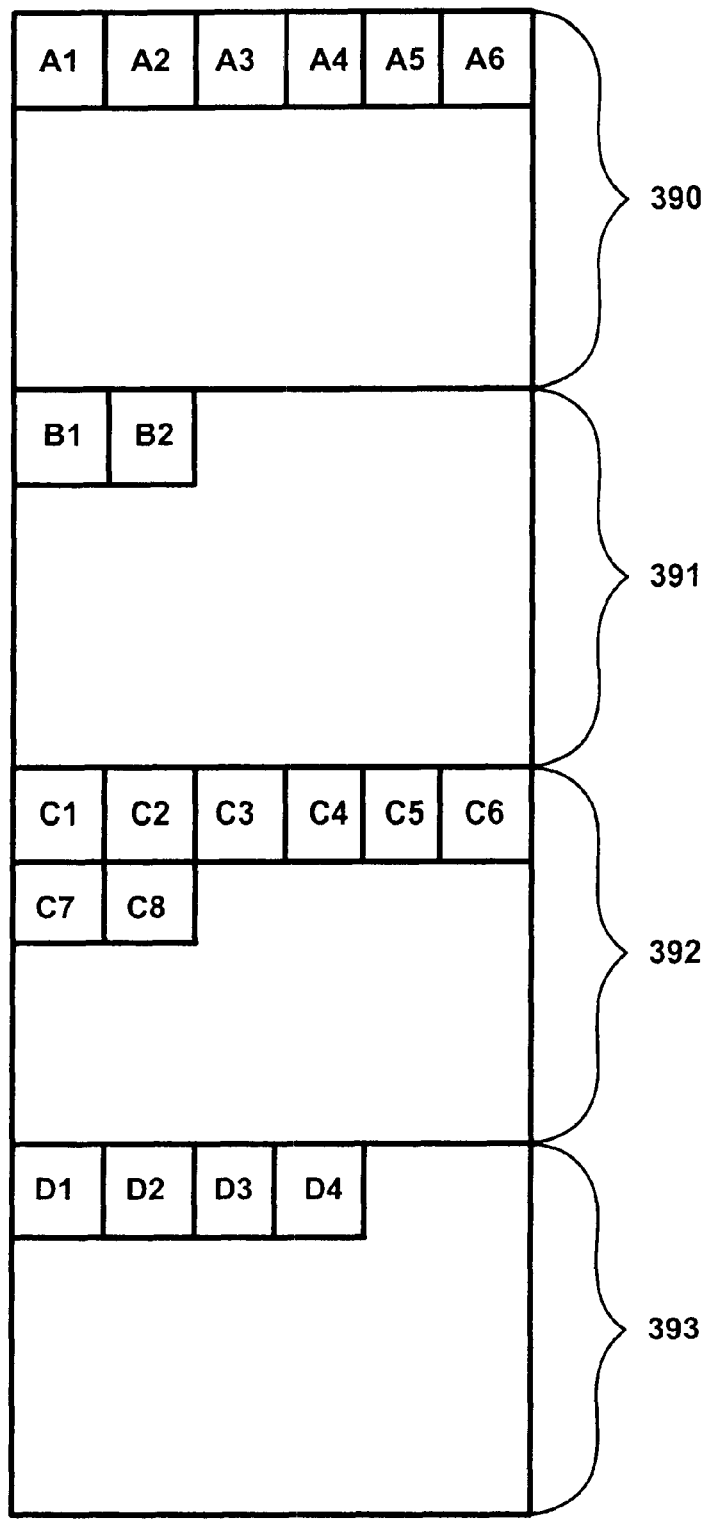
FIG. 11 shows a portion of memory where the frame-based data are stored prior to delivery to the destination.

FIG. 11 shows a snapshot of the memory contents. The group of memory locations 390 is reserved for processed cells associated with call A. The group of memory locations 391 is reserved for processed cells associated with call B. The group of memory locations 392 is reserved for processed cells associated with call C. The group of memory locations 393 is reserved for processed cells associated with call D. At this moment, memory location 390 contains only processed cells A1 to A6, memory location 391 contains only processed cells B1 and B2, memory location 392 contains only processed cells C1 to C8, and memory location 393 contains processed cells D1 to D4.

When enough processed cells of a given call are stored to make up a frame, the ATM SAR 351 alerts the CPU 353. The CPU then obtains the memory location for this frame, processes the data to generate the protocol header (e.g., connection ID, checksum, link management), determines the destination port, and the framer's DMA engine fetches the data for the corresponding destination port. Thus, it delivers frames associated with call A to line 370, frames associated with call B to line 371, frames associated with call C to line 372 and frames associated with call D to line 373.

In the upstream direction, the line card performs the reverse operation. Frames arrive from the DSL modems (356–359). The CPU 353 processes the protocol headers for these frames and places them in the designated memory location in memory 355. The CPU 353 alerts the ATM SAR that a frame is ready to be transmitted upstream. Thereafter, the ATM SAR 351 segments the frames into cells with the appropriate headers, and transmits them upstream cell-by-cell to the UTOPIA mux 350.

I/O BUS

The I/O bus is a parallel bus for sending control, data, and address signals for chassis management purposes. The chassis switch cards use this bus to manage the chassis and interrogate the line cards and system switch cards (if any exists). In one embodiment, this I/O bus is an ISA bus and is provided on the backplane for convenient access to all the components in the entire chassis. Indeed, this bus provides for a 24-bit address, 16-bit data, and can serve as an ISA bus extension via an I/O bus.

The I/O bus is used by the various components coupled to the bus to perform transactions for management, control, and monitor purposes. In particular, a CPU can control other components, assist other components in performing their jobs, and basically monitor the performance of the system via this bus. In one embodiment of the present invention, the CPU subsystem 97 (see FIGS. 6 and 7) in each chassis switch card provides the main processing brainpower for the chassis.

Figure 14:
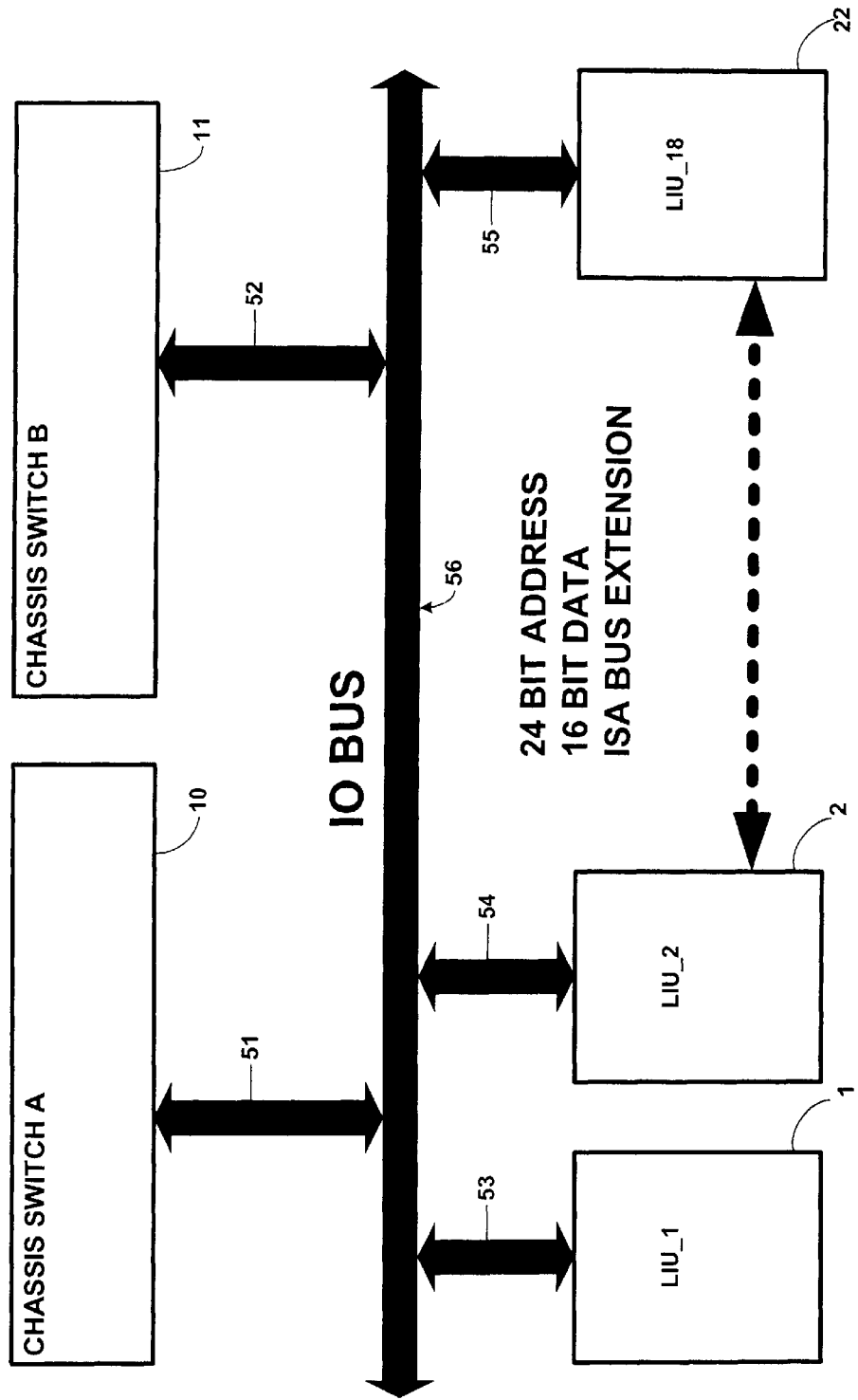
FIG. 14 shows the I/O bus topology connecting the chassis switch cards and the line cards together to allow the CPU subsystem to manage and control the various components therein, in accordance with one embodiment of the present invention.

FIG. 14 shows a high level view of the chassis I/O bus topology. In this embodiment, the I/O bus 56 is coupled to the chassis switch card 10 via bus 51, chassis switch card 11 via bus 52, and the line cards, of which three are shown here as line card 1 via bus 53, line card 2 via bus 54, and line card 22 via bus 55.

In the chassis switch card, the I/O bus is coupled to the GWI 215 via line 233 (see FIG. 7). How is the I/O bus coupled to a microprocessor? FIG. 6 shows the I/O bus (here represented by reference number 26) coupled to the CPU subsystem 97. For a closer examination, refer to FIG. 7, where the I/O Bus 215 is coupled to the ISA bus 224. This ISA bus is coupled to, among other things, an ISA bridge 210 which is coupled to a PCI bus 223, 222. The PCI bus is coupled to the PCI bridge 201, which is then coupled to a microprocessor 200.

In the line card, as shown in FIG. 8, the I/O bus is represented by reference number 279. The I/O bus 279 is coupled to an I/O bus controller 250 which provides I/O access to the various components in the line card (see FIG. 8).

I²C BUS

In one embodiment of the present invention, the IMAS uses an I²C technology to monitor and control the environmental aspect of the IMAS. This includes the fan, power supply, and temperature sensors for the chassis as well as each of the cards, including the chassis switch cards and the line cards.

As known to those skilled in the art, I²C technology requires a bidirectional 2-wire interface for inter-IC control. Indeed, the I²C bus is a 2-wire bus that allows various devices that are coupled to the bus to communicate with each other. One wire is for serial data and the other wire is for the serial clock. Each device connected to the bus is software addressable by a unique. address and operates in a master/slave relationship. The technology also allows for multi-master capability.

Figure 15:
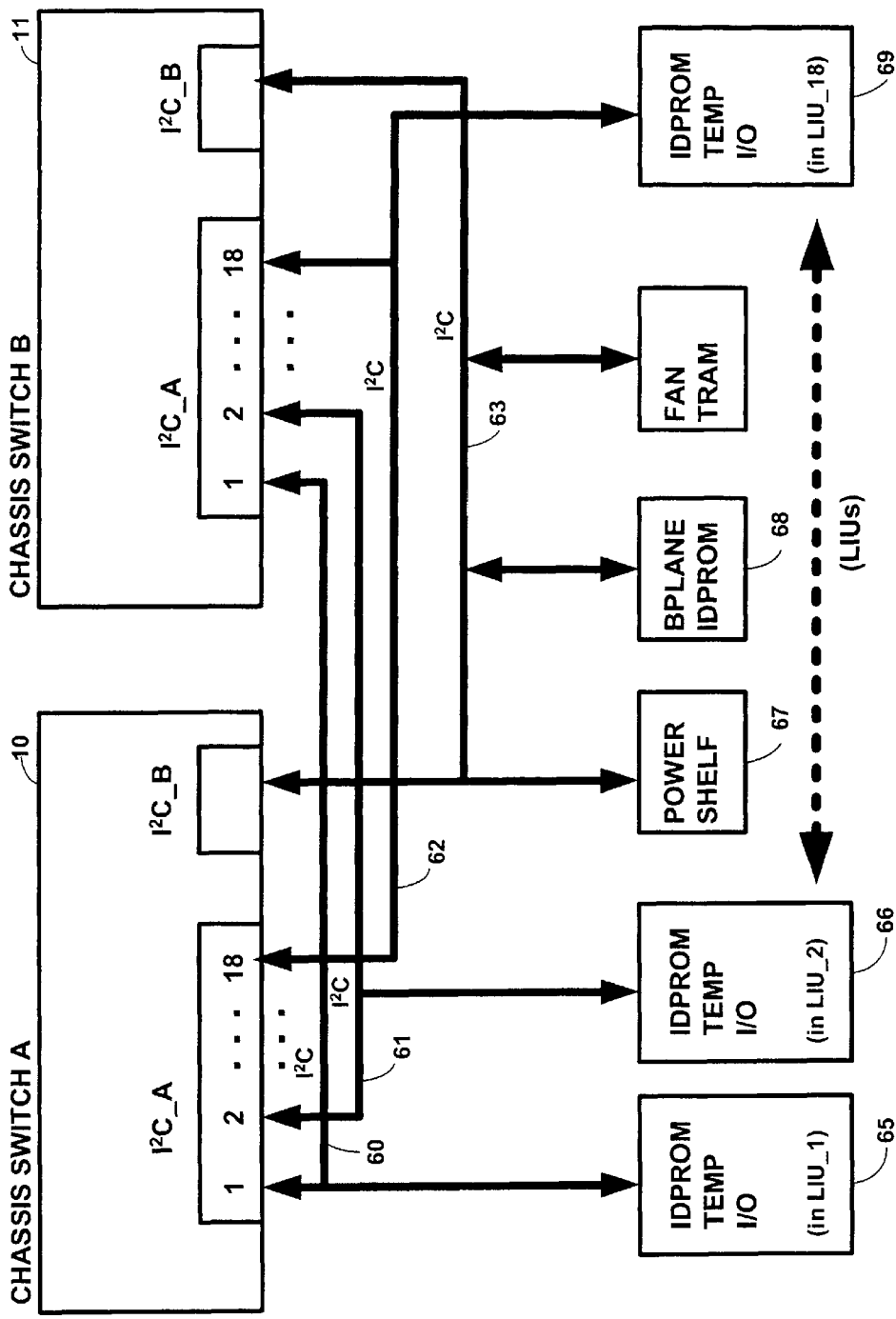
FIG. 15 shows the I$^2$C bus topology in accordance with one embodiment of the present invention.

FIG. 15 shows one embodiment of the present invention. One of the buses that couple the chassis switch cards 10 and 11 to the line cards is the I²C bus. Here, because eighteen line cards are used, eighteen separate I²C buses are also provided. In each chassis switch card, two I²C ports are provided. One I²C port, I²C_A is coupled to the CPU subsystem 97 of the chassis switch card (see I²C_A line 27 in FIG. 6, and line 231 in FIG. 7). On the line card side, this I²C_A port is coupled to various memory devices. The other I²C port, I²C_B, is coupled between the chassis switch cards and the power shelf and the backplane IDPROM.

For the first set of I²C buses, I²C_A, chassis switch cards 10 and 11 are coupled to IDPROM 65 in line card 1 (LUI_1) via I²C bus 60. Chassis switch cards 10 and 11 are coupled to IDPROM 66 in line card 2 (LUI_2) via I²C bus 61. This continues for each of the IDPROMs in each line card up to the last line card 18, in which chassis switch cards 10 and 11 are coupled to IDPROM 69 in line card 18 (LUI_8) via I²C bus 62. These IDPROMs contain various environmental settings information for each line card.

To monitor and control the environmental settings for the other components in the chassis, a nineteenth copy of the I²C bus is provided. Chassis switch cards 10 and 11 use port I²C_B to communicate with the power shelf 67 and the backlane IDPROM 68 via I²C bus 63. This bus allows the system to examine power supply settings and fan states of the chassis.

The SMB controller 214 is the primary microcontroller for the I²C bus (see FIG. 7). This SMB controller 214 is coupled to the system microprocessor 200 via ISA bus 224, ISA bus bridge, 210, PCI bus 223, and PCI bridge 201.

The I²C buses are also coupled to I/O port devices for power monitoring, power control, and isolation control. If a line card fails for some reason and hangs up the I/O bus so that no other transaction can take place across this I/O bus, the CPU uses the I²C bus for isolation control. The CPU in effect sends a command via the I²C bus to isolate this defective line card off the I/O bus so that other devices can access the I/O bus.

MISCELLANEOUS BACKPLANE BUS SIGNALS

The IMAS includes a number of miscellaneous signals that are routed across the backplane to identify which cards are present and to perform individual card functions. These miscellaneous signals are provided in Tables B–E below.

TABLE B

Line Card Signal Description (Slots 1–9 & 12–20)

| Signal name | Description |
| --- | --- |
| SCL | I²C Bus Clock source/sink |
| SDA | I²C Bus Data source/sink |
| UTXDA <7:0> | UTOPIA Transmit Data to Line Card from CSC A |
| UTXCLKA | UTOPIA Transmit Clock to Line Card from CSC A |
| UTXENA | UTOPIA Transmit Enable to Line Card from CSC A |
| UTXSOCA | UTOPIA Transmit Start of Cell to Line Card from CSC A |
| UTXCLAVA | UTOPIA Transmit Cell Available from Line Card to CSC A |
| URXDA <7:0> | UTOPIA Receive Data from Line Card to CSC A |
| URXCLKA | UTOPIA Receive Clock to Line Card from CSC A |
| URXENA | UTOPIA Receive Enable to Line Card from CSC A |
| URXCLAVA | UTOPIA Receive Cell Available from Line Card to CSC A |
| URXSOCA | UTOPIA Receive StartOfCell from Line Card to CSC A |
| UTXDB <7:0> | UTOPIA Transmit Data to Line Card from CSC B |
| UTXCLKB | UTOPIA Transmit Clock to Line Card from CSC B |
| UTXENB | UTOPIA Transmit Enable to Line Card from CSC B |
| UTXSOCB | UTOP1A Transmit Start of Cell to Line Card from CSC B |
| UTXCLAVB | UTOPIA Transmit Cell Available from Line Card to CSC B |
| URXDB <7:0> | UTOPIA Receive Data from Line Card to CSC B |
| URXCLKB | UTOPIA Receive Clock to Line Card from CSC B |
| URXENB | UTOPIA Receive Enable to Line Card from CSC B |

TABLE B-continued

Line Card Signal Description (Slots 1–9 & 12–20)

| Signal name | Description |
| --- | --- |
| URXCLAVB | UTOPIA Receive Cell Available from Line Card to CSC B |
| URXSOCB | UTOPIA Receive StartOfCell from Line Card to CSC B |
| CardPresent_Out* | Card Present signal pulled to Logic_GND by Line Card |
| SlotID_In <4:0> | Slot Identifier - 5 bits hard coded on backplane to represent slot number. |
| Top_Insert_In | Pin on backplane used to ensure card is fully inserted before power up begins. |
| Bot_Insert_In | Pin on backplane used to ensure card is fully inserted before power up begins. |
| −48Vsupply | Negative supply paths - may be sequenced |
| −48Vreturn | Positive return paths - may be sequenced |

TABLE C

Chassis Switch Card (Slots 10 & 11) (Cubit Implementation only)

| Signal Name | Description |
| --- | --- |
| SCLA <17:0> | I²C Bus Clock source/sink |
| SCLB <17:0> | I²C Bus Clock source/sink |
| SDA_A <17:0> | I²C Bus Data source/sink |
| SDA_B <17:0> | I²C Bus Data source/sink |
| UTXD <7:0><17:0> | UTOPIA Transmit Data from CSC Slots to Line Card Slots 1 thru 9 and 12 thru 20 inclusive |
| UTXCLK <17:0> | UTOPIA Transmit Clock from CSC Slots to Line Card Slots 1 thru 9 and 12 thru 20 inclusive |
| UTXEN <17:0> | UTOPIA Transmit Enable from CSC Slots to Line Card Slots 1 thru 9 and 12 thru 20 inclusive |
| UTXSOC <17:0> | UTOPIA Transmit Start of Cell from CSC Slots to Line Card Slots 1 thru 9 and 12 thru 20 inclusive |
| UTXFull <17:0> | UTOPIA Transmit Full to CSC Slots from Line Card Slots 1 thru 9 and 12 thru 20 inclusive |
| URXD <7:0><17:0> | UTOPIA Rcv Data from Line Card Slots 1 thru 9 and 12 thru 20 incl. |
| URXCLK <17:0> | UTOPIA Rcv Clock to Line Card Slots 1 thru 9 and 12 thru 20 incl. |
| URXEN <17:0> | UTOPIA Rcv Data Enable to Line Card Slots 1 thru 9 & 12 thru 20 incl. |
| URXEmpty <17:0> | UTOPIA Rcv Empty from Line Card Slots 1 thru 9 & 12 thru 20 incl. |
| URXSOC <17:0> | UTOPIA Rcv Start of Cell from Line Card Slots 1 thru 9 & 12 thru 20 incl. |
| CardPresent_Out* | Card Present signal pulled to Logic_GND by installed Card |
| CardPresent_In <18:0> | Card present signal from all other cards in the chassis. |
| SlotID_In <4:0> | Slot Identifier - 5 bits hard coded on backplane to represent slot number. |
| Top_Insert_In | Pin on backplane used to ensure card is fully inserted before power up begins. |
| Bot_Insert_In | Pin on backplane used to ensure card is fully inserted before power up begins. |
| −48Vsupply | Negative supply paths - may be sequenced |
| −48Vreturn | Positive return paths - may be sequenced |

For Tables B and C, the SCL and SDA connectors are used for I²C purposes.

CHASSIS BANDWIDTH RESOURCES

In one embodiment of the present invention, the IMAS is designed for the following bandwidth requirements. As provided in FIG. 5, the telecommunications backbone-side complies with OC-3, STS-3, T3, or E3. Accordingly, the chassis switch cards 10 and 11 support interfaces to these standard requirements.

In one embodiment, each telecommunications backbone-side line (e.g., line 45) handles information flow with data rates of 155 Mbps. A given chassis switch card, such as chassis switch card 10, has two ports 44 and 45. However, in accordance with one embodiment of the present invention, only one is operational while the other is in active backup (or hot backup) mode. Thus, the IMAS can support 155 Mbps for the full duplex traffic across any one of the lines 44 or 45.

The star configuration backplane connection 50 represents 5 Gbps total capacity. How is this total capacity calculated? In one embodiment, each CSC-to-LIU line (e.g., line 40) is 8 bits wide and the line card microprocessor speed is 20 MHz, resulting in a possible data rate of 160 Mbps (8 bits×20 MHz). Thus, each of these CSC-to-LIU lines can handle 155 Mbps traffic to mirror that of the telecommunications backbone interface requirements (i.e., lines 44 or 45). For thirty-six lines in the backplane connections 50, the total capacity is approximately 5.5 Gbps (18 line cards; 18 lines per chassis switch card for each line card; 36 lines for two chassis switch cards; 36×155 Mbps=5.5 Gbps).

In one embodiment, the switching capacity inside each of the chassis switch cards supports 640 Mbps. Referring to FIG. 6, a cubit device is coupled to each of the two telecommunications backbone ports (i.e., lines 44 and 45) as well as each of the CSC-to-LIU ports. For eighteen line cards, eighteen cubits are provided. These cubit devices share a common bus 94 that provides 32 data bits at 20 MHz (FIG. 6). Thus, the total bandwidth is 640 Mbps. Each cubit can support 155 Mbps.

The path from the telecommunications backbone interface (e.g., lines 44 and 45 of FIG. 5) to the line card CSC-side ports (chassis switch fabric 50 (FIG. 5) supports 155 Mbps. This path runs through the chassis switch cards. Each cubit device, which is used to switch the telecommunications backbone-side with the LIU-side, supports 155 Mbps. The shared common bus 94 (FIG. 6) for the cubits inside the chassis switch cards is 640 Mbps. Accordingly, the downstream direction is non-blocking in that any traffic coming from the telecommunications backbone can be routed unimpeded to the line cards; that is, the switch fabric in the IMAS is non-blocking up to the loop technology interface (line cards).

The line cards, however, provide some blocking in the downstream direction. But this cannot be avoided due to the much lower bandwidth of the loop technology. How much blocking exists? The particular xDSL technology selected and deployed for the subscriber loop plays a significant role in how much blocking exists. Depending on the xDSL technology, the data rates across each line (e.g., DSL lines 31–36) will be as specified in Table A above (BACKGROUND section). For example, if ADSL is the selected loop technology, the maximum data rate in the downlink direction (i.e., IMAS line card to subscriber) is 8 Mbps, which is far less than the 155 Mbps supported in the chassis switch cards and the chassis switch fabric 50. For the most part, the line card's priority queueing mechanism, as explained above, designates downstream traffic as the highest priority. Accordingly, all downstream backplane traffic present on the backplane (via the UTOPIA mux) is processed first over all other types of traffic to ensure no blocking on CSC switch fabric.

In the upstream direction, the amount of blocking depends on the bandwidth and the number of subscribers (and hence the number of DSL-side line card ports) the telecommunications service provider wants to support with the IMAS. If more subscribers are supported, the more likely that blocking may exist across the switching fabric. To appreciate this phenomenon, examine two cases below. For both cases, assume that ADSL is the chosen loop technology.

In the first case, the service provider installs an IMAS in the central office. This IMAS contains eighteen line cards with eight DSL-side ports per line card and two chassis switch card. This configuration is shown in FIG. 5. In the upstream direction, the maximum ADSL speed is 640 Kbps. For eight DSL-side ports, the line card handles 5.12 Mbps. (640 Kbps×8 ports). Inside the line card, the shared bus can support 640 Mbps (32-bit at 20 MHz). The priority queueing mechanism ensures that some buffering is performed for speed matching and queueing purposes.

Although the line card has two upstream ports, only one is operational at any given time. Thus, the line card is like a concentrator that can receive traffic from eight different sources but output traffic at only one CSC-side port. So far, the single upstream output from the line card can run at 5.12 Mbps. For eighteen line cards, these eighteen outputs are provided to both chassis switch cards.

Each DSL-side cubit (e.g., cubits C0–C17 of FIG. 6) can support up to 155 Mbps. Because each LIU-to-CSC line (e.g., line 38 in FIG. 5) runs at 5.12 Mbps, these LIU-to-CSC cubits can support this upstream traffic. This traffic can also be supported by the shared bus 94 because this bus runs at 640 Mbps (FIG. 6).

Like the line cards, the chassis switch card is analogous to a concentrator. It can receive traffic from eighteen different sources (i.e., line cards) and output traffic on only one telecommunications backbone-side port (either line 44 or 45 for chassis switch card 10 in FIG. 5). On the telecommunications backbone-side, only one of the two uplink cubits (e.g., C18 and C19 of FIG. 6) is fully operational while the other is in active backup mode. Collectively, the total bandwidth for these eighteen lines from the line cards is 92.16 Mbps (5.12 Mbps×18 LIU-to-CSC ports). This bandwidth can be supported by either of the two cubits (e.g., cubit C18 or C20 in FIG. 6) since each cubit can support 155 Mbps. Thus, in this case where eighteen line cards with eight DSL-side ports are provide per line card, the IMAS provides non-blocking in the upstream direction across the chassis switch fabric 50 and the chassis switch cards 10 and 11 (FIG. 6).

A second case alters the upstream non-blocking feature of the IMAS. In this case, assume that the same number of line cards (i.e., 18) and chassis switch cards (i.e., 2) are used. However, to increase subscriber count, each line card has sixteen DSL-side ports instead of the eight DSL-side ports used for the first case. In this second case, the number of DSL-side ports is doubled.

In the upstream direction, the maximum ADSL speed is 640 Kbps. For sixteen DSL-side ports, the line card handles 10.24 Mbps (640 Kbps×16 ports). For eighteen line cards, these eighteen outputs are provided to both chassis switch cards. Each DSL-side cubit (e.g., cubits C0–C17 of FIG. 6) can support up to 155 Mbps. Because each LIU-to-CSC line (e.g., line 38 in FIG. 5) runs at 10.24 Mbps, these LIU-to-CSC cubits can support this upstream traffic. Collectively, the total bandwidth for these eighteen lines from the line cards is 184.32 Mbps (10.24 Mbps×18 LIU-to-CSC ports). This traffic can also be supported by the shared bus 94 because this bus runs at 640 Mbps (FIG. 6).

As mentioned above, each chassis switch card can use only one of the two uplink cubits (e.g., C18 and C19 of FIG. 6) on the telecommunications backbone-side. The collective bandwidth of the traffic from all eighteen DSL-side cubits is 184.32 Mbps, as calculated above. This bandwidth cannot be supported by either of the two cubits (e.g., cubit C18 or C20 in FIG. 6) since each cubit can support 155 Mbps. Thus, in this case where eighteen line cards with sixteen DSL-side ports are provided per line card, the IMAS provides some blocking in the upstream direction across the chassis switch fabric 50 and the chassis switch cards 10 and 11 (FIG. 6).

Note that traffic is statistical in nature; that is, blocking may be encountered during near-peak to peak times where nearly all of the DSL-side ports are used. Similar calculations can be made for the different DSL technologies in a straightforward manner. The only difference is the upstream and downstream bandwidth on the DSL lines.

However, this example assumes that all upstream traffic goes through only one of the chassis switch cards. As discussed above, the IMAS supports load balancing between the chassis switch cards so that one chassis switch card can support some traffic while the other chassis switch card can support the remaining traffic. With such a load balancing scheme, the IMAS provides non-blocking for the implementation described above in the example where the collective bandwidth from the eighteen lines from the line cards is 184.32 Mbps. Instead of one concentrator supporting eighteen lines, two concentrators are provided to support nine lines each, assuming that each card handles an equal load.

Similarly, blocking can be minimized by reducing the bandwidth for the upstream DSL lines. Instead of the maximum bandwidth of 640 Kbps, the IMAS can reduce the bandwidth to 200 Kbps, for example, and blocking would be minimized.

SYSTEM SWITCH ARCHITECTURE

As described briefly above, the system switch cards are used primarily for expansion purposes by providing connectivity between multiple chassis's. The system switch card is also a full function standalone ATM switch implemented mostly as a single card. Because it is implemented on the same platform and form factor as the line cards, the system switch card can be located in one of the line card slots in the IMAS chassis. Each system switch card contains a 5 Gbps switching fabric, therefore, in dual SSC configurations, the two system switch cards provide 10 Gbps of ATM switching. Similar to the CSC, the system switch card is also designed with multiple WAN interfaces.

Figure 13:
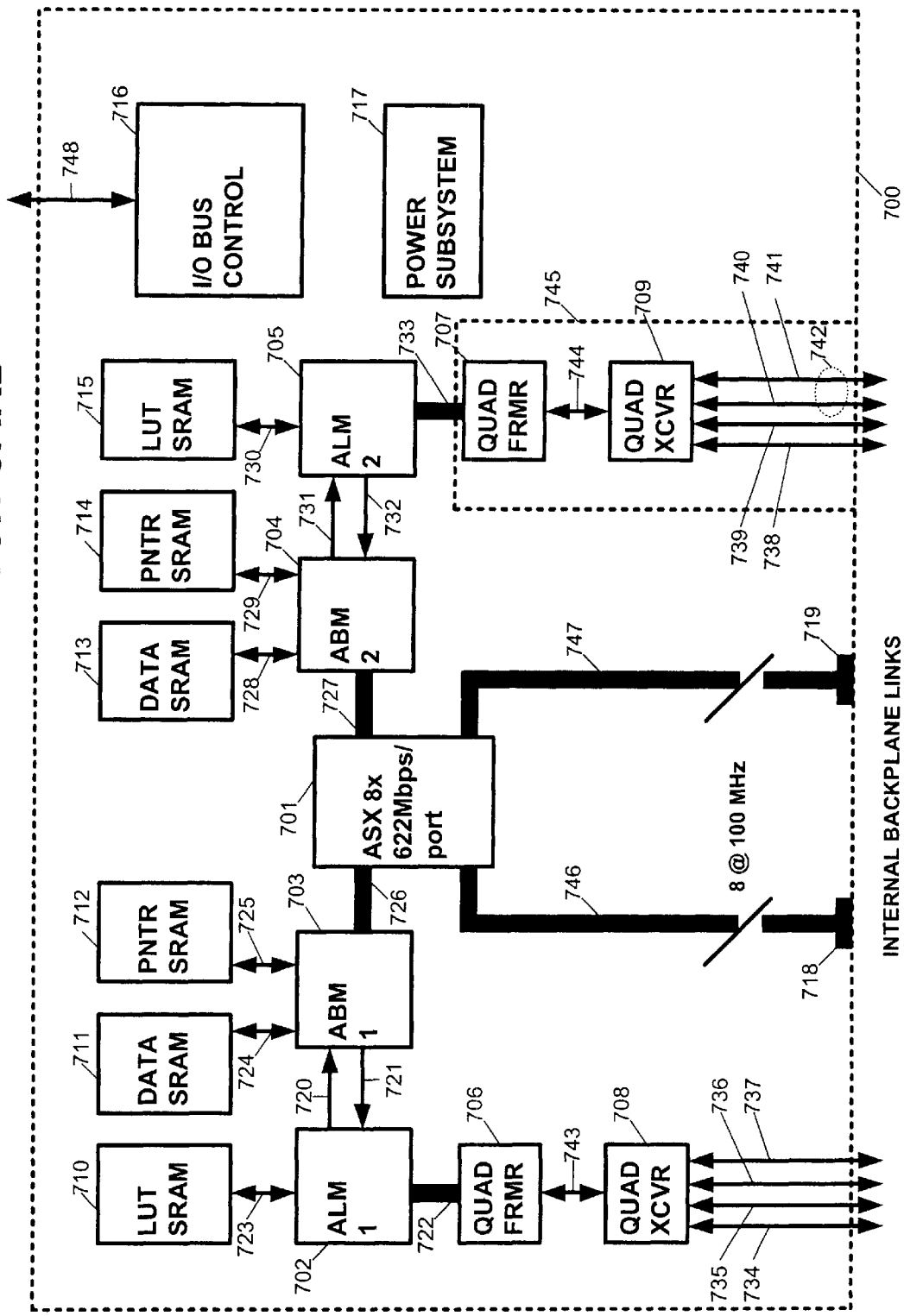
FIG. 13 shows one embodiment of the system switch card architecture.

In one embodiment, the system switch card provides 4 ports per card, but this can be expanded using an SSC ATM adaptor module, as shown in FIG. 13. As explained below, an eight-port SSC uses some of the ATLANTA switch chip set available from Lucent. These chips provide a highly integrated VLSI solution for implementing complete ATM funtionality. The chip set includes the ALM, ABM, and ASX.

Figure 12:
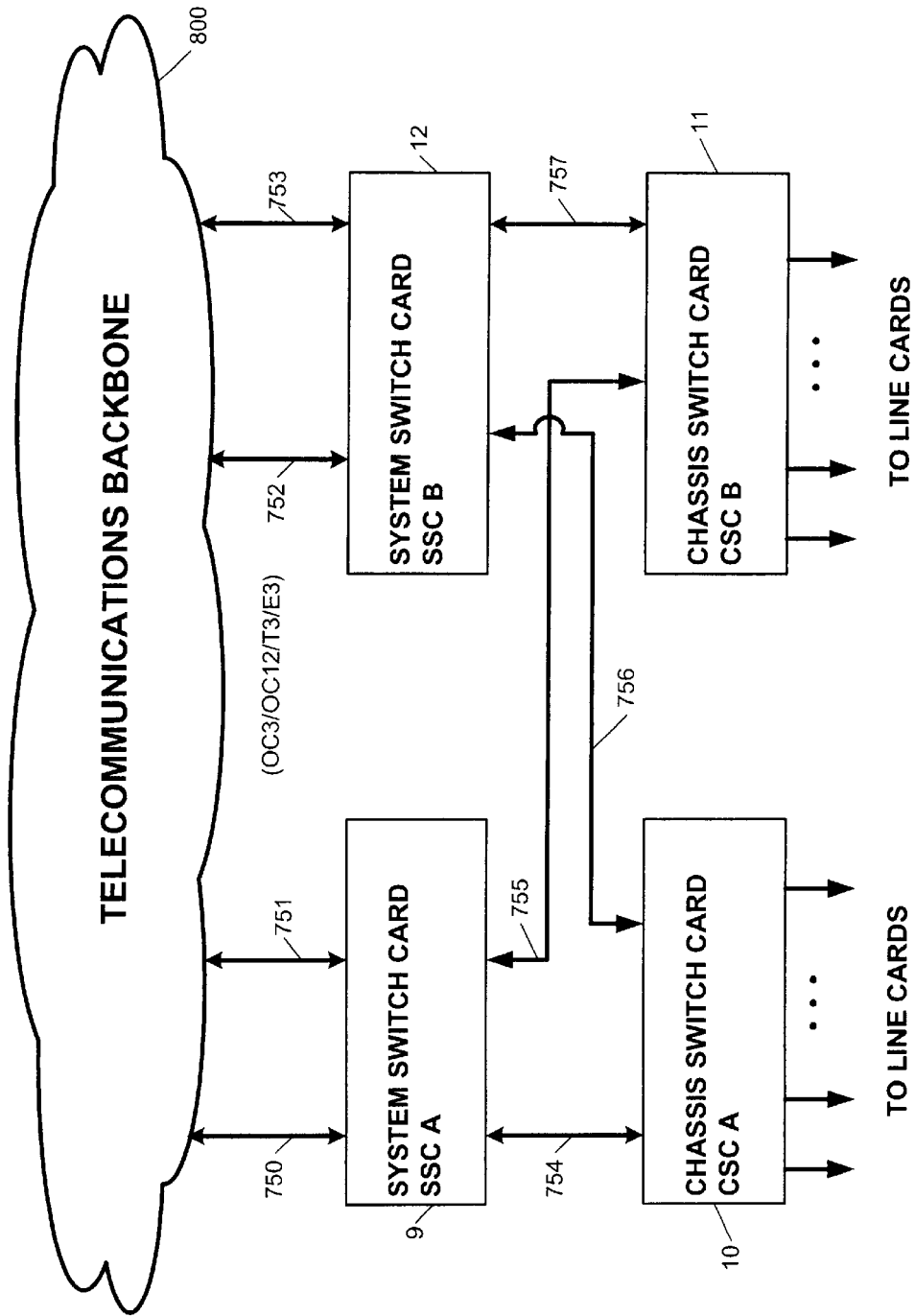
FIG. 12 illustrates another embodiment of the present invention in which system switch cards are used for expansion purposes.

Referring now to FIG. 12, the two system switch cards 9 and 12 have four ports each and are normally inserted in the card slots shown in FIG. 3. The system switch cards 9 and 12 are coupled to the chassis switch cards 10 and 11, as well as the telecommunications backbone 800. System switch card 9 is coupled to chassis switch card 10 via line 754, and to chassis switch card 11 via line 755. System switch card 12 is coupled to chassis switch card 10 via line 756, and to chassis switch card 11 via line 757. Without the system switch cards, these lines 754–757 would normally be coupled to the telecommunications backbone 800; that is, these lines 754–757 in FIG. 12 correspond to lines 44–47 in FIG. 5, respectively. With more ports, more chassis switch cards can be supported.

The system switch cards are also coupled to the telecommunications backbone 800. System switch card 9 is coupled. to the telecommunications backbone 800 via lines 750 and 751. System switch card 12 is coupled to the telecommunications backbone 800 via lines 752 and 753. In this example, the link to the telecommunications backbone 800 is represented by telecommunications lines that comply with OC-3, OC-12, STS3, T3, or E3. However, other high capacity network-to-network digital transmission link technologies can be supported.

In FIG. 13, a more detailed view of an eight-port system switch card is shown. This system switch card was expanded to eight ports with an adaptor module 745, where six ports are used for the chassis switch cards and two ports are used for the telecommunications backbone.

One set of ports is coupled to the chassis switch cards. These ports are coupled to links 734–739. The other set 742 of ports is coupled to the telecommunications backbone. These ports are coupled to links 740 and 741. In one embodiment, link 741 is fully operational while link 740 is in active or hot backup mode.

Links 734–737 are coupled to a quad transceiver 708 which is coupled to a quad framer 706 via line 743. Links 738–741 are coupled to quad transceiver 709, which is coupled to quad framer 707 via line 744. The framers operate as described above for the chassis switch cards. On the receive side, the framer performs byte alignment and frame synchronization, frame descrambling, frame overhead analysis, ATM cell synchronization, ATM cell header error correction, and ATM cell payload descramble. On the transmit side, the framer performs ATM cell payload scramble, ATM HEC generation, frame overhead generation, frame assembly, and frame scrambling. In one embodiment of the present invention, the framer is Toshiba TC35823F Quad controller.

A first ALM chip 702 is coupled to the quad framer 706 via line 722. A second ALM chip 705 is coupled to the quad framer 707 via line 733. Each ALM chip is an ATM layer UNI manager which performs UNI or NNI management functions on as many as 30 full-duplex physical (PHY) ports with an aggregate bandwidth of up to 622 Mbps. This chip is available from Lucent. Each ALM chip is packaged in a 240-pin SQFP.

A first ABM chip 703 is coupled to the ALM chip 702 via lines 720 and 721. A second ABM chip 704 is coupled to the ALM chip 705 via lines 731 and 732. Each ABM chip is an ATM buffer manager that incorporates flexible schemes for cell buffering, queue management, and scheduling to enable construction of high-performance, scalable, nonblocking switch fabrics. This. chip is available from Lucent. Each ABM chip is packaged in a 388-pin BGA.

In one embodiment, each ABM chip supports 16K cells, 8K on ingress and 8K on egress. Up to four queues are provided per port with QoS support. Over the four queues, the system switch card utilizes a two-level weighted round robin scheduling. The ALM and ABM devices can be used together to create port cards for an ATM switch or to build a complete ATM multiplexer/concentrator with up to 30 full duplex PHY ports.

Both ALM and ABM chips require a certain amount of associated external memory in order to provide the required functions of an ATM switch. The ALM needs external memory to keep all the connection tables and all collected statistics information. The ABM uses external memory for cell buffers. The size of each of these memory spaces is flexible and has a direct impact on the number of resources supported by the associated device. In one embodiment, the SRAMs are the synchronous flow-through SRAM family from Micron, Toshiba, or Samsung, which come in pin compatible configurations of 32K×32/36, 64K×32/36, and 128K×32/36. One configuration assumes that the memory is used solely for ingress and egress look-up and translation tables, whereas another configuration assumes that the memory also contains all of the policing parameters and statistics counters. Although the minimum number of connections supported for the downlink ALM is 8K and the minimum number of connections for the uplink ALM is 16K, in one embodiment, the ALMs will support 32K connections.

Both ALM chips are coupled to SRAM look-up tables. The first ALM chip 702 is coupled to SRAM look-up table 710 via line 723. The second ALM chip 705 is coupled to SRAM look-up table 715 via line 730. As stated above, this memory holds statistics and policing information on a per connection basis as well as standard translation functions. The memory spaces are used for index look-up table, policing parameter table, virtual connection parameter table, ingress counters, egress counters, and header translation table.

Both ABM chips are coupled to data SRAMs and pointer SRAMs. The first ABM chip 703 is coupled to data SRAM 711 via line 724, and pointer SRAM 712 via line 725. The second ABM chip 704 is coupled to data SRAM 713 via line 728, and pointer SRAM 714 via line 729. In one embodiment, the data SRAM is 128K×36. Thus, the ABM chips can buffer 8K cells on ingress and 8K cells on egress. Due to the required 64-bit wide data path, two devices are necessary. For larger buffer sizes, two more memory devices would be required. Each ABM chip uses a pointer SRAM to manage the multiple queues in the cell buffer memory. The ABM uses a link list structure that is 18 bits wide in one configuration. The two configurations are 64K×18 and 128K×18 device per ABM chip.

An ASX chip 701 is coupled to the first ABM chip 703 via line 726 and to the second ABM chip 704 via line 727. The ASX is an ATM shared memory switching element providing an 8-port (622 Mbps per port) full duplex system. The ASX provides a total bandwidth of 5 Gbps (622 Mbps×8 ports). This chip is also available from Lucent. The ASX chip is packaged in a 388-pin BGA.

Two of the eight ports (e.g., lines 746 and 747) of the ASX chip 701 are coupled to the backplane via internal backplane links 718 and 719. These ports are for integration with CSCs.

For management and control by the CPU subsystem 97 in the chassis switch card (see FIGS. 6 and 7), an I/O bus 745 is provided across the backplane. This I/O bus 745 is coupled to the CPU subsystem 97. An I/O bus controller 716 resides in the system switch card and contains address decoders and registers to handle data transfers between the CPU subsystem 97 and any component in the system switch card across the I/O bus 745. Although FIG. 13 shows the I/O bus controller 716 coupled only to the I/O bus, this is not the case. As known to those skilled in the art, the I/O bus controller is coupled to most, if not all, of the components in the system switch card which require management and control by the CPU subsystem 97. I/O bus 745 of FIG. 13 is coupled to I/O bus 56 of FIG. 14 and I/O bus 26 of FIG. 6.

The system switch card also contains a power subsystem 717. The system relies on the delivery of a sufficient −48 VDC power supply source. The −48 VDC power is distributed across the backplane to all cards. Each card in the system is responsible for deriving its own working voltages from this −48 VDC in the most effective manner. In the system switch card shown in FIG. 13, power subsystem 717 is provided to perform DC-to-DC conversion for supplying the required onboard voltage rails. In one embodiment, the system switch card requires +5V and +3.3V power rails.

IV. SOFTWARE

The following discussion provides a description of the software system design of the IMAS. Note that the HARDWARE section above discussed some software aspects of the present invention in order to facilitate the teaching of the IMAS's. operation. This SOFTWARE section will first discuss the Network Management System (NMS) and its interface with the IMAS. Then, a discussion of the software architecture of the IMAS itself will be provided. Finally, this patent specification will conclude with a discussion of the proxy signaling aspect of the present invention before presenting the CLAIMS.

In one embodiment of the present invention, the IMAS generally includes a high performance ATM switch core/fabric, multiple xDSL line cards, and a network management system (NMS) to manage and control the chassis. The ATM switch core/fabric, and the multi-port xDSL line cards were discussed above in the HARDWARE section. The NMS and other software features of the IMAS will be discussed in this SOFTWARE section of the patent specification.

External to the IMAS chassis, the software portion of the present invention includes the NMS. Among the many components of the NMS is an IMAS device manager and a management information base (MIB) file that allows the NMS (regardless of manufacturer) to communicate with the IMAS for configuration and data collection.

In the IMAS chassis itself, the software components are proxy signaling, link management (e.g., ILMI), call routing (e.g., PNNI), chassis management, and protocol management (e.g., IP, PPP, Ethernet, AAL5).

Finally, the IMAS chassis includes several software entities that are responsible for the SVC proxy signaling aspect of the present invention. With this feature, the IMAS includes the requisite logic so that even if one side of the IMAS (e.g., DSL subscriber line) is PVC-based, the other side of the IMAS can support SVC. If both sides are SVC-based, the IMAS also supports this configuration.

NETWORK MANAGEMENT SYSTEM (NMS) AND IMAS INTERFACE

Generally, the software portion of the present invention is driven by a sophisticated network management system (NMS). The NMS is used by network administrators to configure, monitor, and otherwise control the operation of various equipment such as the various central office switches, DSLAMs, and the IMAS. In one embodiment, the NMS includes a fully integrated system based on JAVA allowing remote network management from any JAVA enabled browser. A more detailed treatment of the core NMS functionality will be provided below.

Figure 16:
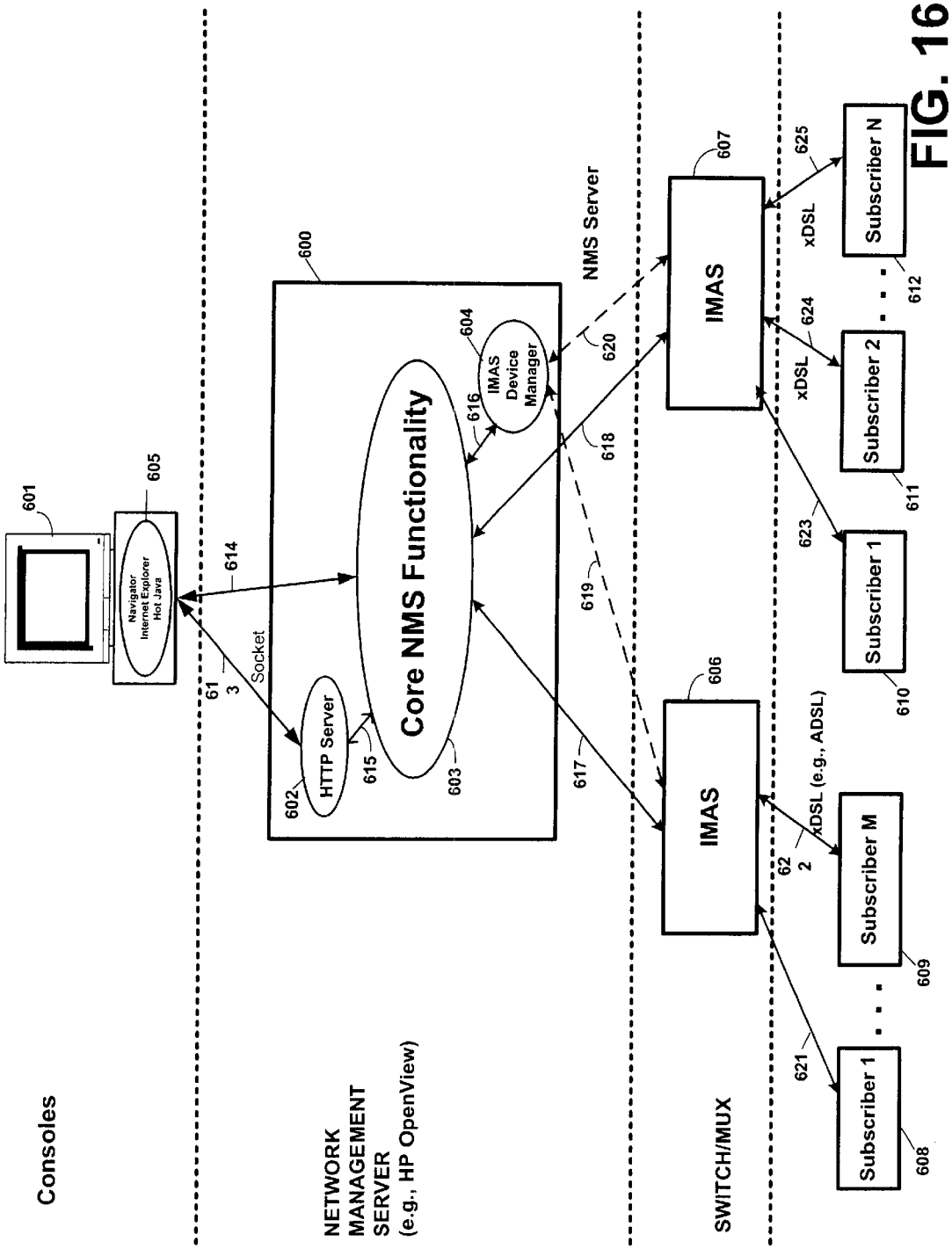
FIG. 16 provides a high level view of the network management system (NMS), which includes the consoles, the NMS server, and the interfaces with the IMAS.

FIG. 16 illustrates the basic components of an NMS, in accordance with one embodiment of the present invention. The basic components of an NMS system include at least one network management console 601 an NMS server 600, and SNMP agents installed in a telecommunications device such as a DSLAM or IMAS 606. Generally, the console 601 provides the user interface for a system administrator to control or otherwise monitor the network. The NMS server 600 provides protocol conversion and centralized management functionality. Finally, the SNMP agents (and subagents) are used to configure a network device like the IMAS 606 or obtain performance information from the IMAS 606.

In FIG. 16, a network management consoles 601 is provided. In one embodiment, this console runs various JAVA-based web browser software 605 including Netscape Navigator, Microsoft Internet Explorer, and/or HotJava. With any one of these browsers, the console 601 interfaces with the NMS server 600 via line 613 over a TCP Sockets Layer and line 614.

The NMS server 600, which is typically software running in Windows NT or a UNIX computing environment, is coupled to the network console 601 and telecommunications equipment (e.g., IMAS). Some commercially available NMS servers include Hewlett-Packard's OpenView, Cabletron's Spectrum, Sun MicroSystem's NetManager, and IBM's NetView.

In FIG. 16, the pieces of telecommunications equipment that are coupled to the NMS server 600 are the IMAS 606 and IMAS 607 via lines 617/619 and 618/620, respectively. As explained in the HARDWARE section above, these IMAS's 606 and 607 are coupled to various subscribers via subscriber lines. In FIG. 16, two such subscribers that are coupled to IMAS 606 are subscriber 608 via subscriber line 621 and to subscriber 609 via subscriber line 622. Similarly, IMAS 607 is coupled to subscriber 610 via subscriber line 623, subscriber 611 via subscriber line 624, and subscriber 612 via subscriber line 625. In one embodiment, these subscriber lines 621–625 are xDSL-based (e.g., ADSL). Other telecommunications equipment (e.g., a DSLAM) may also be coupled to the NMS server 600 but are not shown in FIG. 16.

In order for the NMS server to communicate with any IMAS, SNMP agents are provided in the IMAS. As known to those skilled in the art, SNMP is a management protocol defined by the IETF for TCP/IP networks. SNMP allows managers (i.e., NMS server) and agents to communicate with each other by using request and response messaging. An SNMP agent and subagents are provided in each IMAS. The agents perform two major tasks: (1) collect information about their host devices (i.e., IMAS) and report back to the NMS server 600; (2) distribute configuration information from the NMS server 600 to the host devices; and (3) receive trap information when any SNMP agent-associated component detects faults or alarms that warn of problems or performance degradations on any part of the network. The network administrator can produce reports based on the collected information that indicate the state of the network.

A more detailed discussion of the NMS server will now be provided. The NMS server 600 includes a software entity 603 that represents the core set of NMS functionality. The NMS provides various functionality for managing enterprise networks by actively monitoring network resources for the purpose of device configuration, troubleshooting, detecting potential problems, improving performance, documentation, and reporting. Other tasks include data backup, providing security, training users, and setting policies. The network management system performs other tasks including, but not limited to, autodiscovery of devices on the network; network topology mapping in the form of a graphic map that can be zoomed in or out; and the ability to schedule management tasks or jobs at specific times or dates.

Using SNMP agents, the NMS server can collect information on various aspects of the IMAS. These aspects include power status, fan status, line card status, and other physical parameter of the IMAS. In addition to its monitoring function, the NMS via the agents can also distribute information (e.g., configuration) to the IMAS. In effect, the IMAS, through its various components (e.g., chassis, boards, fans, power supply), can be controlled by the network management system via these configuration information.

Among other connections, this core NMS functionality software entity 603 is coupled to an http server 602 via line 615. The http server 602 is coupled to console 601 via line 613. With this connectivity, the http server 602 allows a system administrator to communicate with the NMS server 600 via the management console 601. In the manner of traditional web server-web browser interface, any of the browsers in the console 601 can communicate with the http server 602 via the Hypertext Transfer Protocol (HTTP). A web browser sends the Uniform Resource Locator (URL) to the http server 602 in the NMS server 600. The http server 602 responds to web browser messages by returning the requested information formatted in Hypertext Markup Language (HTML).

The core NMS functionality entity 603 is also coupled to an IMAS device manager 604 via line 616. The core NMS functionality entity 603 can be coupled to the IMAS 606 via line 617 and IMAS 607 via line 618. Also, the IMAS device manager 604 is also coupled to IMAS 606 via line 619 and IMAS 607 via line 620.

The IMAS device manager 604 is software that allows the NMS server 600 to communicate with the IMAS for those physical parameters that are unique to the IMAS. For those physical parameters that are standard and not necessarily unique to the IMAS, the core NMS functionality entity 603 can communicate with the IMAS directly. Regardless of whether the physical parameters are unique to the IMAS or not, these parameters are represented in software files called a management information base (MIB), a file that defines a software structure and syntax for various physical parameters. Currently, thousands of known MIBs are implemented in various NMS servers. However, for those MIBs that are unique to the IMAS, a separate set of MIB files are provided.

Because some physical parameters are unique to each manufacturer's piece of equipment, each manufacturer must provide the MIBs as part of its device manager package. As newer versions of the IMAS (as well as other manufacturer's telecommunications equipment) are provided, newer versions of MIBs are provided as well to ensure that accurate software entities are provided for each new or improved component.

If the NMS server 600 needs to communicate with any IMAS using standard MIBs, the core NMS functionality entity 603 can communicate with the IMAS via lines 617 and 618. If the NMS server 600 needs to communicate with any IMAS using non-standard and IMAS-specific MIBs, the NMS server communicates with an IMAS device manager 604 via line 616 and to the IMAS via lines 619 and 620. To communicate with other telecommunications equipment (not shown in FIG. 16) coupled to the NMS server 600, other device managers that are associated with these other telecommunications equipment must be installed in the NMS server 600. These other device managers are not shown in FIG. 16.

In one embodiment, MIBs are software representations of various physical parameters of the telecommunications equipment's components (e.g., chassis state, line card, card slot, fan, power supply). In one embodiment, an object in a MIB file represents the physical parameters of a field replaceable component of each IMAS. For example, a MIB that represents fan state (i.e., on or off) is provided. Other MIBs include power supply on/off, chassis on/off, chassis card slot on/off, line card on/off, chassis temperature sensor reading, line card temperature sensor reading, and packet count. A more detailed treatment of MIBs is provided below in the MANAGEMENT INFORMATION BASE (MIB) subsection.

Because the various physical parameters (or physical components) of a telecommunications equipment are represented in software by MIBs, the NMS server 600 can configure (i.e., set, change) these physical parameters and obtain information on any of these physical parameters (e.g., what is the temperature of card slot 9?). The NMS server 600 can configure and get information via the agents and these agents contain SNMP encapsulated requests/responses (i.e., get, set, trap) associated with objects that are described in a MIB file.

The SNMP protocol as defined in RFC 1157 consists of four types of operations which are used to manipulate management information. These are:

| | | |
|---|---|---|
| 1. | Get | Used to retrieve specific management information. |
| 2. | Get-Next | Used to retrieve, via traversal of the MIB, management information. |
| 3. | Set | Used to alter management information. |
| 4. | Trap | Used to report extraordinary events. |

These four operations are implemented using five types of PDUs:

| | |
|---|---|
| 1. GetRequest-PDU | Used to request a Get operation. |
| 2. GetNextRequest-PDU | Used to request a Get-Next operation. |
| 3. GetResponse-PDU | Used to respond to a Get, Get-Next, or Set operation. |
| 4. SetRequest-PDU | Used to request a Set operation. |
| 5. Trap-PDU | Used to report a Trap operation. |

In short, this SNMP protocol allows the collection of information and configuration of components in network devices, such as an IMAS. The IMAS runs an agent, shown in FIG. 17 as master SNMP agent 403, that collects information and provides that information to a management console (e.g., console 601) via the NMS server 600, shown in FIG. 16.

In one embodiment of the present invention, the IMAS is installed in a central office where a commercially available NMS server is already installed and running. In this instance, an IMAS plug-in device manager 604 is provided to allow this conventional NMS to communicate with the IMAS. In another embodiment of the present invention, an NMS system in its entirety, including the NMS server 600, is provided to a buyer (e.g., telecommunications service provider) along with the IMAS with a built-in IMAS device manager 604.

MANAGEMENT INFORMATION BASE (MIB)

Agents that reside in various network devices (e.g., IMAS) monitor and distribute information about its host device. To accomplish this task, an object (or managed object) is created for each physical parameter (e.g., packet throughput, board on/off, fan on/off) that will be monitored or configured. A managed object is a logical representation of a real physical entity or parameter on in a network device, such as the IMAS. Each object collects some information and holds that information as a value that can be collected by the network management system.

A MIB is a collection of these objects; at the very least, a MIB is one object and typically, a MIB is combination of many objects. Essentially, a MIB is a repository of common characteristics and parameters managed in a network device (e.g., IMAS). Each managed device knows how to respond to standard queries issued by the NMS server following a specific protocol, such as SNMP. The devices gather statistics and respond to queries in the manner specified by those specific protocols.

For data collection, the manager reads information from objects in the MIB. MIBs generally contain object definitions, definitions of notifications, and sometimes compliance statements specified in terms of appropriate object groups. Accordingly, MIBs define management information maintained by a network node made remotely accessible by management agents, conveyed by the management protocol, and manipulated by management applications. MIBs or MIB modules are defined according to the framework described and standardized in the Structure of Management Information (SMI).

In accordance with one embodiment of the present invention, the MIBs that are supported in one embodiment of the present invention are a combination of public and private MIBs. As of this writing, nearly 100 standards-based public MIB modules with a total number of defined objects approaching 10,000 currently exist. The private MIBs are enterprise-specific MIB modules defined unilaterally by various vendors, research groups, consortia, and the like. Some private MIBs are incorporated in the IMAS and the NMS. The MIBs that are supported in the various embodiments of the present invention are as follows:

| | |
|---|---|
| RFC1213 | Initial definitions for MIB-II |
| SNMPv2-SMI | SNMPv2 Structure of Management Information |
| SNMPv2-TC | SNMPv2 Textual Conventions |
| RFC1907 | MIB modules for SNMPv2 entities |
| RFC1573 | MIB modules to describe generic objects for network interface sub-layers. This MIB is an updated version of MIB-II's ifTable and incorporates the extensions defined in RFC1229. |
| RFC1595 | MIB modules to describe SONET/SDH interface objects |
| RFC1695 | MIB modules for ATM and AAL5-related objects for managing ATM interfaces, ATM virtual links, ATM cross-connects, AAL5 entities, and AAL5 connections. |
| ILMI | Similar to RFC1695 but issued by the ATM Forum |
| RFC1514 | Host Resources MIB defines a uniform set of objects useful for the management of host computers. |
| M4 | M4 Network Element View MIB |
| Proprietary MIBs | Proprietary enterprise MIBs that define the IMAS chassis components |
| IPOA | Classical IP MIB |
| ADSL | ADSL line MIB |
| RFC1407 | MIB definitions for managing DS3 and E3 interfaces |
| ATM-TC-MIB | MIB Textual conventios and Object-Idnetity objects to be used by ATM systems |

To illustrate the use of MIBs in the system, three sets of MIBs will now be discussed. In the first set, some representative chassis MIBs will be discussed. In the second set, some system-level MIBs will be described. In the third set, the MIBs associated with the OC3 links will be described.

The chassis MIBs will now be discussed. Generally, seven different MIBs are provided-Chassis Type, Expansions, Chassis Status, Chassis Location, Chassis Contact, Chassis Telephone, and Chassis Summary. Chassis Type may be either large or small, depending on the number of line cards accommodated.

Number of Expansions indicates how many expansion chassis are present. Choices are none or one.

Chassis Status reports on the operating condition of the chassis. The condition may be unknown, normal, minor alarm present, critical alarm present, warning, testing, or disabled. Chassis fan status and chassis temperature are included here. For example, if a chassis fan fails, or if the ambient temperature is exceeded, a critical alarm or warning will be issued.

Chassis Location is a string showing the location of the chassis. This string can be updated if the chassis location is changed.

Chassis Contact is the name of the responsible person to contact regarding the chassis, and is a string that can also be changed. Chassis Telephone is the telephone number of the person responsible for the chassis. Chassis Summary summarizes information on the chassis configuration, chassis type, number of expansion chassis, chassis general status, and modules present. This is also a string.

The second set of MIBs are the System Information MIBs, which include System Configuration, and Password. System Configuration includes the Node Name, Software Version, and LEDs. The Node Name indicates the name of the node, and is a string of alphanumeric characters. The Software Version specifies the current version of the system software, and is updated when a new code file is downloaded. The LEDs indicate either Normal, On, or Off.

The Password MIB includes the Password Level, and the password corresponding to that level. The password level may be either view only, limited access, or full access. The password gives the password required for each level.

The OC3 link MIBs will now be discussed. Three classes of OC-3 MIBs are specified: port objects, monitor objects or traps, and performance measurement statistics.

Within the port objects class, several MIBs are provided including port state, port setup, port threshold, logical port, and automatic switchover. Port state objects include administrative status, line status, loopback status, and automatic protection switching status. Port setup objects include clock state, cell payload scrambling, OC-3 port name, and OC-3 port id. Port threshold objects are of three subcategories—section, line, and path. For each subcategory, the objects are typically errored seconds, severely errored seconds, severely errored framing seconds, and coding violations. The port threshold objects allow the assignment of thresholds for notification if exceeded. Logical port objects include the alarm status of the OC-3 physical layer, and the VPI and VCI Number space. The Automatic Power Switching (APS) objects control the direction and architecture of the local and remote ports and the administrative state, Revertive mode and bit error rate threshold signal degrade.

The Monitor Objects or Traps is another class of OC3 MIBs. These MIBs include objects for which an alarm or event is reported including Alarms, Admin Down, Section Loss of Signal, Section Loss of Frame, Line Alarm Indication Signal, Line Remote Defect Indication, Path Synchronous Transport Signal (STS) Loop, Path STS Alarm Indication Signal, Path STS Remote Defect Indications (RDI), and Path Signal Mismatch.

The third class of OC3 MIBs is the Performance Management Statistics Traps. These MIBs are section, line near end, line far end, and path near end. Section traps include errored seconds, severely errored seconds, severely errored framing seconds, and coding violations. Line traps include errored seconds, severely errored seconds, coding violations, unavailable seconds, and alarm indication signal seconds. Path traps include errored seconds, severely errored seconds, coding violations, unavailable seconds and alarm indication signal seconds.

SOFTWARE ARCHITECTURE OF THE IMAS

Figure 17:
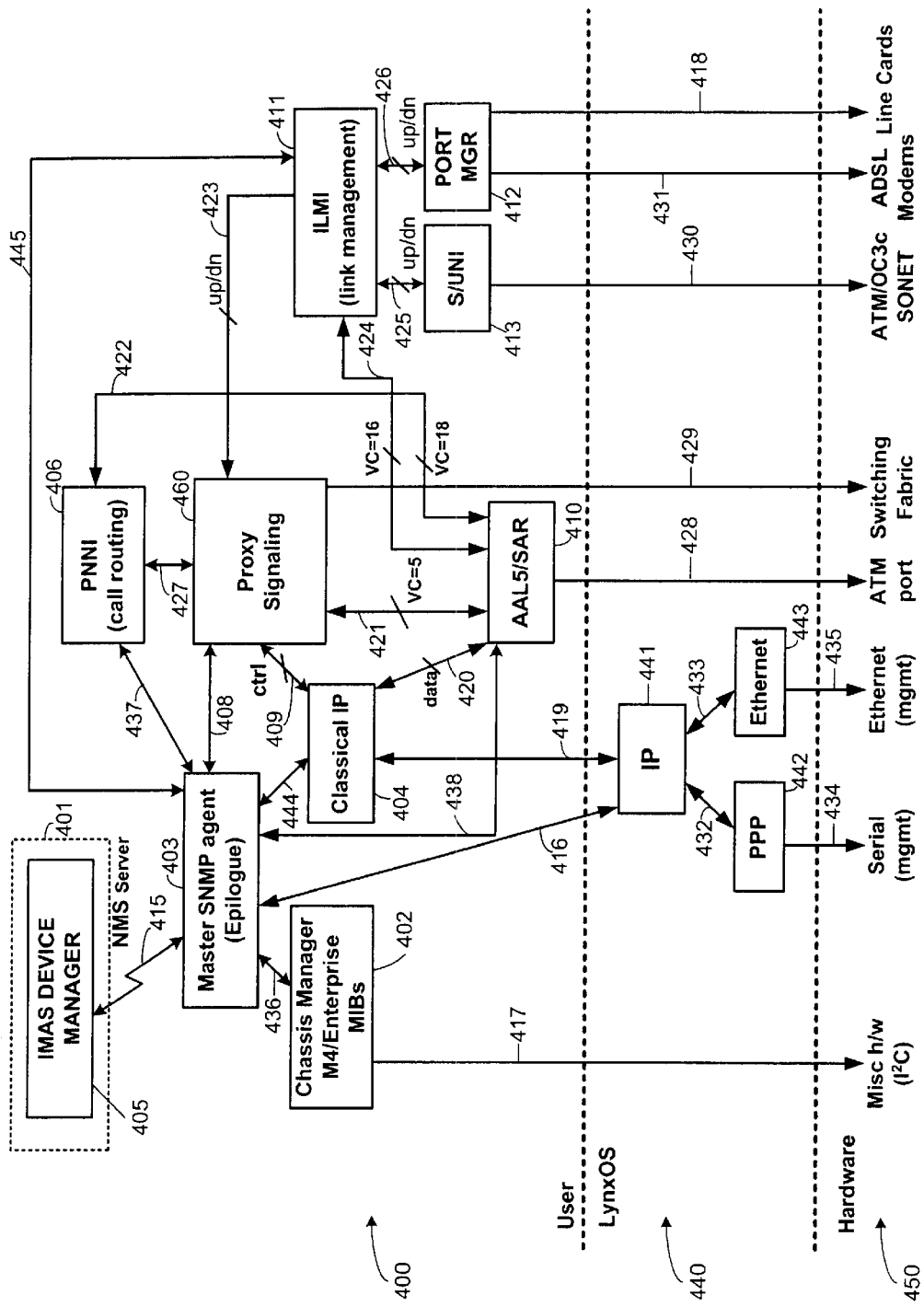
FIG. 17 shows one embodiment of the software architecture of the IMAS.

A description of the software architecture will now be provided with respect to FIG. 17. The NMS 401, as described above, provides various functionality for managing enterprise networks by actively or passively monitoring network resources for the purpose of device configuration, troubleshooting, detecting potential problems, improving performance, documentation, and reporting. In essence, the network management system provides tools for device configuration, performance monitoring, and failure reporting. How does the NMS 401 deliver configuration information to the various entities in the IMAS, as well as obtain information from these same entities?

To communicate with the various software entities in the IMAS, the NMS 401 uses an IMAS device manager 405 via line 415 using SNMP. Whether the command is an information-gathering command (e.g., "get") or a parameter-setting command (e.g., "set"), the IMAS device manager 405 sends an SNMP packet to the IMAS via line 415. The actual entity that this SNMP packet is sent to is a master SNMP agent 403. One example of a master SNMP agent 403 and subagents is the family of SNMP products by Epilogue.

As explained above, the master SNMP agent 403 communicates with the NMS 401 and the various entities in the IMAS. Running as a separate: process, the master SNMP agent forwards NMS commands to the various subagents in the IMAS for gathering information to report back to the NMS 401 for its performance monitoring purposes, and delivering configuration settings to these same subagents to control the functionality (for those parameters that can be controlled via software) of their respective entities.

The time that the master SNMP agent 403 collects data from other entities varies. The master SNMP agent 403 waits for a command from the NMS 401 to either get or set specific parameters. For configuration purposes, the master SNMP agent 403 must wait for a configuration command from the NMS 401 before it distributes the configuration information to the various software entities in the IMAS. Once the data has been gathered from the entities or configuration settings have been provided to the entities, the master SNMP agent 403 sends the SNMP data packet (i.e., information or acknowledgment) to the NMS 401. Once processed, the data associated with the MIBs will be relayed to the management consoles after some processing by the NMS 401 for presentation or other use by the system administrator.

The various software entities shown in FIG. 17 are used to control and manage the various hardware components of the IMAS. Of course, some parameters of each hardware component cannot be changed via software. For example, if a line card has a maximum of 32 ports, the software entity for this line card cannot increase the number of ports because these ports are actual physical connections. However, the software entity can enable and disable these ports by setting a register.

As shown on the bottom of FIG. 17, the hardware components include line cards, xDSL modems, ATM/OC3 or SONET transceivers and interfaces, switch fabrics, ATM ports, Ethernet interfaces, serial interfaces, and various other miscellaneous hardware in the chassis (card slots, fan, power supply). Several software entities are associated with these hardware components. A port manager 412 is coupled to the line cards via line 418 and to the xDSL modems via line 431. An S/UNI entity 413 is coupled to the ATM/OC3 transceiver interface via line 430. Both the port manager 412 and the S/UNI 413 are coupled to an ILMI entity 411 via lines 426 and 425, respectively. The switch fabric is coupled to the proxy signaling entity 460 via line 429. The ATM ports are coupled to AAL5/SAR entity 410 via line 428. The Ethernet interface is coupled to the Ethernet entity 443 via line 435. The serial management interface is coupled to a PPP entity 442 via line 434. Both the Ethernet entity 443 and the PPP entity 442 are coupled to an Internet Protocol entity 441 via lines 433 and 432, respectively. The miscellaneous chassis hardware components are coupled to a chassis manager 402 via line 417.

In FIG. 17, the master SNMP agent 403 interfaces with several of these and other software entities including chassis manager 402 via line 436, Internet Protocol entitiy 441 via line 416, AAL5/SAR entity 410 via line 438, classical IP entity 404 via line 444, proxy signaling 460 via line 408, PNNI 406 via line 437, and ILMI 411 via line 445. Other entities are indirectly accessed and controlled by the master SNMP agent 403 including SONET UNI entity 413 which is coupled to ILMI 411 via line 425, port manager 412 which is coupled to ILMI 411 via line 426, PPP entity 442 which is coupled to IP entity 441 via line 432, and Ethernet entity 443 which is coupled to IP entity 441 via line 433. At the Lynx operating system level, three software entities are provided—the Internet Protocol entity 441, Ethernet entity 443, and the PPP entity 442. These three entities are coupled together as described above. The Lynx operating system is described briefly below in the MISCELLANEOUS ENTITIES subsection.

Each of these software entities will be discussed in turn. The chassis manager 402, coupled to the master SNMP agent 403 via line 436, is the software entity that allows the NMS to manage and control the various hardware components that are supported by the I²C bus and the I/O bus. The chassis manager also supports the M4/Enterprise MIBs that are unique to the IMAS. The chassis manager also has some basic system configuration functionality so that during start-up (as described below), the system attempts to start up the chassis manager first. The chassis manager is also used by other software entities (e.g., call control CALLC 463 in FIG. 18) to obtain hardware state information. The chassis manager 402 is also coupled to an I²C bus where it is coupled to various miscellaneous hardware components that are supported by I²C.

The PNNI entity 406, coupled to master SNMP agent 403 via line 437, performs the routing protocol as described in ATMF PNNI1.0 specification. PNNI entity 406 is also coupled to proxy singaling entity 460 via line 427 and AAL5/SAR entity 410 via line 422 using VCI=18.

PNNI, or Private Network Node Interface or Private Network-to-Network Interface, is an ATM standard for creating QoS paths between ATM switches via virtual connection arbitration, congestion control, and topology management. It is a routing information protocol that enables extremely scalable, full function, dynamic multi-vendor ATM switches to be integrated in the same network. PNNI protocol is designed for use among private ATM switches, and among groups of private ATM switches. The functions of the PNNI routing protocol include discovery of neighbors and link status; synchronization of topology databases; flooding of PTSEs (PNNI Topology State Elements); election of PGLs (Peer Group Leaders); summarization of topology state information; and construction of the routing hierarchy. PNNI builds the topology database based on information flooded to it by its peer PNNI entities in neighboring system. Based on a destination address PNNI calculates an output port as well as the complete source route to the destination.

PNNI includes two categories of protocols: (1) A protocol is defined for distributing topology information among switches and clusters of switches. This information is used to compute paths through the network. A hierarchy mechanism ensures that this protocol scales well for large worldwide ATM networks. A key feature of the PNNI hierarchy mechanism is its ability to automatically configure itself in networks in which the address structure reflects the topology. PNNI topology and routing is based on the well-known link-state routing technique; and (2) A second protocol is defined for signaling; that is, message flows used to establish point-to-point and point-to-multipoint connections across the ATM network. This protocol is based on the ATM Forum UNI signaling, with mechanisms added to support source routing, crankback, and alternate routing of call setup requests in case of connection setup failure.

I-PNNI (Integrated PNNI) extends PNNI to provide integrated routing. All the switching and routing devices on the network that are I-PNNI-compatible can share information in order to calculate the best path through the network for end-to-end connections. I-PNNI provides a way for routers and switching devices at the edge of an ATM network to propagate routing information across the ATM network.

The Integrated Local Management Interface (ILMI) entity 411, which is coupled to the master SNMP agent 403 via line 445, performs the interface management protocol as specified in the ATMF ILMI 4.0 specification and is also backward compatible with earlier versions of the ATMF ILMI specification. ILMI 411 is also coupled to proxy signaling entity 460 via line 423, AAL5/SAR 410 via line 424, S/UNI 413 via line 425, and port manager 412 via line 426.

Generally, ILMI 411 provides configuration, status, and control information about physical and ATM layer parameters of the ATM interface to enable two adjacent ATM devices to automatically configure the operating parameters of the common ATM link between them. Additionally, ILMI also provides for communication across the ATM link, enabling both sides to verify subscription parameters, the configuration of newer traffic services such as ABR, signaling version identification, and address registration information.

ILMI 411 is based on a limited subset of SNMP functions that performs network management functions between an end user and a public/private network and between a public network and a private network. This network management function is performed via a MIB table lookup across the UNI. ILMI 411 discovers its peer ILMI entity on the other side of the interface and exchanges configuration information as well as addresses/network prefixes. In addition to its role of local interface management, the data in ILMI MIBs are also useful for general network management functions such as configuration discovery, fault isolation and troubleshooting. For example, an ATM service provider may want to confirm the configuration of the ATM interfaces on devices attached to its network, even though it does not usually have direct NMS access to those external devices.

ILMI 411 uses SNMP for management and control operations of information across the ATM Interface. The ATM Interface information will be represented in a MIB to provide any ATM device (e.g. end-systems, switches, etc.) with status and configuration information. The types of information that will be available in the ATM Interface MIB are as follows: the physical layer, ATM layer, Virtual Path Connections, Virtual Channel. Connections, registered ATM Network Prefixes, registered ATM Addresses, registered services and capabilities available at its ATM Interfaces.

Specifically, at the physical layer, the ILMI 411 can communicate configuration information such as interface index, interface address, transmission type, media type, and operational status. At the ATM layer, the ILMI 411 can communicate configuration information such as maximum number of virtual path connections, maximum number of virtual channel connections, VPI/VCI address width, number of configured virtual path connections, number of configured virtual channel connections, and port type. The ILMI 411 can also provide ATM layer statistics such as ATM cells received, ATM cells dropped on receive side, and ATM cells transmitted. The ILMI 411 can also communicate virtual path and virtual channel connection information such as VPI/VCI value, shaping traffic descriptor, policing traffic descriptor, operational status, and Quality of Service (QoS) category. The ILMI communication protocol is an open protocol (i.e. SNMP/AAL5). An ATM Interface Management Entity (IME) can access, via the ILMI communication protocol, the ATM Interface MIB information associated with its adjacent IME.

Proxy signaling entity 460, which is coupled to master SNMP agent 403 via line 408, performs the proxy signaling function to support SVCs. Proxy signaling entity 460 is also coupled to PNNI 406 via line 427, ILMI 411 via line 423, classical IP 404 via line 409, AAL5/SAR 410 via line 421, and the switch fabrics via line 429. Regardless of whether one side of the IMAS is a PVC or SVC, the proxy signaling entity 460 allows the IMAS to support SVC signaling to establish and terminate virtual connections on-the-fly. A more detailed treatment of the proxy signaling entity 460 will be provided in the PROXY SIGNALING subsection below.

Classical IP entity 404, which is coupled to the master SNMP agent 403 via line 444, allows the IMAS to perform IP over ATM, or otherwise known as classical IP. In the classical IP scheme, the ATM network is treated like a LAN and the overlying IP network operates as it normally would over any other network, such as Ethernet or token ring. Classical IP provides a mechanism for transmitting IP datagrams over an ATM network by dividing the ATM network into logical IP subnets (LIS) which includes a group of hosts and routers. Each LIS operates and communicates independently of other LISs on the same ATM network. Hosts communicate directly with other hosts on the same LIS but must go through a router to communicate with hosts on other LISs. Each LIS includes a single ATM Address Resolution Protocol (ATMARP) server, which resolves IP to ATM addresses.

Classical IP entity 404 is also coupled to proxy signaling entity 460 via line 409, IP entity 441 via line 419, and AAL5/SAR entity 410 via line 420. Classical IP 404 interfaces with proxy signaling entity 460 to set up and release SVCs. Classical IP 404 interfaces with AAL5/SAR for receiving and sending IP datagrams on an ATM link on an already established SVC.

AAL5/SAR software entity 410, which is coupled to the master SNMP agent 403 via line 438, drives the associated AAL5/SAR hardware unit that enables compliance with the ATM cell format. AAL5/SAR entity 410 is also coupled to classical IP entity 404 via line 420, proxy signaling entity 460 via line 421, ILMI 411 via line 424, PNNI 406 via line 422, and the ATM port. Essentially, the SAR performs the segmentation and reassembly functions for segmenting the possibly large data packets into smaller packets for the purpose of achieving compatibility with the ATM protocol. Specifically, the SAR sublayer of the ATM Adaptation Layer (AAL5) segments the native Application Data Units (ADU) of varying lengths into a group of Protocol Data Units (PDU) of 53 bytes each (or a single PDU for ADUs whose size is less than 48 bytes), of which 48 bytes are the actual data payload or Service Data Unit (SDU), and transmits this 53-byte cell to the destination.

As known to those skilled in the art, the ATM protocol can support a wide range of applications with diverse communications requirements. Because the ATM layer uses fixed size cells of 53 bytes each to carry all types and lengths of data from any application, the ATM Adaptation Layer (or AAL) functions to adapt or convert different application data unit (ADU) sizes into the ATM cell format. Different AAL types (i.e., AAL1, AAL2, AAL3/4, AAL5) exist to address different application requirements. AAL5 is the most prevalent and widely deployed AAL type for supporting the ATM protocol and supporting a wide variety of applications. Currently, AAL5 is the only one of the AAL types that support SVC implementation because the ATM signaling protocols (UNI and NNI) were standardized based on AAL5.

Generally, an AAL type includes a common part (CP) sublayer and a service specific part (SSP) sublayer, where CP is the lower sublayer. The CP is further divided into the convergence sublayer (CS) and segmentation and reassembly (SAR) sublayer. The CS is the higher sublayer responsible for functions related to the ADU as a whole and interacts with the user. The CS basically functions to perform CS sublayer SDU delineation, or encapsulating SDUs from the application into a CS sublayer SDU framing structure.

The SAR is the lower sublayer of the CP and is responsible for mapping the CS sublayer ADU into the ATM layer. The SAR basically segments ADU into ATM protocol data unit (PDU) cells at the transmitting endpoint and reassembles the ATM PDU cells on the receiving endpoint to restore the PDUs into the ADUs. The destination SAR unit reassembles the native PDU by extracting and combining multiple 48-byte payloads from multiple ATM cells. Specifically, the SAR 410 configures and manages the TNET1570 chip to perform the AAL5 functionality. The SAR 410 uses services provided by the TNET1570 chip to send user data across an ATM link.

PROXY SIGNALING AND INTERFACE ENTITIES

Figure 18:
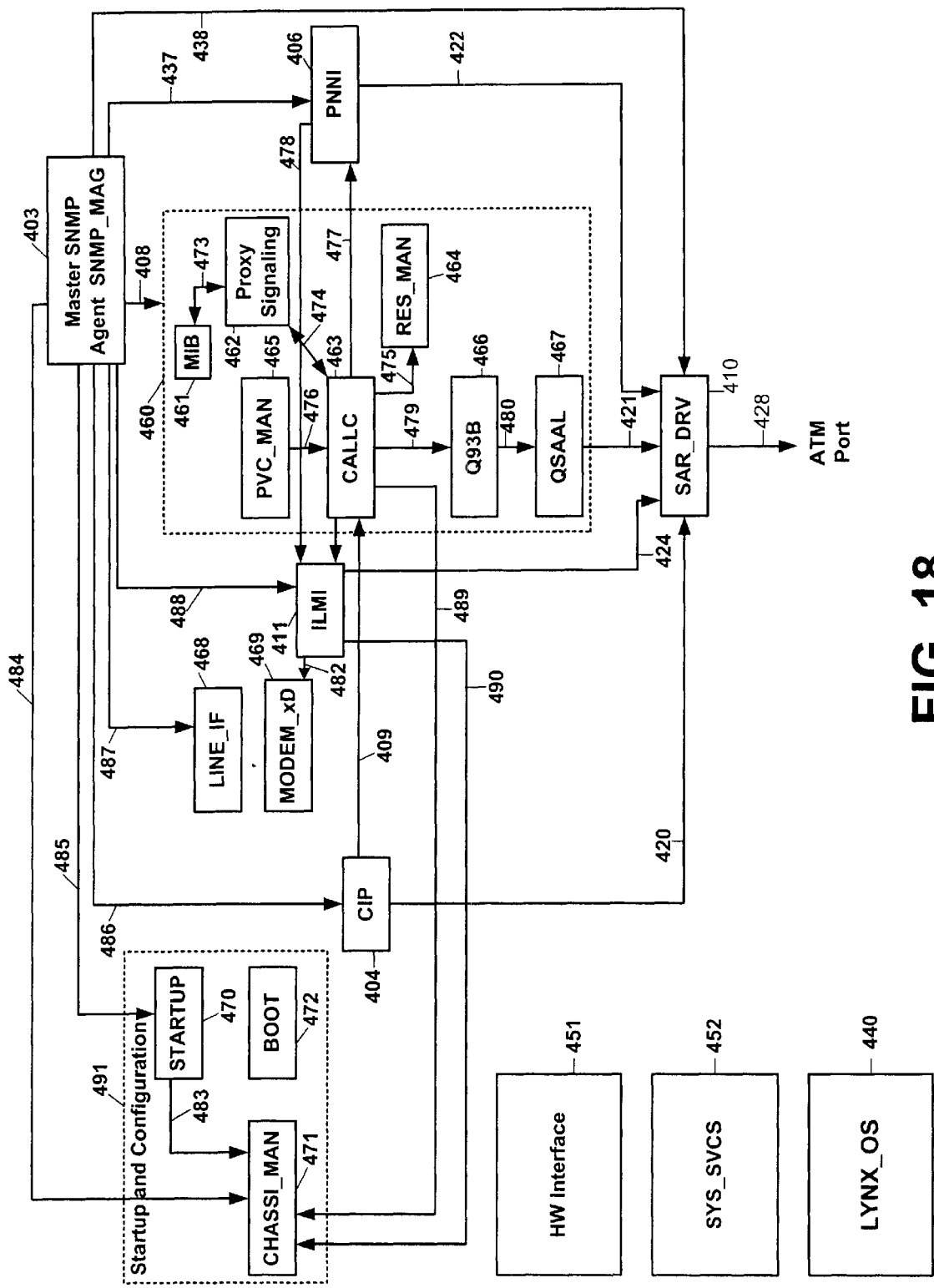
FIG. 18 shows a more detailed view of the software architecture of the IMAS.

FIG. 18 shows a more detailed view of the proxy signaling entity 460 first shown in the software architecture of FIG. 17. In addition, FIG. 18 shows the Startup and Configuration entity 491 and other entities that were shown in FIG. 17 but reproduced here for context.

The master SNMP agent (SNMP_MAG) 403 is, as the name implies, the SNMP master agent. SNMP_MAG 403 uses a scheme where all the SEs with which it interfaces runs an SNMP subagent. SNMP_MAG 403 multiplexes SNMP requests from the NMS 401 (FIG. 17) out to the different subagents. SNMP_MAG SE 403 is coupled to most, if not all, of the software entities in this figure. These connections were shown in FIG. 17 and described in the accompanying text.

However, some connections that were not described and shown above include the connection to STARTUP entity 483 via line 485 and interface line (LINE_IF) 468 via line 487.

The proxy signaling SE 460 comprises a MIB agent 461 coupled to proxy signaling agent 462 via line 473, which in turn is coupled to a ATM call control (CALLC) 463 via line 474. A PVC manager (PVC_MAN) 465 is coupled to the CALLC 463 via line 476. CALLC 463 is coupled to resource manager (RES_MAN) 464 via line 475. CALLC 463 is also coupled to a Call Set Up/Release (Q93B) entity 466 via line 479, which in turn is coupled to a SAAL protocol (QSAAL) entity 467 via line 480. The QSAAL 467 is coupled to the SAR driver SAR_DRV 410 via line 421.

Figure 19:
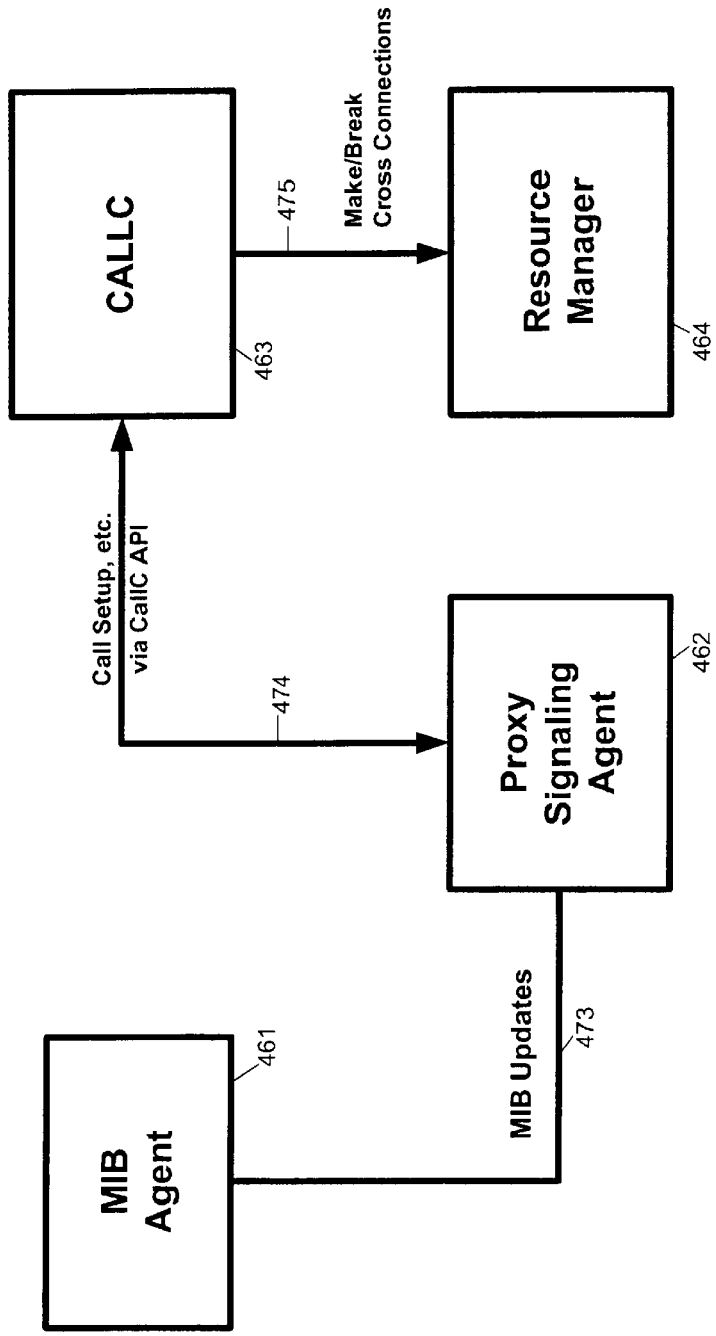
FIG. 19 shows a block diagram of the basic proxy signaling components in accordance with one embodiment of the present invention.
Figure 20:
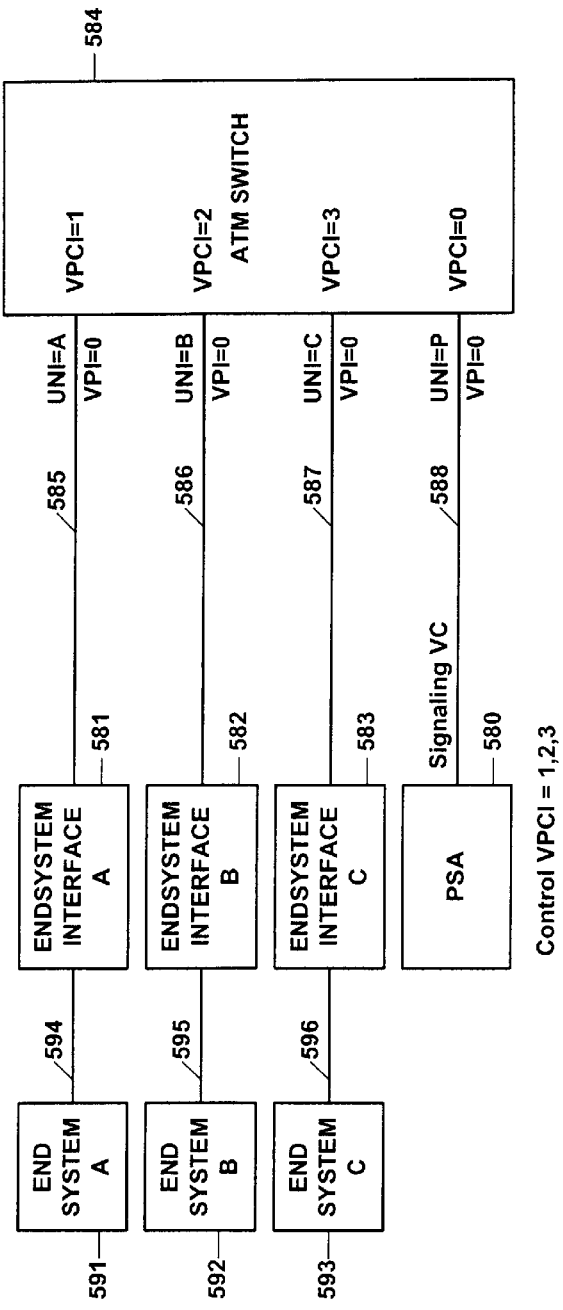
FIG. 20(A) shows a diagram illustrating the use of the VPCI field.
FIG. 20(B) shows a table of the VPCI to VPI mapping.

CALLC 463, Q93B 466, QSAAL 467, and RES_MAN 464 run within the same Lynx OS process. As shown in FIG. 19, the primary software entities involved in the proxy signaling process in accordance with one embodiment of the present invention is the MIB Agent 461, Proxy Signaling Agent 462, CALLC 463, and the Resource Manager (RES_MAN) 464. These will be discussed in more detail below with respect to FIGS. 19–32.

Returning to FIG. 18, the PVC Manager (PVC_MAN) 465 is responsible for setting up, maintaining and releasing PVCs between the subscriber port and the WAN port (or telecommunications backbone port) of an IMAS access network according to NMS requests. PVC_MAN 465 uses services provided by CALLC 463 via line 476 for setting up and releasing PVCs.

The CALLC SE 463 performs the ATM Call Control function. It controls all call setup and release procedures for both SVCs and SPVCs. It is also responsible for reservations of Call Reference values, as well as VPI/VCI allocation, upon forwarding or initiation of a CALL SETUP message. CALLC 463 uses services provided by Q93B 466 via line 479, PNNI 406 via line 477, RES_MAN 464 via line 475, CHASSI_MAN 471 via line 489, and ILMI 411 via line 481. More specifically, CALLC 463 uses services provided by Q93B for the purpose of controlling when a specific signaling message is to be sent and in which direction, and RES_MAN 464 in order to set up the actual physical path between input and output ports for an established call.

External to the proxy signaling SE 460, CALLC 463 uses services provided by PNNI 406 to find the output port as well as the complete source route in order to reach a given destination address; CHASSI_MAN 471 to get notifications about state changes of the physical line; and ILMI 411 to get notification about certain interface specific attributes as well as interface state changes critical to signaling.

The Q93B SE 466 performs the call setup and release procedures for both SPVCs and the SVCs at the UNI (only SVCs at the UNI) and the NNI. The functionality is compliant with the ATMF UNI 4.0 and ATMF PNNI 1.0 specifications but also backward compatible with ATMF UNI 3.1 and ATMF 3.1 signaling specifications. Q93B 466 uses services provided by QSAAL 467 via line 480 for sending and receiving Q93B messages over an established and reliable data link.

The QSAAL SE 467 performs the SAAL protocol. QSAAL 467 is used both at the UNI and at the NNI. QSAAL 467 uses services provided by SAR_DRV 410 via line 421 for transmitting and receiving QSAAL frames on an ATM link on VCI=5.

RES_MAN 464 configures and manages the cubit devices C0–C20 in the chassis switch cards (see FIGS. 6 and 7). These cubit devices were described above in the HARDWARE section of the specification. RES_MAN 464 also performs power-on diagnostics, TRAM (i.e., Look-up Table RAM) checking, cubit registers checking, as well as loopback and stress test.

ILMI 411 uses services provided by SAR_DRV 410 via line 424, LINE_IF 468, and MODEM_xD via line 482. More specifically, ILMI 411 uses services provided by SAR_DRV 410 for receiving and sending SNMP PDUs on an ATM link on VCI=16. ILMI 411 also uses services provided by LINE_IF 468 to get notifications about state changes of the physical line. Finally, ILMI 411 uses services provided by MODEM_xD 469 to get notification about state changes of modem ports. The MODEM_xDSL SE 469 is also the interface to the xDSL modem. It provides services to the ILMI 411 via line 482.

The LINE_IF SE 468 configures and manages the S/UNI lite chips so that these chips can provide the ATM functionality. The LINE_IF 468 also performs power-on diagnostics, chip initialization, and collects statistics and error counters. The LINE_IF 468 provides services to the SNMP_MAG 403.

CIP 404 uses services provided by CALLC 463 for setting up and releasing SVCs. CIP 404 also uses services provided by SAR_DRV 410 for receiving and sending IP datagrams on an ATM link on an already established SVC.

PNNI 406 uses services provided by SAR_DRV 410 for receiving and transmitting PNNI packets on an ATM link on VCI=18.

STARTUP

The Start-up and Configuration SE 491 in FIG. 18 includes a STARTUP SE 470, a CHASSIS_MAN SE 471, and a Boot SE 472. On power-up, the Boot SE 472 interrogates the expander card looking for all components that are expected to be present. As new expander card types are developed, the boot code will be re-released to work on all board types by checking the board type that is to be stored in the on-board serial EEPROM.

Having interrogated and believing that it has detected a complete list of components, the next stage in the boot process is to run diagnostics on the various components of the expander card. This testing is a shortened form of the continuous confidence that the hardware will run the run-time software successfully.

Upon successful completion of the diagnostics phase, the boot process will continue to run a simplified memory diagnostic. This is followed by a check of the NVRAM configuration to determine where the source of the run-time code is to be found. In one embodiment of the present invention, the source of the run-time code is found in onboard FLASH memory.

The IMAS software supporting the run-time code will be in a compressed format and thus, the boot code will load the image into memory and jump to the self-inflating header that will be placed at the beginning of the image. Once in the run-time code, the bo to code will effectively be removed from the memory when the runtime code is expanded and copied to low memory.

STARTUP SE 470 represents the code that will be executed as the first task started by the LynxOS. It will perform basic initialization of different global data structures in the system and create all the tasks and software entities that should be viable during the whole life cycle of the system.

The STARTUP SE 470 first starts up the CHASSI_MAN SE 471 via line 483, which is used to retrieve certain configuration information, and perform certain configuration before other software entities are started up. The creation of a task may imply the creation of one or more software entities.

Furthermore, the STARTUP SE 470 runs an SNMP subagent responsible for maintaining the Hardware Unit/Running Software Relationship Table and the Hardware Unit/Installed Software Relationship Table according to the ATMF M4 MIB. The STARTUP SE 470 is also responsible for basic exception handling, including ordering the system to reboot.

MISCELLANEOUS ENTITIES

The HW interface 451 is a function block comprising a set of SEs that will provide access to the different hardware items within the IMAS system. Since these SEs are implemented as a library of C function calls and C++ objects, these SEs do not run as separate Lynx tasks but rather within the context of the SE using the services. Not all hardware is accessed using this library. Some HW items may be accessed through this library, including the $I^2C$ bus, EXP registers (associated with the cubits), LPC registers (associated with the line cards) and FPGAs (associated with various line card components).

A SYS_SVCS SE 452 is a special function block which comprises a set of SEs that will handle memory management, timer management, and inter-task communication. They can be treated as system functions in the sense that the same type of functions are typically offered by an OS, but this system needs to add functions to let the system as a whole work properly and within the constraints set by performance requirements. The set of SEs in SYS_SVCS SE 452 do not run as separate Lynx tasks, but rather within the context of the SE using the services.

A LYNX_OS SE 440 is a modified version of Power PC LynxOS 2.5.0. Modifications have been made in order to make it run on the expander card and to support other components and software entities in the IMAS system. In one embodiment of the present invention, the software will run in a Lynx OS environment on a Power PC. Unless otherwise stated, each software entity will run as a separate Lynx OS process.

As known to those skilled in the art, LynxOS is a scalable real-time operating system with UNIX/POSIX APIs. LynxOS supports the POSIX 1003.1,0.1b, and .1c, Berkeley (BSD), and System V (SVR3) APIs and provides most of the POSIX.2 facilities and utilities. Lynx also provides a complete offering of standard facilities to accompany LynxOS, including TCP/IP, NFS, Streams, X11, Motif and many of the GNU facilities to support the LynxOS real-time environment and adhere to the design goals of the OS. The LynxOS and/or application may be burned into ROM, downloaded from a server over a network, or run on a large scale self-hosted system which may utilize many disk drives, up to 512 MB of RAM, and a graphical user interface. Some platforms provide for multiple processor support as well.

INTERFACES

The following tables list and describe the interface messages supported by the various software entities introduced and described above.

SNMP_MAG-Subagent SE

All SEs interfacing the SNMP_MAG SE are required to implement an SNMP subagent interface supporting the messages indicated in the table below.

TABLE D

SNMP

| Message | Function | To | From |
|---|---|---|---|
| SNMP_GET | Request to the value of a specified MIB variable | Subagent SE | SNMP_MAG |
| SNMP_GETNEXT | Request to retrieve the value of a MIB variable who's identification follows after the variable specified in the request. | Subagent SE | SNMP_MAG |
| SNMP_GETBULK | Request to retrieve the values of all MIB variables with identifications within a range as specified in the request | Subagent SE | SNMP_MAG |
| SNMP_SET | Request to set the value of a MIB variable with a specified identification to a specified value. | Subagent SE | SNMP_MAG |
| SNMP_GET_RESPONSE | Response to any of the SNMP request messages. Consequently the message will contain the values of the affected MIB variables as well as error status. | SNMP_MAG | Subagent SE |
| SNMP_TRAP | Report of an event effecting one or more MIB variables. | SNMP_MAG | Subagent SE |

STARTUP-SE xx

All SEs started up by STARTUP are required to implement an interface supporting the messages indicated in the table below.

TABLE E

STARTUP

| Message | Function | To | From |
|---|---|---|---|
| SE_xx_READY | Indication that SE xx has successfully performed initialization and is now up and running | STARTUP | SE xx |

TABLE F

CALLC-ILMI

| Message | Function | To | From |
|---|---|---|---|
| LIM_EVT_SIGSTAIND | Indication of a change in status on the interface. | CALLC | ILMI |
| LIM_EVT_SIGPARAMSET | Request to set the values of certain specified interface specific parameters to specified values. | CALLC | ILMI |

TABLE G

CALLC-PNNI

| Message | Function | To | From |
|---|---|---|---|
| PCI_EVTBNDREQ | Request to create a new SAP and to bind CALLC to this SAP. | PNNI | CALLC |
| PCI_EVTUBNDREQ | Request to delete a SAP, with a specified SAP id, to which CALLC was previously bound. | PNNI | CALLC |
| PCI_EVTRTEREQ | Request to find the best route to a specified end system address. | PNNI | CALLC |
| PCI_EVTRTERSP | Indication to PNNI that a VC has successfully been set up using the source route retrieved through an earlier PCI_RTEREQ message. | PNNI | CALLC |
| PCI_EVTRELREQ | Indication to PNNI that call set up using a source route retrieved through an earlier PCI_RTEREQ message has failed. | PNNI | CALLC |
| PCI_EVTRTECFM | Confirm of a PCI_RTEREQ message. Including the requested source route. | CALLC | PNNI |
| PCI_EVTRELIND | Indication to CALLC that a route to the specified address could not be retrieved. | CALLC | PNNI |

TABLE H

CALLC-RES_MAN

| Message | Function | To | From |
|---|---|---|---|
| CUBIT_STARTUP | Request to initialize the CUBIT chips. | RES_MAN | CALLC |

TABLE I

CALLC-Q93B

| Message | Function | To | From |
|---|---|---|---|
| AMT_EVTDATIND | Indication to CALLC of receipt of a proprietary message | CALLC | Q93B |
| AMT_EVTCONIND | Indication to CALLC that Q93B has received a valid AMT_EVTCONREQ message | CALLC | Q93B |
| AMT_EVTCONCFM | Confirm that a previous request to establish a connection, through an AMT_CONREQ message, has been accepted. | CALLC | Q93B |
| AMT_EVTCNSTIND | Indication to CALLC that Q93B has received a valid AMT_EVTCNSTREQ message. | CALLC | Q93B |
| AMT_EVTRELIND | Indication to CALLC that a connection has been released due to a message from a peer signaling entity (RELEASE, RELEASE COMPLETE etc.) | CALLC | Q93B |
| AMT_EVTSTAENQIND | Indication to CALLC that Q93B has detected an error condition related to a CALLC primitive call. | CALLC | Q93B |
| AMT_ENTADDPTYIND | Indication to CALLC that Q93B has received a valid AMT_EVTADDPTYREQ message. | CALLC | Q93B |
| AMT_EVTADDPTYCFM | Indication to CALLC that an earlier request to add a party to a point-to-multipoint connection has succeeded. | CALLC | Q93B |
| AMT_EVTADDPTTREJIND | Indication to CALLC that an earlier request to add a part to a point-to-multipoint connection has been rejected | CALLC | Q93B |
| AMT_EVTDROPPTYIND | Indication to CALLC that a specified party has been dropped from a point-to-multipoint connection. | CALLC | Q93B |
| AMT_EVTRSTIND | Indication to CALLC that all VCs within a VP or a link has been released. | CALLC | Q93B |
| AMT_EVTBNDREQ | Request to Q93B to create a new SAP and to bind CALLC to this SAP | Q93B | CALLC |
| AMT_EVTUBNDREQ | Request to delete a SAP, with a specified SAP id, to which CALLC was previously bound. | Q93B | CALLC |
| AMT_EVTDATREQ | Request to send a proprietary message. | Q93B | CALLC |
| AMT_EVTCONREQ | Request to Q93B to initiate a new connection by generating a SETUP message | Q93B | CALLC |
| AMT_EVTCONRSP | Indication to Q93B that CALLC has accepted a request to establish a connection. | Q93B | CALLC |
| AMT_EVTCNSTREQ | Request to Q93B to generate a specified connection related message. | Q93B | CALLC |
| AMT_RELREQ | Request to Q93B to release a connection be generating either a REKEAS or a RELEASE COMPLETE message. | Q93B | CALLC |
| AMT_EVTSTAENQREQ | Request to Q93B to query it's peer signaling entity about the status of a connection by generating a STATUS ENQUIRY message. | Q93B | CALLC |

TABLE I-continued

CALLC-Q93B

| Message | Function | To | From |
|---|---|---|---|
| AMT_EVTADDPTYREQ | Request to Q93B to add a party, to a point-to-multipoint connection, by generating an ADD PARTY message. | Q93B | CALLC |
| AMT_EVTADDPTYREJREQ | Request to Q93B to reject a request to add a new party, to a point-to-multipoint connection, by generating an ADD PARRTY REJECT message. | Q93B | CALLC |
| AMT_DROPPTYREQ | Request to Q93B to drop a party, from a point-to-multipoint connection, by generating a DROP PARTY or DROP PARTY ACKNOWLEDGE message. | Q93B | CALLC |
| AMT_EVTRSTREQ | Request to Q93B to release all VCCs on a link, all VCCs within a VP or a single VCC, by generating a RESTART message. | Q93B | CALLC |

TABLE J

CIP-CALLC

| Message | Function | To | From |
|---|---|---|---|
| CC_EVTCONIND | Indication to CIP that CALLC has received a valid AMT_EVTCONIND message | CIP | CALLC |
| CC_EVTCONCFM | Confirm that a previous request to establish a connection through a CC_CONREQ message, ha been accepted | CIP | CALLC |
| CC_EVTCNSTIND | Indication to CIP that CALLC has received a valid AMT_EVTCNSTIND message | CIP | CALLC |
| CC_EVTRELIND | Indication to CIP that a connection has received a valid AMT_RELIND message indicating that a connection has been released due to that the local Q93B entity receiving a message from it's peer signaling entity (RELEASE, RELEASE Complete etc.) | | |
| CC_EVTBNDREQ | Request to CALLC to create a new SAP and to bind CIP to this SAP | CALLC | CIP |
| CC_EVTUBNDREQ | Request to delete a SAP, with a specified SAP id, to which CIP was previously bound. | CALLC | CIP |
| CC_EVTCONREQ | Request to CALLC to initiate a new connection. | CALLC | CIP |
| CC_EVTCONRSP | Indication to CALLC that CIP has accepted a request to establish a connection. | CALLC | CIP |
| CC_EVTCNSTREQ | Request to CALLC to generate a specified connection related message | CALLC | CIP |
| CC_RELREQ | Request to CALLC to release a connection. | CALLC | CIP |

TABLE K

PVC_MAN-CALLC

| Message | Function | To | From |
|---|---|---|---|
| CC_EVTCONIND | Indication to PVC_MAN that CALLC has received a valid AMT_EVTCONIND message | PVC_MAN | CALLC |
| CC_EVTCONCFM | Confirm that a previous request to establish a connection through a CC_CONREQ message, ha been accepted | PVC_MAN | CALLC |
| CC_EVTCNSTIND | Indication to PVC_MAN that CALLC has received a | PVC_MAN | CALLC |

TABLE K-continued

PVC_MAN-CALLC

| Message | Function | To | From |
|---|---|---|---|
| CC_EVTRELIND | valid AMT_EVTCNSTIND message Indication to PVC_MAN that a connection has received a valid AMT_RELIND message indicating that a connection has been released due to that the local Q93B entity receiving a message from it's peer signaling entity (RELEASE, RELEASE Complete etc.) | PVC_MAN | CALLC |
| CC_EVTBNDREQ | Request to CALLC to create a new SAP and to bind PVC_MAN to this SAP | CALLC | PVC_MAN |
| CC_EVTUBNDREQ | Request to delete a SAP, with a specified SAP id, to which PVC_MAN was previously bound. | CALLC | PVC_MAN |
| CC_EVTCONREQ | Request to CALLC to initiate a new connection. | CALLC | PVC_MAN |
| CC_EVTCONRSP | Indication to CALLC that PVC_MAN has accepted a request to establish a connection. | CALLC | PVC_MAN |
| CC_EVTCNSTREQ | Request to CALLC to generate a specified connection related message | CALLC | PVC_MAN |
| CC_RELREQ | Request to CALLC to release a connection. | CALLC | PVC_MAN |

TABLE L

CHASSI_MAN-CALLC

| Message | Function | To | From |
|---|---|---|---|
| CC_EVTSTAIND | Indication to CALLC of a status change of a specified physical link. | CALLC | CHASSI_MAN |

TABLE M

SE xx-SAR_DRV

| Message | Function | To | From |
|---|---|---|---|
| AAL_EVTBNDREQ | Request to create a new SAP and to bind SE xx to this SAP. | SAR_DRV | SE xx |
| AAL_EVTUBNDREQ | Request to delete a SAP, with a specified SAP id, to which SE xx was previously bound. | SAR_DRV | SE xx |
| AAL_EVTCONREQ | Request to SAR_DRV to activate the AAL layer connection for a specified SAP | SAR_DRV | SE xx |
| AAL_EVTDISCREQ | Request to SAR_DRV to deactivate the AAL layer connection for a specified SAP | SAR_DRV | SE xx |
| AAL_EVTDATREQ | Request to SAR_DRV to transmit data | SAR_DRV | SE xx |
| AAL_EVTCONCFM | Confirm to SE xx that the electrical level is up. | SE xx | SAR_DRV |
| AAL_EVTDATCFM | Confirm to SE xx that data has been successfully transmitted. | SE xx | SAR_DRV |

TABLE M-continued

SE xx-SAR_DRV

| Message | Function | To | From |
| --- | --- | --- | --- |
| AAL_EVTDATIND | Indication to SE xx that valid data has been received. | SE xx | SAR_DRV |
| AAL_EVTDISCCFM | Confirm to SE xx that, as previously requested through an AALEVTDISCREQ message, the AAL layer connection has been deactivated | SE xx | SAR_DRV |
| AAL_EVTDISCIND | Indication to SE xx that the AAL layer has been deactivated for a specified. | SE xx | SAR_DRV |

TABLE N

ILMI-MODEM_xDSL

| Message | Function | To | From |
| --- | --- | --- | --- |
| MODEM_EVTSTAIND | Indication to ILMI of a status change of a specified modem port | ILMI | MODEM_xDSL |

TABLE O

ILMI-CHASSI_MAN

| Message | Function | To | From |
| --- | --- | --- | --- |
| LIM_EVTSTAIND | Indication to ILMI of a status change of a specified physical link. | ILMI | CHASSI_MAN |

TABLE P

Q93B-QSAAL

| Message | Function | To | From |
| --- | --- | --- | --- |
| ASD_EVTCONCFM | Confirm to Q93B that a previous request to establish an SSCOP connection has succeeded. | Q93B | QSAAL |
| ASD_EVTDISCIND | Indication to Q93B that a previously established SSCOP connection has been disconnected. | Q93B | QSAAL |
| ASD_EVTDISCCFM | Confirm to Q93B that a previous SSCOP disconnection request, through an ASD_EVTDISCREQ message, has succeeded. | Q93B | QSAAL |
| ASD_RSTIND | Indication to Q93B that a previously established SSCOP connection has been reset. | Q93B | QSAAL |
| ASD_DATIND | Indication to Q93B that data has been received in assured mode. | Q93B | QSAAL |
| ASD_DATCFM | Indication to Q93B that a congestion situation has started or ended on this SAP and therefore a new line of credit has been issued. | Q93B | QSAAL |
| ASD_EVTUDATIND | Indication to Q93B that data has been received in unassured mode | Q93B | QSAAL |

TABLE P-continued

Q93B-QSAAL

| Message | Function | To | From |
|---|---|---|---|
| ASD_EVTCNSTIND | Indication to Q93B that a specified channel is open for communication | Q93B | QSAAL |
| ASD_EVT_BNDREQ | Request to QSAAL to create a new SAP and to bind Q93B to this SAP | QSAAL | Q93B |
| ASD_EVTCONREQ | Request to QSAAL to establish an SSCOP connection to a peer entity. | QSAAL | Q93B |
| ASD_EVTDATREQ | Request to QSAAL to transmit data in assured mode | QSAAL | Q93B |
| ASD_EVTDATRSP | Acknowledgment, to QSAAL, of a previously send ASD_EVTDATIND message | QSAAL | Q93B |
| ASD_EVTDISCREQ | Request to QSAAL to disconnect one or all SSCOP connections on a specified SAP | QSAAL | Q93B |
| ASD_EVTUBNDREQ | Request to delete a SAP, with a specified SAP id, to which Q93B was previously bound. | QSAAL | Q93B |
| ASDUDATREQ | Request to QSAAL to transmit data in unassured mode | QSAAL | Q93B |

PROXY SIGNALING

The IMAS enables a telecommunications service provider to support the next generation of virtual connections. Regardless of whether the telecommunications lines coupled to the inputs and outputs of the IMAS are based on SVC, PVC, or a combination of PVC and SVC, the IMAS can support SVCs for a more flexible, timely, efficient, and manageable connection. A major drawback of those DSLAMs that supported PVCs only is that the connection was difficult to manage and time-consuming to set up. With SVC support, the IMAS assists the ATM network in hand crafting an SVC-based connection almost immediately between end users when the originating end user wants to make a call to a destination end user, and tear down that virtual connection almost immediately when that call has completed. Unlike PVCs, when the network inadvertently loses a link, the network will attempt to set up another connection by re-routing the call.

For some ATM end systems, SVC signaling capability is limited to non-existent. For those end systems still using PVCs, for example, no signaling is used to set up or tear down the virtual connection. Nevertheless, even for these non-signaling end systems, SVCs can still be supported using the proxy signaling scheme in accordance with one embodiment of the present invention. The proxy signaling scheme uses a proxy signaling agent at the IMAS to control the virtual connection/circuit setup and termination of the non-signaling ATM end system. With the proxy signaling aspect of the present invention, the IMAS supports SVC signaling even though the loop side is PVC-based and the telecommunications backbone side can support SVC. Similarly, if both the loop side and the telecommunications backbone side support SVC, the IMAS supports such SVC signaling for call establishment and termination.

Generally, proxy signaling calls are made on behalf of xDSL (e.g., ADSL) associated devices because these devices currently do not support SVC signaling. An example of an xDSL device is the ADSL modems that were designed for operation in a PVC environment and hence, do not support SVC signaling. In the future, however, some xDSL modems may support SVC signaling.

To provide SVC support, a proxy signaling agent resides in the IMAS and operates to establish and terminate calls via the SVC signaling protocol. This proxy signaling agent allows those PVC-supported calls directed to the OC3uplink to be supported by SVC so that session-based virtual paths can be established as needed, without waiting valuable time for a PVC path to be established. As soon as the call (including the SVC signaling) is successful, a data connection is set up between the xDSL port at the IMAS in the central office and the OC3 uplink port. Similarly, an SVC call that had previously been established can be torn down via the same SVC signaling.

Proxy signaling calls are controlled by the proxy signaling group of the Enterprise MIB. This group contains the Proxy Signaling Table, the ISP Table, and the Connect Info Table. These tables, which are shown in FIGS. 29, 30, 31, and 32, cross reference each other to make the desired SVC connections between the device associated with the xDSL port (e.g., PC with modem at a small business) and the ISP that provides a number of services, including Internet access. The establishment and termination of proxy signaling calls are controlled by the addition and deletion of information to these tables. The Proxy Signaling Table contains an entry for each xDSL port, VPI and VCI that is to be connected to an ISP—essentially, a call that comes in at one of the xDSL ports is destined for an ISP for which an SVC path must be set up. The ISP Table contains the ATM addresses of the ISPs that the xDSL connected devices (e.g., PC with modem) can connect with. The Connect Info Table contains information necessary to properly format the Setup message used to connect the SVC.

PROXY SIGNALING SOFTWARE ENTITIES

Referring now to FIG. 19, the proxy signaling agent 462 resides in an ATM node. In one embodiment, the proxy signaling agent 462 resides in the IMAS which can interface an xDSL connection with an ATM connection. In other embodiments, the proxy signaling agent 462 can reside in a conventional DSLAM along with other supporting functionality as add-ons via hardware and software modifications.

The proxy signaling agent 462 originates and terminates calls directed toward the OC3 uplink (i.e., uplink calls from the xDSL device to a destination device accessed via the ATM backbone). The proxy signaling agent 462 allows proxy SVC calls to be made on behalf of xDSL associated devices because these devices do not support SVC signaling. The proxy signaling agent 462 does not accept any incoming downlink calls (i.e., calls from an ATM backbone device to a xDSL connected device).

To enable this proxy SVC functionality, the proxy signaling agent 462 enlists the assistance of a MIB agent 461, a call control CALLC 463, and a resource manager 464. The proxy signaling agent 462 is coupled to the MIB agent 461 via line 473, and the CALLC 463 via line 474. The CALLC 463 is coupled to the resource manager 464 via line 475. Generally, the proxy signaling agent 462 receives call parameter information from the MIB agent 461, uses these call parameters to set up calls using the CALLC 463, and the actual physical call is made (or broken) by the resource manager 464. Whether the call is made or broken, the CALLC 463 reports or responds back to the proxy signaling agent 462. Further details will be provided below.

The proxy signaling agent 462 is driven by entries in the three tables in the MIB Agent 461—Proxy Signaling Table, ISP Table, and Connect Info Table. As mentioned above, the establishment and termination of proxy signaling calls are controlled by the addition and deletion of information to these tables. Such establishment and termination will now be discussed.

PROXY SIGNALING TABLES

Figure 29:
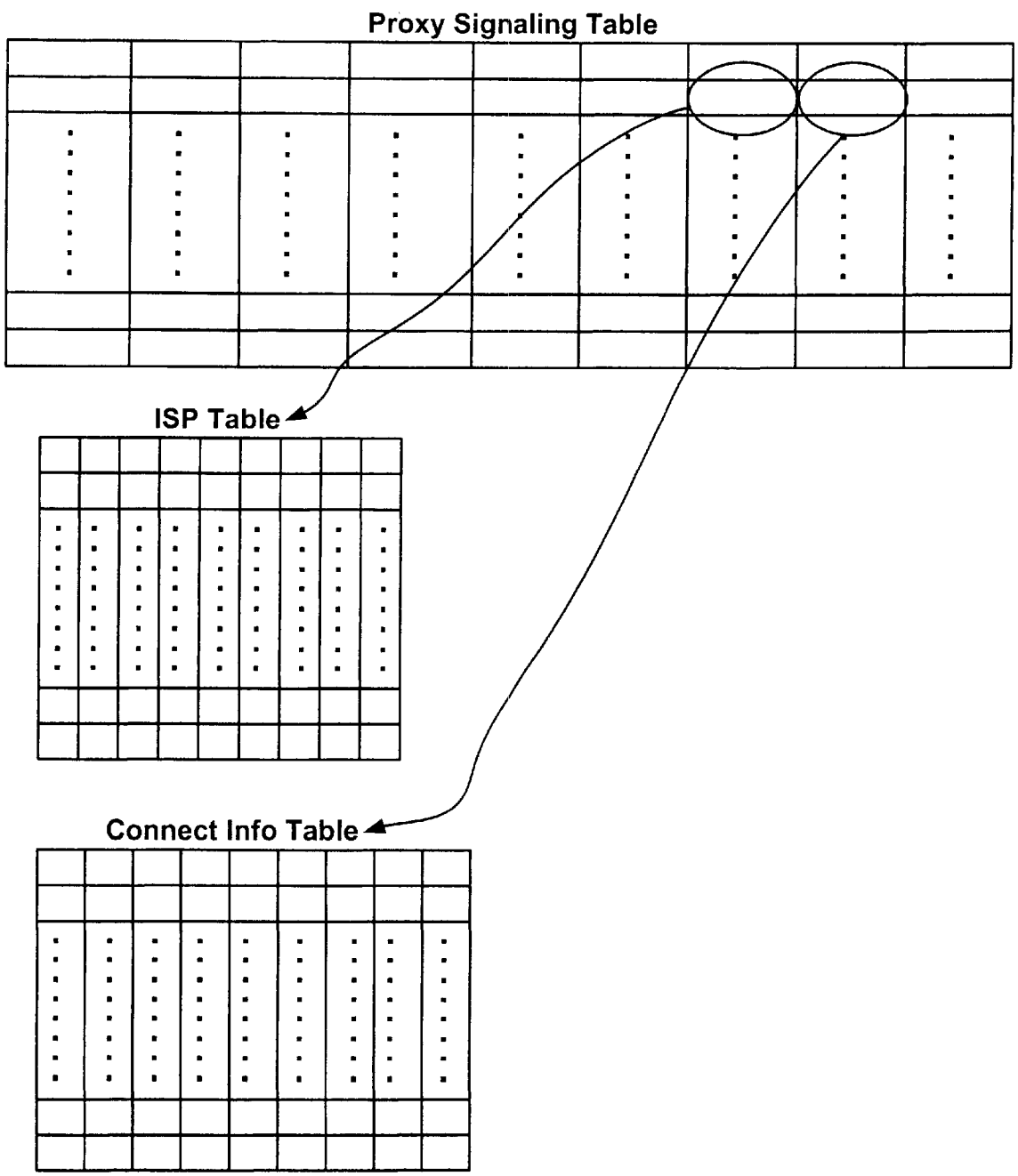
FIG. 29 shows a high level view of the three tables used in the proxy signaling process and their interactions. These three tables are Proxy Signaling Table, ISP Table, and Connect Info Table.

Referring to FIG. 29, three tables called Proxy Signaling Table, ISP Table, and Connect Info Table are provided for call establishment and termination. Each of these tables contains fields with corresponding entries which reference another table. For example, the Proxy Signaling Table provides ISP information which link (or point) to the ISP Table, and Connect Info which link (or point) to the Connect Info Table. The indices into the Proxy Signaling Table are ifIndex, VPI, and VCI. The index into the ISP Table is ISPIndex. The index into the Connect Info Table is Connect Info Index. Thus, a particular ifIndex and VPI/VCI in the Proxy Signaling Table may be associated with a particular ISP ID. This ISP ID points to the appropriate ISP Table that contains the ISP address(es) corresponding to this ISP ID. Analogously, the ifIndex and VPI/VCI in the Proxy Signaling Table may be associated with a particular Connect Info ID. This Connect Info ID points to the appropriate Connect Info Table that contains the call connection information corresponding to this particular VPI/VCI. Although one embodiment of the present invention uses multiple distinct tables as shown in FIG. 29, another embodiment of the present invention uses only one table that has all the information contained in the Proxy Signaling Table, ISP Table, and Connect Info Table.

PROXY SIGNALING TABLE

The Proxy Signaling Table will now be discussed. The Proxy Signaling Table is the main table used by the proxy signaling agent 462. The Proxy Signaling Table is generally the master table that contains status and parameter information for proxy signaling virtual channel connections (i.e., SVC) originating at an ATM interface at the node where the proxy signaling agent 462 resides. In one embodiment, the proxy signaling agent 462 resides at an IMAS. As shown in FIG. 30, the Proxy Signaling Table contains one row for each proxy call that is to be made on behalf of an xDSL port.

The fields in the Proxy Signaling Table are as follows:
ifindex
VPI
VCI
Retry Count
Retry Time Interval
Admin Status
Oper Status
ISP ID
Connect Info ID
Row Status An entry in this Proxy Signaling Table corresponding to a VPI/VCI contains status and parameter information on a given proxy call that is originated at an ATM interface in this network node. The indices into this table are ifindex, VPI, and VCI. These indices specify the xDSL port, VPI, and VCI for the proxy call. The ifindex is associated with the network interface (NI) and VPI/VCI values associated with the proxy for every port on this node. Essentially, the ifindex identifies the each port in this node that originates the given proxy call. It is used to originate a proxy call by creating a row, filling in the requisite fields, and then setting up Admin Status to "UP," which will be described later.

In one embodiment of the present invention, the ifindex identifies the xDSL port on the DSL side of the network. Many VPI/VCIs can be supported per port (and per line card). Based on the number of line cards used and the number of ports used per line card, one embodiment of the present invention can support up to 4,096 virtual circuits on the xDSL side (e.g., PVC side) of the IMAS. On the SVC side (or telecommunications backbone or WAN port side), up to 4,096 virtual circuits can be supported by the IMAS. These virtual circuits are represented by the VPI/VCI number. These 4,096 virtual circuits can be allocated among the ports on both the subscriber side and the telecommunications backbone side in any manner desired by the system administrator.

In one embodiment of the present invention, the fields are predetermined and the system administrator makes the entries at the NMS via a network console. The data that represent the entries are sent to the master SNMP agent (agent 403 in FIG. 17). This master SNMP agent 403 (see FIG. 17) then distributes information to the relevant software entities, including the MIB agent 461 (see FIG. 19) which receives the entry data for the tables. As explained above, the MIB agent 461 (see FIG. 19) provides table updates to the proxy signaling agent 462 (see FIG. 19).

As explained above, the indices into the Proxy Signaling Table are ifIndex, VPI, and VCI. These indices uniquely identify an entry in this table. The next two fields, Retry Count and Retry Time Interval, address issues that concern retry attempts between calls in the event of call failure or release. Two other fields, Admin Status and Oper Status, address the desired and actual operational states of the SVC connection. The next two fields, ISP ID and Connect Info ID, provide links to other tables that contain more detailed information to enable the call connection/release to be enabled. The last field, Row Status, provides a status of an entry corresponding to a particular ifIndex/VPI/VCI. These fields work together in combination. For example, to make a proxy call connection, the Row Status field must be "UP" and the Admin Status must also be "UP". If a call has been established, the Oper Status is "UP" whereas "DOWN" indicates that the call has not been established.

The VPI and VCI uniquely identify a PVC; that is, the connection between the user (e.g., home PC and modem) and an IMAS port. Once a call is established to an ISP on the SVC side of the connection, it will be cross connected to this port/VPI/VCI. The cross connection allows multiple proxy calls per xDSL port; that is, each xDSL port can be coupled to a large number of SVC paths via the proxy signaling. The VPI and VCI fields are part of the standard ATM header. The VPI is an 8-bit field and the VCI is a 16-bit field that uniquely identify the ATM cell. However, for SVC control signaling purposes, the ATM network uses the larger 16-bit VPCI and the VCI fields. Although the ATM network transmits the VPI, the signaling protocol does not see the VPI at all, but the ATM switch has a local mapping of VPCI to VPI for each virtual path.

The next two fields, the Retry Count and Retry Time Interval, address retry issues for call attempts when the call failed to connect or was released by the network for some reason. The Retry Count field represents the number of times the switch will retry to establish a proxy call using the same ATM address (which is listed in the ISP Table). Usually, if the call attempt failed on the first try or the call was released by the network due to an exception condition, the retry count information will be accessed to determine how many times the switch will try to re-establish the connection. If the system attempted call connections to the current ATM address for the maximum number of times specified in the Retry Count field and failed, the system then proceeds to the next available ATM address (listed in the ISP Table, to be discussed further below).

For the interval between retry attempts, the Retry Time Interval field is provided. This Retry Time Interval field indicates the amount of time the switch waits before it attempts to establish a proxy call that failed to establish or was released by the network due to an exception condition. If the number of retries is set to the value "0," then this field is ignored.

The next two fields, Admin Status and Oper Status, indicate the desired and actual operational states, respectively, of the proxy call connections. The Admin Status field indicates the current desired administrative state of a proxy call. In other words, the system administrator may want the SVC portion of the circuit "UP" or "DOWN." If the Admin Status value indicates "UP," then the circuit or connection associated with an SVC proxy call is operational even if the port may not be physically operational. Usually, however, an "UP" indication for Admin Status also results in the port being physically operational. If the Admin Status is "DOWN," the state of the circuit or connection is not operational or released.

Oper Status indicates whether a call connection has been established or not. The "UP" indicates that a proxy call has been established, whereas "DOWN" indicates that the proxy call has not been established. The unknown state indicates that the state of the proxy call cannot be determined. With respect to Admin Status, when Admin Status is "UP," Oper Status could be either "UP" or "DOWN" (but usually "DOWN" until proxy call has been established). When Admin Status is "DOWN," Oper Status will be "DOWN."

The next two fields, ISP ID and Connect Info ID, provide links or pointers to the ISP Table and the Connect Info Table, respectively. The ISP ID has the same value as the ISP Index, which identifies the entries in the ISP Table corresponding to a particular VPI/VCI. The ISP ID is used by the system to index into the relevant ISP Table. Thus, an entry in this field provides an index to the relevant ISP Table which provides a list of at least one ISP address for call establishment and release. The value of this field is set by the MIB agent 461 (see FIG. 19) after the associated entry in the ISP Table have been created.

The Connect Info ID has the same value as the Connect Info Index, which identifies the entries in the Connect Info Table corresponding to a particular VPI/VCI of an ATM cell. It is used by the system to index into the relevant Connect Info Table to obtain call connection/release information. The values of this field are set by the MIB agent 461 (see FIG. 19) after the associated entry in the Connect Info Table have been created.

The last field in the Proxy Signaling Table of FIG. 30 is Row Status, which exists for management of this Proxy Signaling Table and hence for proxy call connection/termination. The Row Status provides status information for any entry corresponding to a VPI/VCI. This field is used to create a new proxy call or delete an existing proxy call at the originating node. To initiate a proxy call connection, the Admin Status field must be set to "UP."

ISP TABLE

Referring now to FIG. 31, the ISP Table will now be discussed. The ISP Table is a table of ATM addresses of the Network Interfaces to be used for each ISP for proxy signaling. For each ISP address, a plurality of alternative ATM addresses will be listed. The entry into this table is ISP Index, or ISP ID1 to ISP IDM as shown in FIG. 31. The ISP Table contains the following fields:

ISP ID (ISP ID1 . . . ISP IDM)
ISP DESCR
ATM Adresses (ATM Address1 . . . ATM AddressN)
Row Status The ISP ID field in the ISP Table corresponds to the ISP ID in the Proxy Signaling Table that uniquely identified a particular VPI/VCI. Indeed, the ISP ID field in the Proxy Signaling Table is a pointer to the relevant portion of this ISP Table. A one-to-one correspondence between VPI/VCI and ISP IDs does not necessarily exist. Multiple different VPI/VCI in the Proxy Signaling Table can map to the same ISP ID. However, a single VPI/VCI corresponds to a single ISP ID. The Proxy Signaling Table, which maps VPI/VCI to an ISP ID for indexing into the ISP Table, provides only one ISP ID field.

In the ISP Table, a unique ISP ID is associated with a row of entries. FIG. 31 shows M ISP IDs from ISP ID1 to ISP IDM. The ISP DESCR provides a description of the ISP ID.

The ATM Address fields identify the ATM addresses of the Network Interface that terminate a particular proxy call. FIG. 31 shows ATM Address1 to ATM Address5 to ATM AddressN. Thus, in one embodiment of the present invention, N is greater than 5 as more than five ATM addresses are shown in FIG. 31. However, any desired number of ATM addresses may be used, including less than five ATM addresses. In one embodiment, each row may contain up to five ISP ATM addresses. These addresses are listed in preference ascending order. For example, ATM address1 in FIG. 31 is used first for the call connection. If repeated attempts (as specified in the Retry Count field in the Proxy Signaling Table) result in failure, ATM address2 (the second listed ATM address) will be used next.

As briefly explained above, each ATM address represents an alternative ATM address corresponding to this particular ISP ID. These alternative ATM addresses are particularly relevant for any retry attempts defined in the Proxy Signaling Table as Retry Count and Retry Time Interval. Thus, if a call attempt failed for the first ATM address, the system attempts the call connection again after waiting a short time interval dictated by the Retry Time Interval field. These retries to the same ATM address (upon failure) are dictated by the Retry Count field in the Proxy Signaling Table which specify the maximum number of times that the system attempts call connections to the same ATM address. If the system reaches the maximum number of retry attempts as determined by the Retry Count field for a given ATM address, the system then proceeds to the next listed ATM address. If the system reaches the last ATM address, the system attempts the call with the first ATM address. This process of attempting calls with all the listed ATM addresses is cyclical and proceeds until the call connection is successful.

The Row Status field is used to create a new row or modify or delete an existing row in the ISP Table. Each Row Status cell in the table provides such add/modify/delete status for the entire row corresponding to an ISP ID. Thus, if row for ISP ID6 is to be deleted, the ROW Status field will reflect this status. The NMS 407 via the master SNMP agent 403 (see FIG. 17) and the MIB agent (see FIG. 19) will then update the ISP Table to reflect the deletion of the entries corresponding to the ISP ID6 row.

CONNECT INFO TABLE

The Connect Info Table shown in FIG. 32 will now be discussed. The Connect Info Table contains a connection profile which will be used when establishing a proxy call (i.e., building a setup message). Each VPI/VCI in the Proxy Signaling Table is associated with a Connect Info ID, which is the same value as the Connect Info Index in the Connect Info Table. This Connect Info ID in the Proxy Signaling Table is used as the pointer to or index into the relevant portion of the Connect Info Table. In one embodiment of the present invention, many Proxy Signaling Table entries can share the same Connect Info Table entry. The fields in this table are associated with the SVC side of the connection. The fields are as follows:
Connect Info Index
DESCR
Forward Max CPCS SDU Size
Backward Max CPCS SDU Size
Forward Peak Cell Rate
Backward Peak Cell Rate
Bearer Class
Layer 2 Protocol
Layer 3 Protocol
Initial Protocol ID
Forward QoS Class
Backward QoS Class
Row Status The index into this table is called Connect Info Index. The Connect Info ID in the Proxy Signaling Table, which has the same value as the Connect Info Index in this Connect Info Table, pointed to the relevant portion of the Connect Info Table. The DESCR field provides a description of the Connect Info entry.

The Forward Max CPCS SDU Size field refers to the maximum AAL5 CPCS SDU size in octets that is supported in the forward direction of this connection. CPCS, or Common Part Convergence Sublayer, and SDU, or Service Data Unit, are ATM acronyms. CPCS SDU refers to the data unit which will be delivered to the receiving AAL layer by the destination CPCS. As known to those skilled in the art, the length of CPCS SDU sizes can vary from 1 to 65,568 bytes. The CPCS PDU, which is a superset of the CPCS SDU and also includes the PAD of 0 to 47 bytes and the CPCS PCI (Protocol Control Information) of 8 bytes, can vary in size from 48 to 65,568 bytes. The Backward Max CPCS SDU Size field refers to the maximum AAL5 CPCS SDU size in octets that is supported in the backward direction of this connection.

The Forward Peak Cell Rate field refers to the peak number of cells that is supported in the forward direction of this connection. The Backward Peak Cell Rate field refers to the peak number of cells that is supported in the backward direction of this connection.

The next three fields, Bearer Class, Layer 2 Protocol, and Layer 3 Protocol, comply with the ATM UNI specification v. 3.1. The Bearer Class field refers to the bearer class for this connection. The Bearer Class refers to the broadband bearer capability information element that is used to indicate a requested broadband connection-oriented service (see ITU-T Recommendation F.811) to be provided by the network. Three bearer classes exist—BCOB-A, BCOB-C, and BCOB-X. BCOB-A and BCOB-C refer to the user requesting more than an ATM-only service from the network. BCOB-X, however, refers to the user requesting an ATM-only service from the network.

The Layer 2 Protocol field refers to the layer 2 protocol information for this connection. In accordance with ATM UNI specificaiton v. 3.1, the following layer 2 protocols can be specified in this field of the Connect Info Table:
Basic Mode ISO 1745
ITU-T Recommendation Q.921
ITU-T Recommendation X.25, link layer
ITU-T Recommendation X.25 multilink
Extended LAPB; for half duplex operation
HDLC ARM (ISO 4335)
HDLC NRM (ISO 4335)
HDLC ABM (ISO 4335)
LAN logical link control (ISO 8802/2)
ITU-T Recommendation X.75, single link procedure
ITU-T Recommendation Q.922
User specified
ISO 7776 DTE-DTE The Layer 3 Protocol field refers to the layer 3 protocol information for this connection. In accordance with ATM UNI specificaiton v. 3.1, the following layer 3 protocols can be specified in this field of the Connect Info Table:
ITU-T Recommendation X.25, packet layer
ISO/IEC 8208
X.223/ISO 8878
ISO/IEC 8473
CCITT Recommendation T.70 minimum network layer
User specified The Initial Protocol ID field refers to the initial protocol ID for this connection. This field is valid only if the Layer 3 Protocol ID field is not omitted.

The Forward QoS Class field refers to the Quality of Service class in the forward direction for this connection. The Backward QoS Class field refers to the Quality of Service class in the backward direction for this connection.

The Row Status field is used to create a new row or modify or delete an existing row in this table. In this respect, it is similar to the Row Status fields of the Proxy Signaling jTable and the ISP Table.

PROXY CALL PROCESSING—GENERAL

The proxy call process for establishing and terminating a proxy signaling call will now be discussed. Specifically, call process initialization, call establishment, call termination, and call retry will be discussed with reference to FIGS. 21, 22, 23, 24, 25, 26, 27, and 28. In one embodiment of the present invention, these processes are performed in software at the DSLAMs. In particular, these processes are performed in the IMAS. In another embodiment, these processes are performed in hardware. For call establishment and termination, the system uses the fields and entries from the Proxy Signaling Table. For call retry, the system uses the fields and entries from the Proxy Signaling Table and the ISP Table. The Connect Info Table is used to obtain status and connection configuration information.

PROXY CALL INITIALIZATION PROCESS

Figure 21:
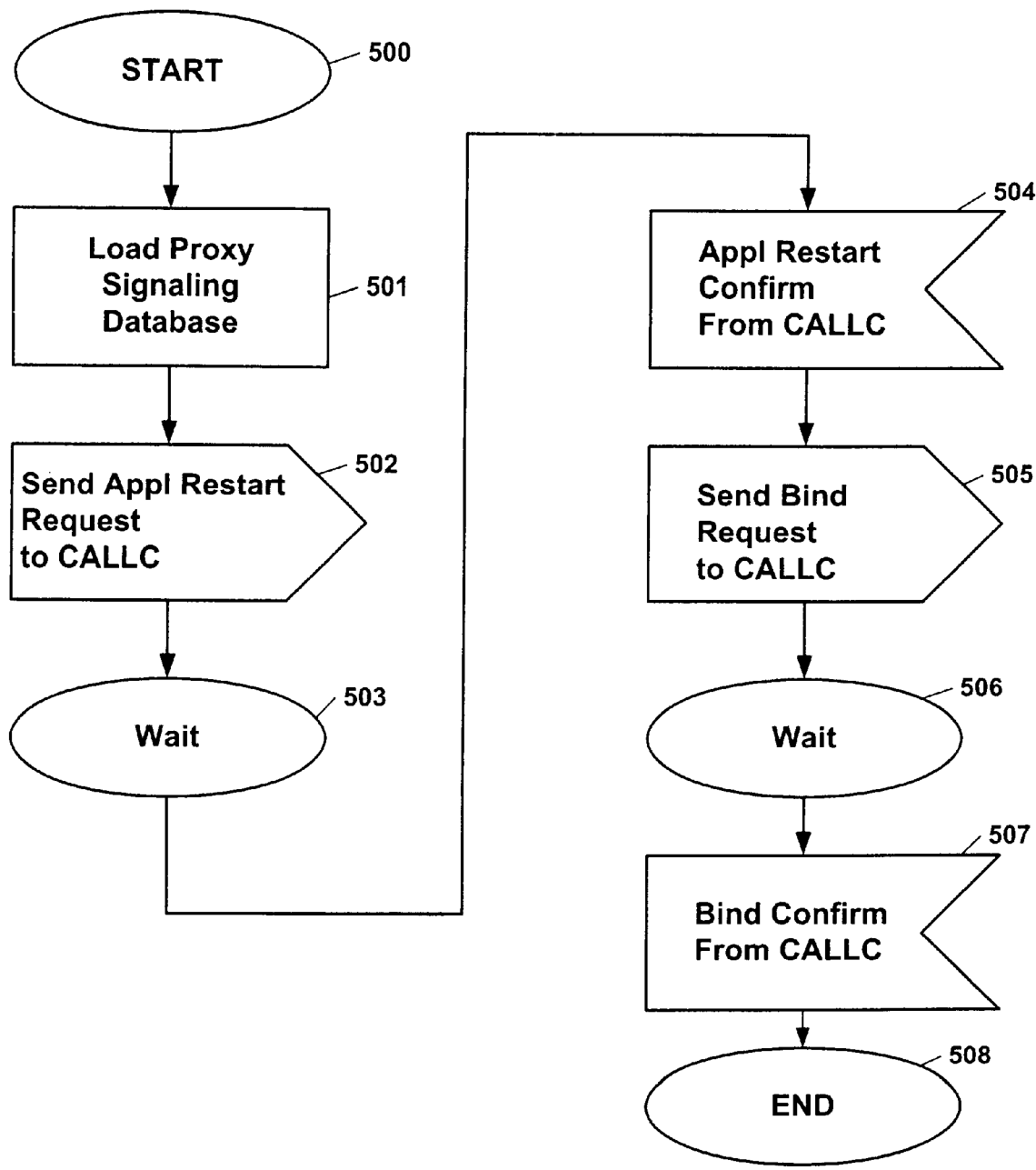
FIG. 21 provides a flow diagram of the proxy signaling initialization process.

Initialization of the proxy signaling agent 462 (FIG. 19) will now be discussed. The initialization process involves two sets of steps—(1) loading the proxy signaling persistent store database; and (2) binding with the Call Control CALLC software entity 474 (FIG. 19). FIG. 21 illustrates the call process initialization steps.

The process starts at step 500 during system boot-up. Recalling the user interface side, the system administrator or user can view performance statistics/reports and configure the various devices coupled to the NMS with the network management console (refer to FIGS. 16 and 17). For device configuration, he can make entries in the various tables (e.g., Proxy Signaling Table, ISP Table, Connect Info Table). Once the configuration information is entered, this information is sent to the IMAS via an SNMP link where table configuration data is stored in non-volatile memory (e.g., flash EEPROM) in CPU subsystem 97 (see FIGS. 6 and 7). In one embodiment of the present invention, this non-volatile memory is located in the IMAS.

In step 501 of FIG. 21, the proxy signaling database (i.e., tables) are loaded from the non-volatile memory into local memory (e.g., RAM). This load operation will provide the IMAS with access to the tables for proxy signaling call establishment or termination.

The restart sequence will then proceed. In step 502, the proxy signaling agent 462 (FIG. 19) sends a request called Appl Restart Request to CALLC 463 via line 474. In step 503, the system waits for the restart request from the proxy signaling agent 462 to be confirmed by the CALLC 463. In step 504, the CALLC 463 sends a confirmation called AppI Restart Confirm to the proxy signaling agent 462.

Once the restart sequence has been launched, the bind sequence will then proceed to bind the proxy signaling agent 462 with the CALLC 463 so that further communication can be achieved. In step 505, the proxy signaling agent 462 sends a request called Bind Request to CALLC 463 via line 474. The system then waits in step 506 for the bind request to be acknowledged by CALLC 463. In step 507, the CALLC 463 sends the Bind Confirm response to the proxy signaling agent 462. As discussed later, the Bind Confirm contains a port map indicating the status of all ports at the time of the bind request.

The call initialization process ends at step 508. Although these steps are executed primarily during a hard boot-up, the same process can be used for soft boot-ups as well. Also, power restoration upon failure may necessitate that this call initialization process be executed.

PROXY CALL ESTABLISHMENT

The proxy call establishment process will now be discussed. In order for a proxy call to be made, a triggering event must occur and certain conditions must exist. In one embodiment of the present invention, the system recognizes three triggering events and these events are any of the following:

(1) A xDSL port is now "UP;" or
(2) A new entry is added to the Proxy Signaling Table via Row Status, with the Admin Status set to "UP;" or
(3) The Admin Status of an existing Proxy Signaling Table entry is changed to "UP."

When any one of the above triggering events occur, a proxy call will be attempted if further conditions are satisfied. In one embodiment of the present invention, the system recognizes three specific conditions that must be satisfied before a call attempt is made. These three conditions are as follows:

(1) A valid active entry exists in the Proxy Signaling Table; and
(2) The Admin Status of this entry is "UP;" and
(3) The corresponding xDSL port is "UP."

Figure 22:
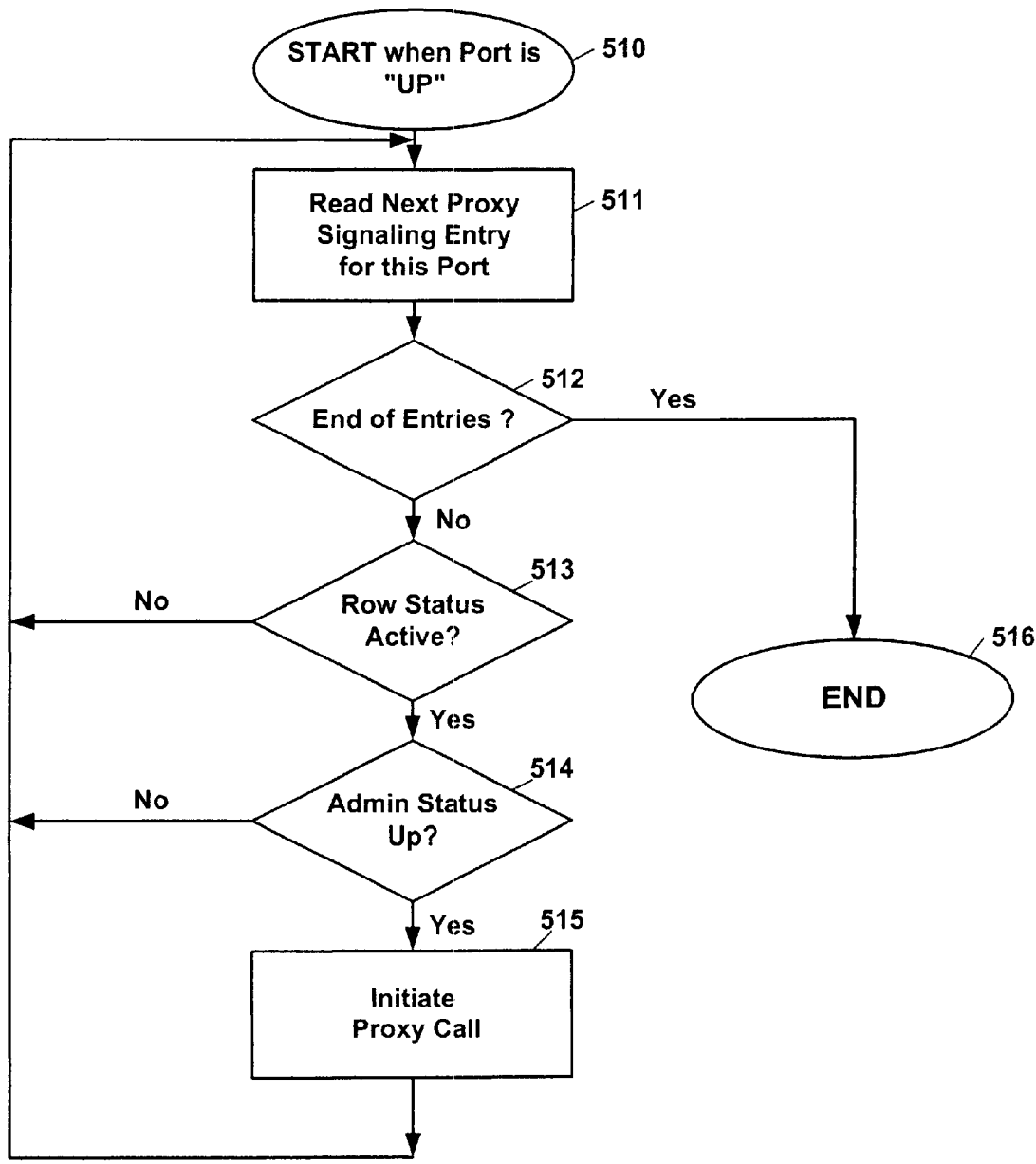
FIG. 22 provides a flow diagram of proxy signaling call establishment when the triggering event is DSL port up, in accordance with one embodiment of the present invention.
Figure 23:
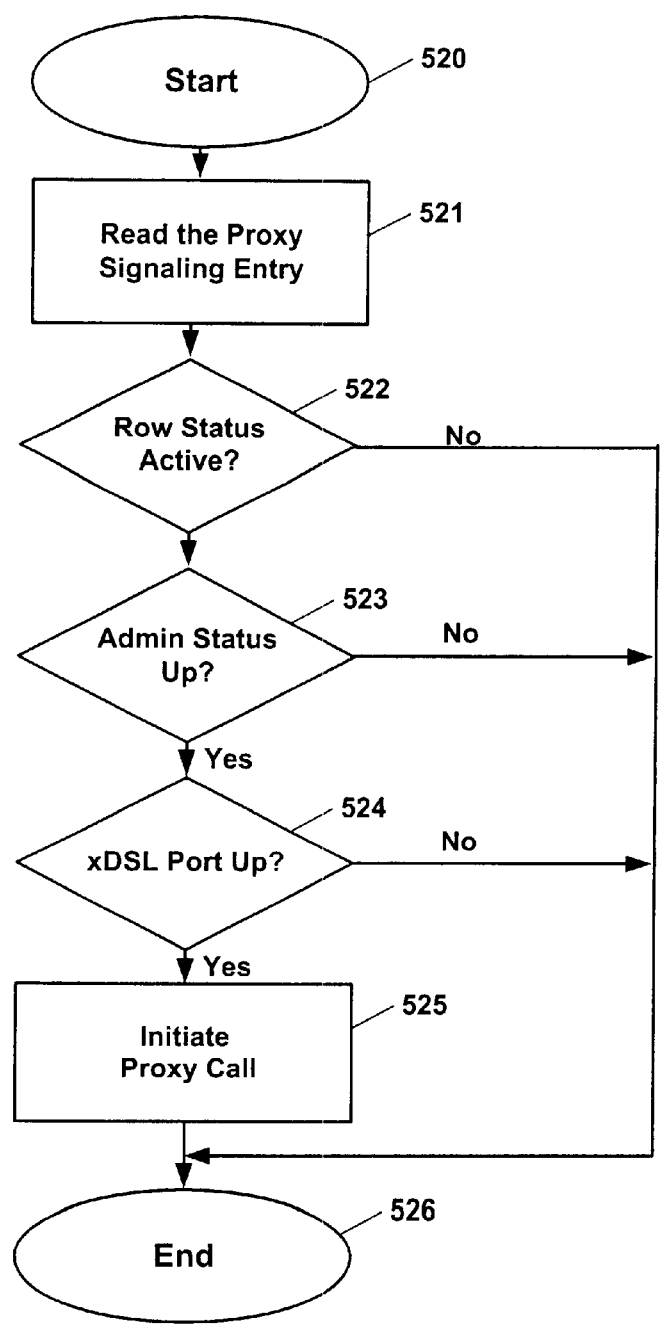
FIG. 23 provides a flow diagram of proxy signaling call establishment when the triggering event is the addition of a new entry in the Proxy Signaling Table, in accordance with one embodiment of the present invention.
Figure 24:
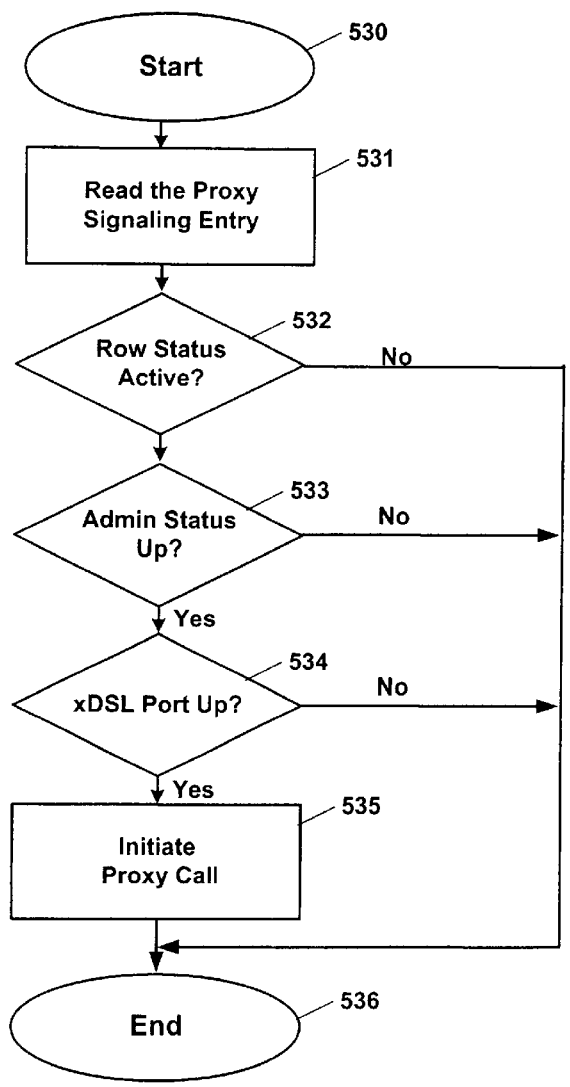
FIG. 24 provides a flow diagram of proxy signaling call establishment when the triggering event is Admin Status UP, in accordance with one embodiment of the present invention.

Call attempt processing in response to each of the above triggering events will now be discussed. FIG. 22 shows a flow diagram that describes how a call is attempted when the triggering event is an xDSL port up event. FIG. 23 shows a flow diagram that describes how a call is attempted when the triggering event is the addition of a new entry in the Proxy Signaling Table. FIG. 24 shows a flow diagram that describes how a call is attempted when the triggering event is the changing of the Admin Status to "UP."

PROXY CALL ESTABLISHMENT—PORT UP PROCESS (TRIGGER EVENT 1)

One triggering event that initiates proxy call processing is the detection of an xDSL port being "UP." Port up processing commences when a port restart indication and bind confirm are received by the proxy signaling agent 462 from CALLC 463. The bind confirm contains a port map indicating the status of all ports at the time of the bind request. Each port in the map marked "UP" is treated as if a port restart indication has been received. Refer to FIG. 22.

The process starts at step 510 when the port is "UP." This satisfies the first condition for the proxy call; that is, the xDSL port is "UP." An xDSL port is considered to be "UP" when the xDSL modems have trained. Training allows the modems to adjust to the telephone line conditions including amplitude response, delay distortions, timing recovery, and echo characteristic. The training modem (transmitting modem) sends a training sequence to the receiving modem, which makes these necessary adjustments for line condition variations. The training period lasts anywhere from 30–60 seconds for ADSL modems and 1 second for IDSL modems.

As mentioned previously, many VPIs/VCIs can be associated with a given xDSL port. An exemplary number is 50 VPI/VCI per port. Designed correctly with an adequate number of ports per line card and an adequate number of line cards per IMAS chassis, the IMAS could support up to 4,000 ports on the xDSL side (i.e., PVC side) of the network. One skilled in the art can certainly appreciate that more ports can be supported.

The ifIndex, which is an index for entry into the Proxy Signaling Table, identifies a port. At step 511, the proxy signaling agent reads the next proxy signaling entry for this port. If the proxy signaling agent had not previously accessed an entry for this port, the proxy signaling agent reads this first entry for this port. This entry for this port is associated with a VPI/VCI.

If no further entry exists, then step 512 evaluates to "YES" and the system proceeds to step 516 where the call establishment port up processing ends. If another entry exists, then step 512 evaluates to "NO" and the system proceeds to step 513.

In step 513, the process inquires on the state of the Row Status field. If a table entry exists, the Row Status field of the Proxy Signaling Table indicates this table entry status as active. If the Row Status is not active, this second condition has not been met so the system proceeds back up to step 511 where it reads the next proxy signaling entry for this same port. If the Row Status is active, this second condition has been satisfied and the system proceeds to step 514.

In step 514, the system checks the Admin Status for this entry. As explained above, the Admin Status indicates the desired operational state of the port. If the system does not want the port to be up, the Admin Status will indicate this with a "DOWN" setting. If the Admin Status is not "UP,"

this third condition has not been satisfied and the system proceeds to step 511 where it reads the next proxy signaling entry for this same port. If the Admin Status is "UP," the system desires this port to be operational and this third condition is satisfied. The system then proceeds to step 515.

In step 515, the system initiates a proxy call because the triggering event (i.e., port up) has occurred and all three conditions have been satisfied. The proxy call initiation step 515 will be discussed in greater detail below with reference to FIG. 28. After the proxy call is initiated, the system proceeds to step 511 again to read the next proxy signaling entry for this port. Note that the proxy call will be initiated for all entries (i.e., VPI/VCI) associated with this port because this port had generated a triggering event. Thus, if this triggering port is associated with 50 VPI/VCIs, all 50 VPI/VCI will be checked for the three call processing conditions before ending the process at step 516 when all entries are exhausted.

PROXY CALL ESTABLISHMENT—NEW ENTRY PROCESS (TRIGGER EVENT 2)

Another triggering event that initiates proxy call processing is the addition of a new entry into the Proxy Signaling Table. This new entry usually coincides with the addition of a new VPI/VCI from the MIB agent which is associated with a subscriber wanting an SVC connection. This new entry is associated with some port, which may be either "UP" or "DOWN." Refer to FIG. R.

The process starts at step 520. At step 521, the proxy signaling agent reads this new proxy signaling entry. This entry for this port is associated with a VPI/VCI.

In step 522, the process inquires on the state of the Row Status field. If the triggering event is the addition of a new entry, the Row Status field is active. If a table entry has just been created, the Row Status field of the Proxy Signaling Table indicates this table entry status as active. If the Row Status is not active, this first condition has not been met so the system proceeds to step 526 where the process ends and waits for the next triggering event. If the Row Status is active, this first condition has been satisfied and the system proceeds to step 523.

In step 523, the system checks the Admin Status for this entry. As explained above, the Admin Status indicates the desired operational state of the port. If the system does not want the port to be up, the Admin Status will indicate this with a "DOWN" setting. If the Admin Status is not "UP," this second condition has not been satisfied and the system proceeds to step 526 where the process ends and waits for the next triggering event. If the Admin Status is "UP," the system desires this port to be operational and this second condition is satisfied. The system then proceeds to step 524.

In step 524, the system checks on whether the xDSL port is up or not. An xDSL port is considered to be "UP" when the xDSL modems have trained as explained above. If the port is not "UP," this third condition is not satisfied and the system proceeds to step 526 where the process ends and waits for the next triggering event. If the port is "UP," the third condition has been satisfied. The system then proceeds to step 525.

In step 525, the system initiates a proxy call because the triggering event (i.e., new entry addition) has occurred and all three conditions have been satisfied. The proxy call initiation step 525 will be discussed in greater detail below with reference to FIG. 28. After the proxy call is initiated, the system proceeds to step 526 where the process ends and waits for the next triggering event. Unlike the port up trigger, the system need not check for more entries for this port because the triggering event is the creation of this new entry. The mere existence of the other entries, without more, is not a triggering event and so these other entries for this port (or any other port) will not processed for call attempts. The call is attempted for only the new entry that served as the trigger, as long as the three conditions have been satisfied.

PROXY CALL ESTABLISHMENT—ADMIN STATUS UP PROCESS (TRIGGER EVENT 3)

A third triggering event that initiates proxy call processing is the detection of the Admin Status being "UP." Proxy call processing commences when an existing entry in the Proxy Signaling Table has been modified such that the Admin Status is now "UP." In other words, the Admin Status field has been changed to "UP" for an existing row that is associated with a given VPI/VCI. Refer to FIG. 24.

The process starts at step 530. At step 531, the proxy signaling agent reads this modified proxy signaling entry. This entry for this port is associated with a VPI/VCI.

In step 532, the process inquires on the state of the Row Status field. If a table entry exists, the Row Status field of the Proxy Signaling Table may be either "ACTIVE" or "INACTIVE." Note that the Admin Status can only be applied to active Row Status fields. If the Row Status is not active, this first condition has not been met so the system proceeds to step 536 where the process ends and waits for the next triggering event. If the Row Status is active, this first condition has been satisfied and the system proceeds to step 533.

In step 533, the system checks the Admin Status for this entry. Naturally, when the triggering event is the change of the Admin Status to "UP," this second condition will also be satisfied easily. On the other hand, the Admin Status could be quickly changed back to "DOWN" if the system inadvertently or purposely desires the operational state of this port to be "DOWN." If the Admin Status is not "UP," this second condition has not been satisfied and the system proceeds to step 536 where the process ends and waits for the next triggering event. If the Admin Status is "UP," the system desires this port to be operational and this second condition is satisfied. The system then proceeds to step 534.

In step 534, the system checks on whether the xDSL port is up or not. An xDSL port is considered to be "UP" when the xDSL modems have trained as explained above. If the port is not "UP," this third condition is not satisfied and the system proceeds to step 536 where the process ends and waits for the next triggering event. If the port is "UP," the third condition has been satisfied. The system then proceeds to step 535.

In step 535, the system initiates a proxy call because the triggering event (i.e., Admin Status change to "UP") has occurred and all three conditions have been satisfied. The proxy call initiation step 535 will be discussed in greater detail below with reference to FIG. 28. After the proxy call is initiated, the system proceeds to step 536 where the process ends and waits for the next triggering event. Unlike the port up trigger, the system need not check for more entries for this port because the triggering event is the change of the Admin Status field for this existing entry. The mere existence of the other entries, without more, is not a triggering event and so these other entries for this port (or any other port) will not processed for call attempts. The call is attempted for only the new entry that served as the trigger, as long as the three conditions have been satisfied.

PROXY CALL TERMINATION

Having successfully established a proxy call, the system can also terminate these proxy calls as well using proxy signaling in accordance with one embodiment of the present invention. Like proxy call establishment, proxy calls will be terminated if any one of the following triggering events occur:

(1) An xDSL port is now "DOWN;" or
(2) An existing entry in the Proxy Signaling Table is deleted; or
(3) The Admin Status of an existing Proxy Signaling Table entry is changed to "DOWN," or
(4) The user is idle or the xDSL modem is in power down mode.

Note that, except for the fourth trigger, call termination triggering events mirror those for call establishment. Each of these triggering events will now be discussed with respect to FIGS. 25, 26, and 27.

PROXY CALL TERMINATION—XDSL PORT DOWN (TRIGGER EVENT 1)

One triggering event for proxy call termination is some indication that the xDSL port is down. One such indication is the port restart indication generated by the CALLC463 (FIG. 19). The proxy signaling agent 462 (FIG. 19) receives a port restart indication from CALLC463 (FIG. 19) that the specified port is no longer in service. CALLC463 recognizes this port down condition and will terminate the call. The proxy signaling agent 462 is not required to do any further processing for this call.

PROXY CALL TERMINATION—ENTRY DELETION (TRIGGER EVENT 2)

Figure 25:
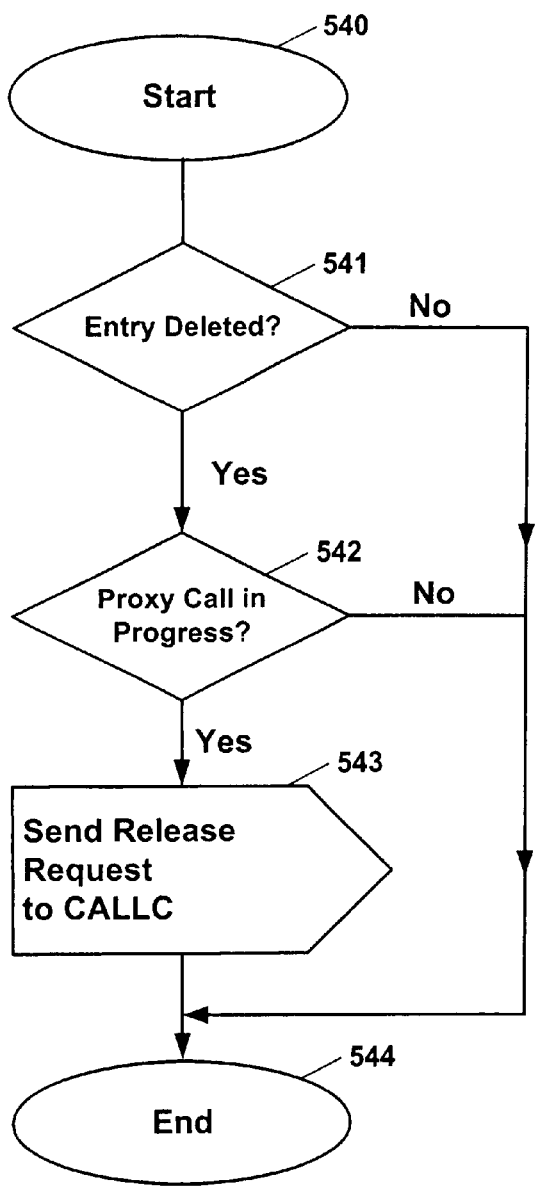
FIG. 25 provides a flow diagram of proxy signaling call termination when the triggering event is the deletion of an entry, in accordance with one embodiment of the present invention.

Another triggering event is the deletion of an entry in the Proxy Signaling Table. Entry deletion processing commences when an existing entry in the Proxy Signaling Table has been removed. Refer to FIG. 25.

The process starts at step 540. In step 541, the system inquires whether an entry in the Proxy Signaling Table has been deleted. This can be determined by examining the Row Status field. If an entry has been deleted, step 541 evaluates to "YES" and the system proceeds to step 542. If an entry has not been deleted, step 541 evaluates to "NO" and the system proceeds to step 544 where the process ends. Proceeding to step 544 at this point indicates that no entry has been deleted and call termination steps are not necessary.

In step 542, the system inquires whether the proxy call is currently in progress. If the proxy call is currently in progress, step 542 evaluates to "YES" and the system proceeds to step 543. If the proxy call is currently not in progress, step 542 evaluates to "NO" and the system proceeds to step 544 where the process ends. After all, if no call is in progress, no termination steps are necessary.

In step 543, having determined that the proxy call is currently in progress and an entry in the Proxy Signaling Table has been deleted, the proxy signaling agent 462 sends a Release Request to CALLC 463 (FIG. 19). CALLC 463 then releases the call corresponding to that entry. The process then ends at step 544.

PROXY CALL TERMINATION—ADMIN STATUS DOWN (TRIGGER EVENT 3)

Figure 26:
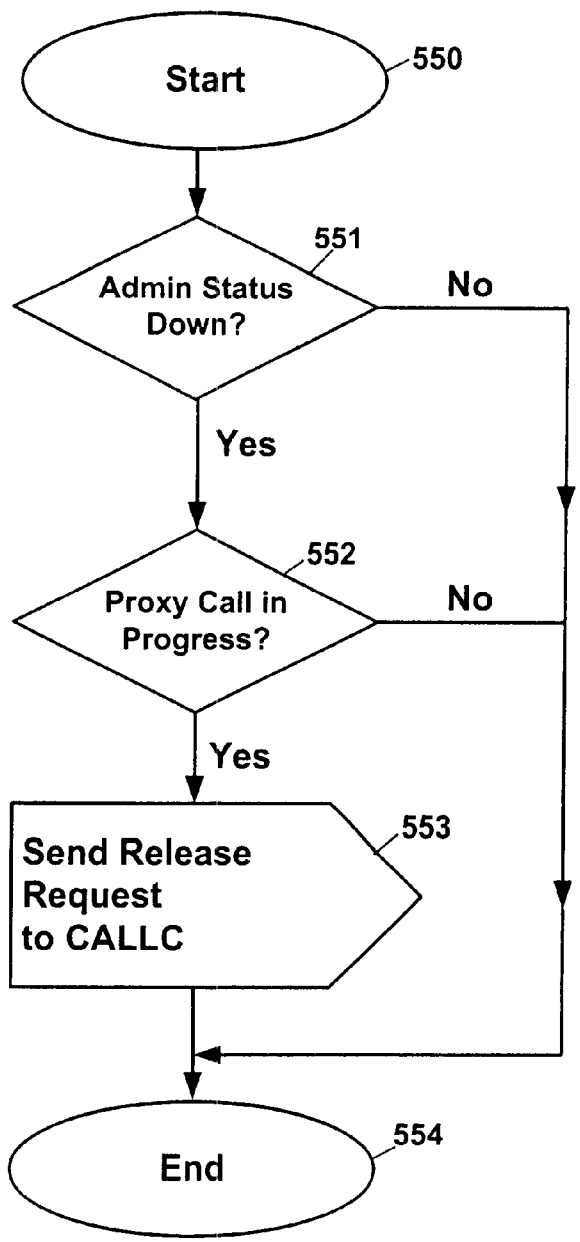
FIG. 26 provides a flow diagram of proxy signaling call termination when the triggering event is Admin Status DOWN, in accordance with one embodiment of the present invention.
Figure 27:
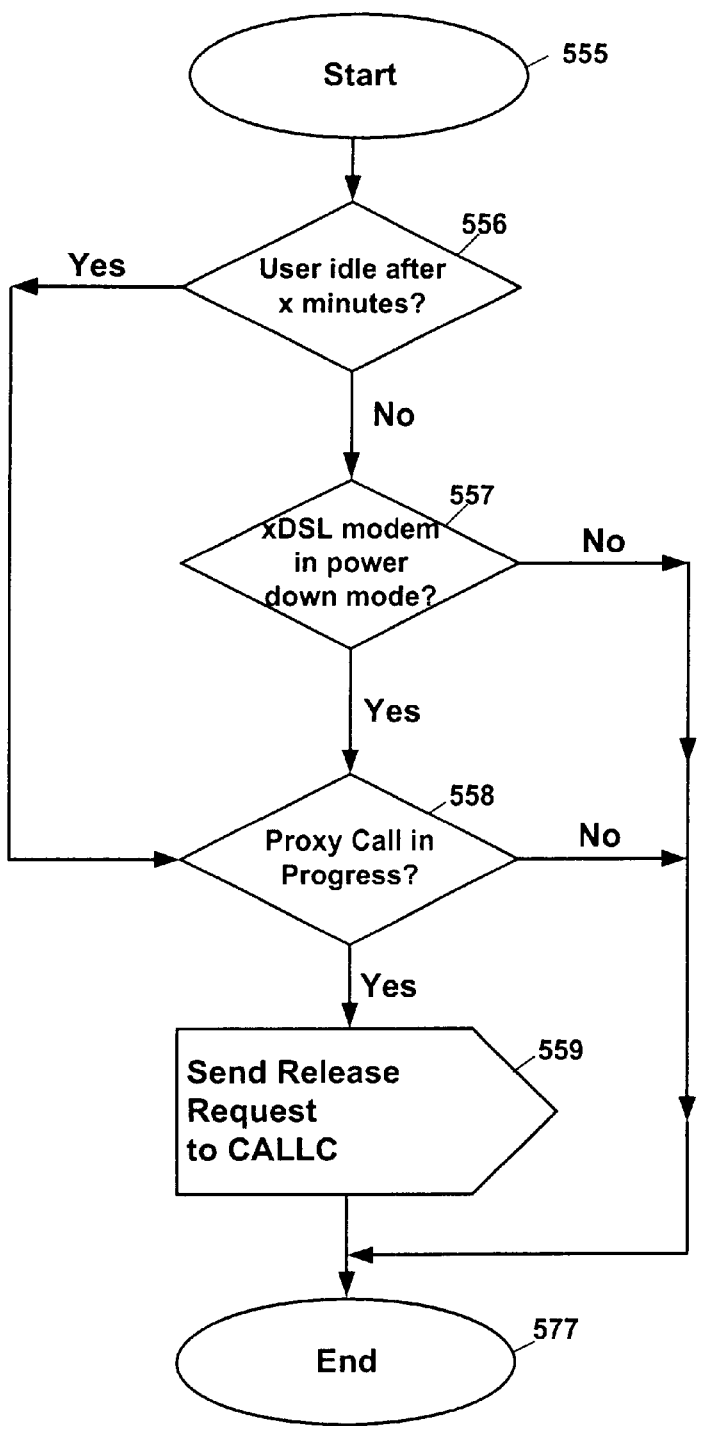
FIG. 27 provides a flow diagram of proxy signaling call termination when the triggering event is the idleness of the subscriber or the DSL modem is in power down mode, in accordance with one embodiment of the present invention.

Another triggering event is the change of the Admin Status field to "DOWN" in the Proxy Signaling Table. Thus, when an existing entry in the Proxy Signaling Table has been modified and the Admin Status is changed to "DOWN," a trigger event has occurred. Refer to FIG. 26.

The process starts at step 550. In step 551, the system inquires whether an entry in the Proxy Signaling Table has been modified by examining the Admin Status field. If the Admin Status field has been changed to "DOWN," step 551 evaluates to "YES" and the system proceeds to step 552. If the Admin Status field has not been changed to "DOWN," step 552 evaluates to "NO" and the system proceeds to step 554 where the process ends. Proceeding to step 554 at this point indicates that no entry has been modified and call termination steps are not necessary.

In step 552, the system inquires whether the proxy call is currently in progress. If the proxy call is currently in progress, step 552 evaluates to "YES" and the system proceeds to step 553. If the proxy call is currently not in progress, step 552 evaluates to "NO" and the system proceeds to step 554 where the process ends. After all, if no call is in progress, no termination steps are necessary.

In step 553, having determined that the proxy call is currently in progress and the Admin Status field in the Proxy Signaling Table has been changed to "DOWN" for an entry, the proxy signaling agent 462 sends a Release Request to CALLC 463 (FIG. 19). CALLC 463 then releases the call corresponding to that entry. The process then ends at step 554.

PROXY CALL TERMINATION—IDLENESS OR DSL MODEM POWER DOWN MODE (TRIGGER EVENT 4)

A fourth triggering event for proxy call termination is the idleness of the subscriber or the xDSL modem is in power down mode. Thus, if the subscriber is idle for a predetermined amount of time or the xDSL modem has been placed in power down mode, the proxy call will be terminated.

The process starts at step 555. In step 556, the system inquires whether the user has been idle for a predetermined amount of time x. This time x is programmable and can be set to any desired number. In one embodiment of the present invention, the predetermined amount of time is 15 minutes. This idleness can be monitored at the IMAS via a bit position in a register that indicates whether any data traffic is present. Whenever the IMAS detects idleness, this bit is set and a timer runs. After x amount of time has passed and the bit is still set, the IMAS now knows that the predetermined threshold has passed and the call can be terminated. If the subscriber has been idle for x minutes, the step 556 resolves to "YES" and the system proceeds to step 558. If the subscriber has not been idle for the duration of the predetermined amount of time x, step 556 resolves to "NO" and the system proceeds to step 557.

Step 557 inquires whether the xDSL modem used for this particular traffic is in power down or sleep mode. In power down or sleep mode, the modem powers down when the modem has not been used for some period of time (e.g., 15 minutes). The indication that the modem is in power down mode can be detected via software at the IMAS. If the modem is in power down mode, step 557 resolves to "YES" and the system proceeds to step 558. If the modem is not in power down mode, the step 557 resolves to "NO" and the system proceeds to step 577 where the proxy call termination inquiry ends.

If the modem has been idle for a while, step 557 resolves to "YES" and the system proceeds to step 558. In step 558, the system inquires whether the proxy call is currently in progress. If the proxy call is currently in progress, step 558 evaluates to "YES" and the system proceeds to step 559. If the proxy call is currently not in progress, step 558 evaluates to "NO" and the system proceeds to tep 577 where the process ends. After all, if no call is in progress, no termination steps are necessary.

In step 558, having determined that the proxy call is currently in progress and either the subscriber is idle or the xDSL modem is in power down mode, the proxy signaling agent 462 sends a Release Request to CALLC 463 (FIG. 19). CALLC 463 then releases the call corresponding to that entry. The process then ends at step 577.

PROXY CALL ATTEMPT AND RETRY PROCESSING

Proxy call attempts have been briefly mentioned above with respect to the proxy call establishment triggering events. When a triggering event occurs and is recognized, the system examines whether the requisite conditions have been satisfied. In one embodiment of the present invention, the system recognizes three triggering events. For each triggering event, the system requires that three specific conditions be satisfied before a call attempt is made. When these conditions are satisfied, the call attempt is made. The call attempts were briefly shown above with respect to FIG. 22 (step 515), FIG. 23 (step 525), and FIG. 24 (step 535). These call attempt steps will now be discussed in greater detail.

Basically, the ISP Table lists several alternate ATM addresses for each ISP ID. During call initiation, the system attempts a proxy call to the first ATM address listed for the relevant ISP entry. When the proxy call attempt fails, the retry logic is invoked. The retry logic is designed to attempt call retries to multiple ATM destinations using the Retry Count and Retry Time Interval in the Proxy Signaling Table. The Retry Count dictates the number of times the system will attempt a retry call to each ATM address. The Retry Time Interval dictates how long the system will wait between retries. If the system has unsuccessfully tried all listed addresses in the ISP Table for each ISP ID, the system will start over again with the first listed address after waiting for some recycle time period T, where in one embodiment of the present invention, the recycle time period is 10 minutes. Once a successful connection is made to any of the listed addresses, the retry logic is reset so that when the call subsequently fails, the retry process will start over again as described above. Thus, even if the call connection is established using the fourth listed ATM address and the call subsequently fails, the reset retry logic attempts the proxy call using the first listed ATM address in the ISP Table for that particular ISP ID.

Figure 28:
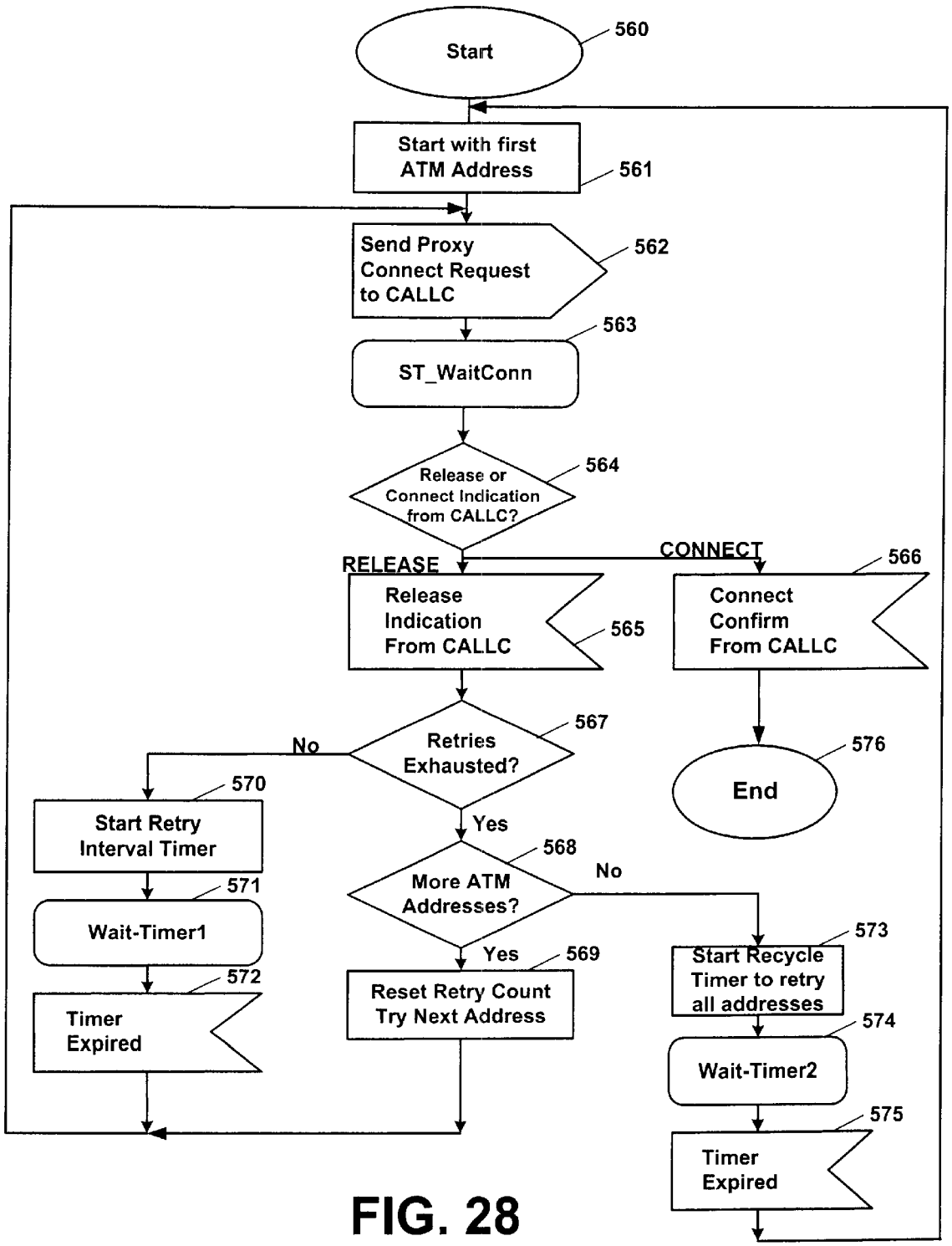
FIG. 28 provides a flow diagram of proxy signaling call attempts and retries during call establishment.

Referring now to FIG. 28, the call attempt and retry processing starts at step 560. At this point, the system has recognized some triggering event and has determined that the required system conditions have been satisfied. Accordingly, a call attempt can be made for the entry that is currently being processed. If the triggering event is an xDSL port being up, the system attempts a call for each of the VPI/VCI (and corresponding ISP ID) listed for that port one at a time. This could be as many as 50 ISP IDs in one embodiment of the present invention. If the triggering event is the addition of a new entry or the Admin Status being "UP," the system makes a call attempt for the entry that corresponds to that triggering event, i.e., that new entry or the entry associated with the Admin Status field being changed to "UP."

In step 561, the system refers to the ISP Table corresponding to the entry that is currently being processed. The ISP Table lists a number of alternate ATM addresses for a given ISP ID. The system uses the first listed address (e.g., ATM address 1 in FIG. 31) for the call attempt. If the call is unsuccessful with this selected first ATM address through the requisite number of retries dictated by Retry Count, the system will use the second listed ATM address, as explained later.

In step 562, the proxy signaling agent 462 sends a Proxy Connect Request to CALLC 463 via line 474 (FIG. 19). The proxy signaling agent 462 waits for the response from CALLC 463 in step 563. These steps 562 and 563 constitutes a call attempt. If this is not the first call attempt for this ISP ID, these steps constitute a retry attempt. Retry processing in near the bottom of this flow diagram usually loop back up to step 562 for retry attempts.

The response from CALLC 463 is either a RELEASE or a CONNECT. A RELEASE response indicates that the call attempt to the selected ATM address has been unsuccessful. A CONNECT response indicates that the call attempt to the selected ATM address has been successful. In step 564, the proxy signaling agent receives the response from the CALLC 463 and determines whether the response is a RELEASE or a CONNECT. If the response is a CONNECT, the system proceeds to step 566 where CALLC 463 sends a CONNECT CONFIRM response to the proxy signaling agent 462. This CONNECT CONFIRM response may be the same as the CONNECT response. At this point, the Oper Status field in the Proxy Signaling Table is changed to "UP" (the default state of Oper Status is "DOWN"). This indicates that the proxy call has been established. The system then ends at step 576 since the call attempt has been successful for this entry.

If, however, the response from CALLC 463 is a RELEASE, the call attempt has been unsuccessful and the system proceeds to step 565. CALLC 463 sends the RELEASE indication to the proxy signaling agent 462 at step 565. Because the call attempt has been unsuccessful, the retry logic is invoked so that other attempts will be made until the call is successful. The retry steps will now be discussed. These retries are accomplished with the aid of the Retry Count and Retry Time Interval fields in the Proxy Signaling Table.

At step 567, the system checks if the retry attempts have been exhausted. The number of retry attempts per ISP address is determined by the Retry Count field. The Retry Count field provides the maximum number of retry attempts that the system uses to make a call connection until the call is successful. In one embodiment of the present invention, the Retry Count field is set at anywhere from 0 to 9. However, this field is programmable and the system administrator can use other count numbers as desired. If the system reaches the maximum number of retries as set forth in the Retry Count, the retry attempts are deemed to have been exhausted. If the retry attempts have been exhausted, step 567 evaluates to "YES" and the system proceeds to step 568 to use other alternate listed ATM addresses. If the retry attempts have not been exhausted, step 567 evaluates to "NO" and the system proceeds to step 570 to retry the call attempt again.

For the purpose of this discussion, assume that the retries have not been exhausted and step 567 evaluates to "NO." If the retries have not been exhausted, this implies that the maximum number of retries as set forth in Retry Count has not been reached yet. For example, the Retry Count is set at 5 and so far, the system has only retried the call attempt 3 times.

Step 570 starts the retry interval timer. This timer runs for the length of time specified in the Retry Time Interval in the Proxy Signaling Table. In one embodiment of the present invention, the Retry Time Interval is set at anywhere from 0 to 9 seconds. However, this field is programmable and the system administrator can use other time intervals. At step 571, the system waits for the requisite time interval set forth in Retry Time Interval. When the time expires as shown in step 572, the system proceeds back up to step 562, which sends the proxy connect request to CALLC 463. This constitutes a retry attempt. If the retry results in failure again (release indication from CALLC at steps 564 and 565), the system inquires whether the retry attempts have been exhausted again step 567, as described above.

Assuming that the retries have been exhausted, step 567 resolves to "YES." At step 568, the system inquires whether more ATM addresses are provided in the ISP Table for the given ISP ID. If other ATM addresses are provided, step 568 resolves to "YES" and the system takes the next alternate ATM address. The system then resets the Retry Count at step 569 back to the predetermined number that specifies the maximum number of retry attempts. The system proceeds back up to step 562 which makes the call attempt.

If, on the other hand, more ATM addresses are not provided in the ISP Table for this ISP ID, then step 568 resolves to "NO." More ATM addresses may not be provided because either only one ATM address has been provided for this ISP ID, or the recently used ATM address is the last of the ATM addresses listed (e.g., ATM address 5 is the last of the five ATM addresses provided for this particular ISP ID). Once all of the ATM addresses have been tried and failed, the system cycles back to the first listed ATM address again for further retry attempts until the call attempt is successful.

However, before the system starts the cycle over again, a Recycle Timer will be started at step 573. In one embodiment of the present invention, this recycle timer is set to 10 minutes. The system waits for the requisite recycle time period (e.g., 10 minutes) at step 574 until the timer expires at step 575. The system then proceeds to step 561 which starts this whole call attempt/retry process again with the first listed ATM address.

TIME OF DAY

In another embodiment of the present invention, the time of day determines whether a call is established or terminated. For those subscribers who purchased specific time of day related services, calls can only be made during the time period specified for that service. For example, if a subscriber purchased service so that calls can be made only from 1:00 AM to 3:00 AM, the proxy signaling logic includes timer as one of the conditions for call establishment and call termination. If a call attempt is made at 12:58 AM, the IMAS will not attempt to make that call connection. Conversely, if a call is in progress and the timer shows that the time is now 3:00 AM, the call will be terminated. In other embodiments, the call will not be abruptly terminated; rather, the subscriber will be charged a premium for continuing with the connection past 3:00 AM.

PROXY SIGNALING AND VPCI

Refer to FIG. 20(A). In this example, the use of the VPCI field is shown. VPCI is usually used for those systems where a mux is used as an ATM switch interface. In one embodiment of the present invention, the VPCI field is not used at all. Regardless of the use of VPCI, the proxy signaling concepts described herein are still applicable.

End systems 591, 592, and 593 are coupled to end system interfaces 581, 582, and 583 via PVC lines 594, 595, and 596, respectively. End system interfaces 581, 582, and 583 are all coupled to the ATM switch 584 via lines 585, 586, and 587, respectively. A proxy signaling agent (PSA) 580 is provided at the IMAS and also coupled to ATM switch 584 via line 588. Here, both the ATM switch 584 and the PSA 580 support UNI signaling but the end systems 591, 592, and 593 do not.

As shown in FIG. 20(A) and the table of FIG. 20(B), the PSA 580 controls the mapping of VPCI to VPI. In this example, end system interfaces 581, 582, and 583 map to VPI=0 at ATM switch 584. By mapping the VPI space of each non-signaling end system (UNI=A, B, and C), to the VPCI space, the PSA 580 can set up virtual connections for these non-signaling end systems as if they are VCs on the UNI of the PSA to the ATM switch. Thus, UNI A (end system 591) maps to VPCI=1, UNI B (end system 592) maps to VPCI=2, UNI C (end system 593) maps to VPCI=3, and finally, UNI P (PSA 580) maps to VPCI=0. The fact that these virtual paths are on different physical ports is transparent to the signaling protocol because the mapping of the VPCI to VPI is done locally at the ATM switch and the PSA. Note that the IMAS is an ATM switch.

PROXY SIGNALING SUMMARY

In sum, the proxy signaling agent 462 receives call parameter information from the MIB agent 461. These information include, at the very least, three tables called Proxy Signaling Table, ISP Table, and connect Info Table. The Proxy Signaling Table contains various call parameter information which the proxy signaling agent uses for determining whether some triggering event has occurred for call establishment/termination and whether certain call conditions have been satisfied which allows the system to make a call or terminate a call. The ISP Table contains alternate ATM addresses for each ISP ID so that retries can be attempted if the primary call attempt fails. The Connect Info Table contains various connection profile information which will be used to make a call. These three tables reference each other.

To recognize triggering events, the system uses the Proxy Signaling Table. In one embodiment, the call establishment triggering events include: (1) port up, (2) new entry added to the Proxy Signaling Table, or (3) the Admin Status changed to "UP." If any of these triggering events occurs, the system then determines whether certain conditions have been satisfied. Once these conditions have been satisfied, the proxy signaling agent can now make a call. Calls can be initiated when the proxy signaling agent 462 sends a Proxy Connect Request to the CALLC 463. The CALLC responds with either a RELEASE (call attempt failed) or CONNECT (call attempt succeeded).

Call termination operates in an analogous manner. In one embodiment, the call termination triggering events include: (1) port down, (2) entry deleted from the Proxy Signaling Table, and (3) Admin Status changed to "DOWN." Similarly, if any of these triggering events occurs, the system then determines whether certain conditions have been satisfied. Once these conditions have been satisfied, the proxy signaling agent can now terminate a call. The proxy signaling agent 462 can send a Release Request to CALLC 463, which will in turn release the call.

During call establishment, the system attempts to call an ATM address that is listed for a corresponding ISP ID in the ISP Table. If the call attempt fails, the proxy signaling agent tries another call attempt for that same ATM address. The maximum number of retry call attempts for this particular cycle of retries for this selected ATM address is dictated by the Retry Count field in the Proxy Signaling Table. Once the number of retries matches the Retry Count, the proxy signaling agent moves on to the next listed ATM address in the ISP Table for a call attempt. If the call attempt fails, the proxy signaling agent retries the call in the manner described above. If the proxy signaling agent exhausts all ATM addresses, the proxy signaling agent starts another cycle all over again with the first listed ATM address until the call attempt is successful.

The foregoing description of a preferred embodiment of the present invention has been presented for purposes of illustration and description. It.is not intended to be exhaustive or to limit the invention to the precise forms disclosed. Obviously, many modifications and variations will be apparent to practitioners skilled in this art. One skilled in the art will readily appreciate that other applications may be substituted for those set forth herein without departing from the spirit and scope of the present invention. Accordingly, the invention should only be limited by the claims following the glossary of abbreviations.

V. GLOSSARY OF ACRONYMS

| | |
|---|---|
| AAL | ATM Adaptation Layer |
| ADSL | Asymmetric Digital Subscriber Line |
| ATM | Asynchronous Transfer Mode |
| ATMF | ATM Forum |
| CAP | Carrierless Amplitude-Phase Modulation |
| CDSL | Consumer Digital Subscriber Line |
| CEPT | Conference of European Postal and Telecommunication Administration |
| CO | Central Office |
| CPCS | Common Part Convergence Sublayer |
| CSC | Chassis Switch Card |
| DMT | Discrete Multitone Modulation |
| DS | Digital Signal (DSx) |
| DSL | Digital Subscriber Line (see xDSL) |
| HDSL | High bit-rate Digital Subscriber Line |
| IDSL | ISDN Digital Subscriber Line |
| IE | Information Element |
| ILMI | Interim (or Integrated) Local Management Interface |
| IMAS | Intelligent Multiservice Access System |
| ISA | Industry Standard Architecture |
| ISDN | Integrated Services Digital Network |
| LIU | Line Interface Unit (or xDSL Line Card) |
| MDSL | Multispeed Digital Subscriber Line |
| MIB | Management Information Base |
| NADH | North American Digital Heirarchy |
| NNI | Network to Network Interface or Network Node Interface (depending on context) |
| OC | Optical Carrier (OC-x) |
| OS | Operating System |
| PC | Personal Computer |
| PDU | Protocol Data Unit |
| PNNI | Private Network Node Interface, or Private Network-to-Network Interface |
| PPP | Point-to-Point Protocol |
| PSA | Proxy Signaling Agent |
| PSTN | Public Switched Telephone Network |
| PVC | Permanent Virtual Connection |
| RADSL | Rate-adaptive Digital Subscriber Line |
| SAAL | Signaling AAL |
| SDSL | Symmetric (or Single-pair) Digital Subscriber Line |
| SDU | Service Data Unit |
| SE | Software Entity |
| SNMP | Simple Network Management Protocol |
| SONET | Synchronous Optical Network |
| SPVC | Soft Permanent Virtual Connection |
| SSC | System Switch Card |
| SSCOP | Service Specific Connection Oriented Protocol |
| STS | Synchronous Transport Signal (STS-x) |
| UNI | User Network Interface |
| UTOPIA | Universal Test and Operations Interface for ATM |
| VDSL | Very High-speed Digital Subscriber Line |
| VCI | Virtual Channel Identifier |
| VPI | Virtual Path Identifier |
| VPCI | Virtual Path Connection Identifier |
| xDSL | Any number of Digital Subscriber Line technology variations (e.g., HDSL, ADSL, CDSL, SDSL, RADSL, IDSL, VDSL, MDSL) |

We claim:

1. A network node apparatus for use in an asynchronous transfer mode (ATM)-based telecommunications network which includes a plurality of network nodes, comprising:

a plurality of first ports that is associated with a first virtual connection;

at least one of an Asynchronous Transfer Mode (ATM) switch and ATM router co-located with said pluraity of first ports and comprising at least one second port that is associated with a second virtual connection; and signaling logic that is capable of interfacing with another network node in the telecommunications network for remotely communicating routing information for a given call session;

wherein the plurality of first ports includes a first set of first ports and a second set of first ports, in which the first set of first ports supports a first modulation scheme and the second set of first ports supports a second modulation scheme.

2. The network node apparatus of claim 1, wherein the first modulation scheme includes Discrete Multi-Tone modulation (DMT) and the second modulation scheme includes Carrier Amplitude Phase modulation (CAP).

3. An Intelligent Multiservice Access System (IMAS), for use in an asynchronous transfer mode (ATM)-based telecommunications network which includes a plurality of network nodes, comprising:

a cliassis;

a Digital Subscriber Line Access Multiplexer (DSLAM) housed in said chassis, said DSLAM comprising a plurality of first ports associated with a first virtual connection, a first group of said first ports being configured to communicate using a first modulation scheme, and a second group of said first ports being configured to communicate using a second modulation scheme; and at least one of an Asynchronous Transfer Mode (ATM) switch and an ATM router housed in said chassis, and comprising at least one second port that is associated with a second virtual connection;

wherein the first modulation scheme includes Discrete Multi-Tone modulation (DMT) and the second modulation scheme includes Carrier Amplitude Phase modulation (CAP).

* * * * *